(12) United States Patent
Joshi et al.

(10) Patent No.: US 9,116,812 B2
(45) Date of Patent: Aug. 25, 2015

(54) SYSTEMS AND METHODS FOR A DE-DUPLICATION CACHE

(71) Applicant: Intelligent Intellectual Property Holdings 2 LLC, Wilmington, DE (US)

(72) Inventors: Vikram Joshi, Los Gatos, CA (US);
Yang Luan, San Jose, CA (US);
Michael F. Brown, Campbell, CA (US);
Bhavesh Mehta, Sunnyvale, CA (US);
Prashanth Radhakrishnan, Sunnyvale, CA (US)

(73) Assignee: Intelligent Intellectual Property Holdings 2 LLC, Wilmington, DE (US)

( * ) Notice: Subject to any disclaimer, the term of this patent is extended or adjusted under 35 U.S.C. 154(b) by 165 days.

(21) Appl. No.: 13/750,904

(22) Filed: Jan. 25, 2013

(65) Prior Publication Data

US 2013/0198459 A1     Aug. 1, 2013

Related U.S. Application Data

(60) Provisional application No. 61/591,822, filed on Jan. 27, 2012.

(51) Int. Cl.
*G06F 12/08*     (2006.01)
*G06F 9/44*     (2006.01)
(Continued)

(52) U.S. Cl.
CPC ............ *G06F 12/084* (2013.01); *G06F 9/4406* (2013.01); *G06F 12/0871* (2013.01); *G06F 12/12* (2013.01); *G06F 12/1483* (2013.01); *G06F 2212/151* (2013.01)

(58) Field of Classification Search
CPC .............. G06F 12/084; G06F 12/0895; G06F 12/1483; G06F 9/4401; G06F 9/4406
USPC .................................................. 711/130, 163
See application file for complete search history.

(56) References Cited

U.S. PATENT DOCUMENTS

| 4,571,674 A | 2/1986 | Hartung |
| 5,043,871 A | 8/1991 | Nishigaki et al. |
| 5,193,184 A | 3/1993 | Belsan et al. |

(Continued)

FOREIGN PATENT DOCUMENTS

| CN | 1771495 | 5/2006 |
| EP | 1100001 | 5/2001 |

(Continued)

OTHER PUBLICATIONS

USPTO, Office Action for U.S. Appl. No. 14/262,581 mailed Jun. 19, 2014.

(Continued)

*Primary Examiner* — Hal Schnee

(57) ABSTRACT

A de-duplication is configured to cache data for access by a plurality of different storage clients, such as virtual machines. A virtual machine may comprise a virtual machine de-duplication module configured to identify data for admission into the de-duplication cache. Data admitted into the de-duplication cache may be accessible by two or more storage clients. Metadata pertaining to the contents of the de-duplication cache may be persisted and/or transferred with respective storage clients such that the storage clients may access the contents of the de-duplication cache after rebooting, being power cycled, and/or being transferred between hosts.

26 Claims, 18 Drawing Sheets

(51) Int. Cl.
  *G06F 12/12* (2006.01)
  *G06F 12/14* (2006.01)

(56) References Cited

U.S. PATENT DOCUMENTS

| | | |
|---|---|---|
| 5,261,068 A | 11/1993 | Gaskins et al. |
| 5,291,496 A | 3/1994 | Andaleon et al. |
| 5,307,497 A | 4/1994 | Feigenbaum |
| 5,313,475 A | 5/1994 | Cromer et al. |
| 5,325,509 A | 6/1994 | Lautzenhaiser |
| 5,392,427 A | 2/1995 | Barrett et al. |
| 5,404,485 A | 4/1995 | Ban |
| 5,434,994 A | 7/1995 | Shaheen et al. |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,551,003 A | 8/1996 | Mattson et al. |
| 5,553,261 A | 9/1996 | Hasbun et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Niijima et al. |
| 5,603,001 A | 2/1997 | Sukegawa et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,734,861 A | 3/1998 | Cohn et al. |
| 5,740,367 A | 4/1998 | Spilo |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,313 A | 12/1998 | Estakhri et al. |
| 5,845,329 A | 12/1998 | Onishi et al. |
| 5,860,083 A | 1/1999 | Sukegawa |
| 5,907,856 A | 5/1999 | Estakhri et al. |
| 5,924,113 A | 7/1999 | Estakhri et al. |
| 5,930,815 A | 7/1999 | Estakhri et al. |
| 5,957,158 A | 9/1999 | Volz et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,014,724 A | 1/2000 | Jenett |
| 6,073,232 A | 6/2000 | Kroeker et al. |
| 6,075,938 A | 6/2000 | Bugnion et al. |
| 6,101,601 A | 8/2000 | Matthews et al. |
| 6,115,703 A | 9/2000 | Bireley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,266,785 B1 | 7/2001 | McDowell |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,883 B1 | 1/2003 | Bello et al. |
| 6,507,911 B1 | 1/2003 | Langford |
| 6,516,380 B2 | 2/2003 | Kenchammana-Hoskote et al. |
| 6,523,102 B1 | 2/2003 | Dye et al. |
| 6,564,285 B1 | 5/2003 | Mills et al. |
| 6,567,889 B1 | 5/2003 | DeKoning et al. |
| 6,587,915 B1 | 7/2003 | Kim |
| 6,587,937 B1 | 7/2003 | Jensen et al. |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,675,349 B1 | 1/2004 | Chen |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,751,155 B2 | 6/2004 | Gorobets |
| 6,754,774 B2 | 6/2004 | Gruner et al. |
| 6,757,800 B1 | 6/2004 | Estakhri et al. |
| 6,766,413 B2 | 7/2004 | Newman |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,925,533 B2 | 8/2005 | Lewis |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,036,040 B2 | 4/2006 | Nicholson et al. |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,069,393 B2 | 6/2006 | Miyata et al. |
| 7,073,028 B2 | 7/2006 | Lango et al. |
| 7,076,560 B1 | 7/2006 | Lango et al. |
| 7,076,599 B2 | 7/2006 | Aasheim et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,130,956 B2 | 10/2006 | Rao |
| 7,130,957 B2 | 10/2006 | Rao |
| 7,143,228 B2 | 11/2006 | Iida et al. |
| 7,149,947 B1 | 12/2006 | MacLellan et al. |
| 7,155,531 B1 | 12/2006 | Lango et al. |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,178,081 B2 | 2/2007 | Lee et al. |

(56) References Cited

U.S. PATENT DOCUMENTS

| | | |
|---|---|---|
| 7,181,572 B2 | 2/2007 | Walmsley |
| 7,194,577 B2 | 3/2007 | Johnson et al. |
| 7,194,740 B1 | 3/2007 | Frank et al. |
| 7,197,657 B1 | 3/2007 | Tobias |
| 7,203,815 B2 | 4/2007 | Haswell |
| 7,215,580 B2 | 5/2007 | Gorobets |
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam et al. |
| 7,260,820 B1 | 8/2007 | Waldspurger et al. |
| 7,272,606 B2 | 9/2007 | Borthakur et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voigt et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,392,365 B2 | 6/2008 | Selkirk et al. |
| 7,395,384 B2 | 7/2008 | Sinclair et al. |
| 7,398,348 B2 | 7/2008 | Moore et al. |
| 7,424,593 B2 | 9/2008 | Estakhri et al. |
| 7,437,510 B2 | 10/2008 | Rosenbluth et al. |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,549,022 B2 | 6/2009 | Baker |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,617,375 B2 | 11/2009 | Flemming et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee et al. |
| 7,664,239 B2 | 2/2010 | Groff et al. |
| 7,669,019 B2 | 2/2010 | Fujibayashi et al. |
| 7,673,108 B2 | 3/2010 | Iyengar et al. |
| 7,676,628 B1 | 3/2010 | Compton et al. |
| 7,685,367 B2 | 3/2010 | Ruia et al. |
| 7,694,065 B2 | 4/2010 | Petev et al. |
| 7,702,873 B2 | 4/2010 | Griess et al. |
| 7,711,140 B2 | 5/2010 | Long et al. |
| 7,721,047 B2 | 5/2010 | Dunshea et al. |
| 7,721,059 B2 | 5/2010 | Mylly et al. |
| 7,725,628 B1 | 5/2010 | Phan et al. |
| 7,801,894 B1 | 9/2010 | Bone et al. |
| 7,805,449 B1 | 9/2010 | Bone et al. |
| 7,831,783 B2 | 11/2010 | Pandit et al. |
| 7,831,977 B2 | 11/2010 | Shultz et al. |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,060,820 B2 | 11/2011 | Bedi et al. |
| 8,095,683 B2 | 1/2012 | Balasubramaniam Chandra |
| 8,127,103 B2 | 2/2012 | Kano et al. |
| 8,135,900 B2 | 3/2012 | Kunimatsu et al. |
| 8,135,904 B2 | 3/2012 | Lasser et al. |
| 8,151,077 B1 | 4/2012 | Bauer et al. |
| 8,151,082 B2 | 4/2012 | Flynn et al. |
| 8,171,204 B2 | 5/2012 | Chow et al. |
| 8,195,929 B2 | 6/2012 | Banga et al. |
| 8,214,583 B2 | 7/2012 | Sinclair et al. |
| 8,244,935 B2 | 8/2012 | Leventhal et al. |
| 8,341,352 B2 * | 12/2012 | Cain et al. ............... 711/118 |
| 8,479,294 B1 | 7/2013 | Li et al. |
| 8,549,222 B1 | 10/2013 | Kleiman et al. |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2002/0188711 A1 | 12/2002 | Meyer et al. |
| 2002/0194451 A1 | 12/2002 | Mukaida et al. |
| 2003/0061296 A1 | 3/2003 | Craddock et al. |
| 2003/0061550 A1 | 3/2003 | Ng et al. |
| 2003/0093741 A1 | 5/2003 | Argon et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0002942 A1 | 1/2004 | Pudipeddi et al. |
| 2004/0003002 A1 | 1/2004 | Adelmann |
| 2004/0049564 A1 | 3/2004 | Ng et al. |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0205177 A1 | 10/2004 | Levy et al. |
| 2004/0225837 A1 | 11/2004 | Lewis |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0055425 A1 | 3/2005 | Lango et al. |
| 2005/0055497 A1 | 3/2005 | Estakhri et al. |
| 2005/0076107 A1 | 4/2005 | Goud et al. |
| 2005/0120177 A1 | 6/2005 | Black |
| 2005/0132259 A1 | 6/2005 | Emmot et al. |
| 2005/0141313 A1 | 6/2005 | Gorobets et al. |
| 2005/0144361 A1 | 6/2005 | Gonzalez et al. |
| 2005/0144406 A1 | 6/2005 | Chong, Jr. |
| 2005/0149618 A1 | 7/2005 | Cheng |
| 2005/0149683 A1 | 7/2005 | Chong, Jr. et al. |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0229090 A1 | 10/2005 | Shen et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0257213 A1 | 11/2005 | Chu et al. |
| 2005/0273476 A1 | 12/2005 | Wertheimer et al. |
| 2005/0276092 A1 | 12/2005 | Hansen et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0041731 A1 | 2/2006 | Jochemsen et al. |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0090048 A1 | 4/2006 | Okumoto et al. |
| 2006/0106968 A1 | 5/2006 | Wooi Teoh |
| 2006/0117212 A1 | 6/2006 | Meyer et al. |
| 2006/0123197 A1 | 6/2006 | Dunshea et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |

(56) References Cited

U.S. PATENT DOCUMENTS

| | | |
|---|---|---|
| 2006/0143396 A1 | 6/2006 | Cabot |
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2006/0271740 A1 | 11/2006 | Mark et al. |
| 2007/0006021 A1 | 1/2007 | Nicholson et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0033371 A1* | 2/2007 | Dunshea et al. ............... 711/173 |
| 2007/0043900 A1 | 2/2007 | Yun |
| 2007/0050548 A1 | 3/2007 | Bali et al. |
| 2007/0050571 A1 | 3/2007 | Nakamura et al. |
| 2007/0061508 A1 | 3/2007 | Zweighaft |
| 2007/0069318 A1 | 3/2007 | Takeuchi et al. |
| 2007/0086260 A1 | 4/2007 | Sinclair |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124474 A1 | 5/2007 | Margulis |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets |
| 2007/0147356 A1 | 6/2007 | Malas et al. |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0214320 A1 | 9/2007 | Ruia et al. |
| 2007/0233455 A1 | 10/2007 | Zimmer et al. |
| 2007/0233937 A1 | 10/2007 | Coulson et al. |
| 2007/0250660 A1 | 10/2007 | Gill et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005141 A1* | 1/2008 | Zheng et al. ................... 707/101 |
| 2008/0005748 A1 | 1/2008 | Mathew et al. |
| 2008/0010395 A1 | 1/2008 | Mylly et al. |
| 2008/0043769 A1 | 2/2008 | Hirai |
| 2008/0052377 A1 | 2/2008 | Light |
| 2008/0052477 A1 | 2/2008 | Lee et al. |
| 2008/0059752 A1 | 3/2008 | Serizawa |
| 2008/0091876 A1 | 4/2008 | Fujibayashi et al. |
| 2008/0098159 A1 | 4/2008 | Song et al. |
| 2008/0104321 A1 | 5/2008 | Kamisetty et al. |
| 2008/0109090 A1 | 5/2008 | Esmaili et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0205286 A1 | 8/2008 | Li et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0271039 A1 | 10/2008 | Rolia et al. |
| 2008/0276040 A1 | 11/2008 | Moritoki |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0125700 A1 | 5/2009 | Kisel |
| 2009/0132621 A1 | 5/2009 | Jensen et al. |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0287887 A1 | 11/2009 | Matsuki et al. |
| 2009/0292861 A1 | 11/2009 | Kanevsky et al. |
| 2009/0294847 A1 | 12/2009 | Mori |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005072 A1 | 1/2010 | Pitts |
| 2010/0005228 A1 | 1/2010 | Fukutomi et al. |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023676 A1 | 1/2010 | Moon |
| 2010/0023682 A1 | 1/2010 | Lee et al. |
| 2010/0030946 A1 | 2/2010 | Kano et al. |
| 2010/0036840 A1 | 2/2010 | Pitts |
| 2010/0042805 A1 | 2/2010 | Recio et al. |
| 2010/0070701 A1 | 3/2010 | Iyigun et al. |
| 2010/0070715 A1* | 3/2010 | Waltermann et al. ......... 711/129 |
| 2010/0070725 A1 | 3/2010 | Prahlad et al. |
| 2010/0070747 A1 | 3/2010 | Iyigun et al. |
| 2010/0070982 A1 | 3/2010 | Pitts |
| 2010/0076936 A1 | 3/2010 | Rajan |
| 2010/0077194 A1 | 3/2010 | Zhao et al. |
| 2010/0082774 A1 | 4/2010 | Pitts |
| 2010/0095059 A1 | 4/2010 | Kisley et al. |
| 2010/0169542 A1 | 7/2010 | Sinclair |
| 2010/0199036 A1 | 8/2010 | Siewert et al. |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0217916 A1 | 8/2010 | Gao et al. |
| 2010/0228903 A1 | 9/2010 | Chandrasekaran et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0268881 A1* | 10/2010 | Galchev et al. ............... 711/121 |
| 2011/0022819 A1 | 1/2011 | Post et al. |
| 2011/0107033 A1 | 5/2011 | Grigoriev et al. |
| 2011/0179162 A1 | 7/2011 | Mayo et al. |
| 2011/0225342 A1* | 9/2011 | Sharma et al. ................... 711/6 |
| 2011/0231857 A1 | 9/2011 | Zaroo et al. |
| 2011/0238546 A1 | 9/2011 | Certain et al. |
| 2011/0265083 A1* | 10/2011 | Davis .............................. 718/1 |
| 2011/0314202 A1 | 12/2011 | Iyigun et al. |

(56) References Cited

U.S. PATENT DOCUMENTS

| | | | |
|---|---|---|---|
| 2011/0320733 | A1 | 12/2011 | Sanford et al. |
| 2012/0159081 | A1 | 6/2012 | Agrawal et al. |
| 2012/0173824 | A1 | 7/2012 | Iyigun et al. |
| 2012/0254824 | A1 | 10/2012 | Bansod |
| 2012/0278588 | A1 | 11/2012 | Adams et al. |
| 2013/0232303 | A1 | 9/2013 | Quan |
| 2013/0339958 | A1 | 12/2013 | Droste et al. |
| 2014/0136872 | A1 | 5/2014 | Cooper et al. |
| 2014/0156938 | A1 | 6/2014 | Galchev et al. |

FOREIGN PATENT DOCUMENTS

| | | |
|---|---|---|
| EP | 1418502 | 5/2004 |
| EP | 1814039 | 3/2009 |
| GB | 123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO94/19746 | 9/1994 |
| WO | WO95/18407 | 7/1995 |
| WO | WO96/12225 | 4/1996 |
| WO | WO01/31512 | 5/2001 |
| WO | WO02/01365 | 1/2002 |
| WO | WO2004/061645 | 7/2004 |
| WO | WO2004/099989 | 11/2004 |
| WO | WO2005/103878 | 11/2005 |
| WO | WO2006/062511 | 6/2006 |
| WO | WO2006/065626 | 6/2006 |
| WO | WO2008/130799 | 3/2008 |
| WO | WO2008/073421 | 6/2008 |
| WO | WO2011/106394 | 9/2011 |

OTHER PUBLICATIONS

USPTO, Office Action Interview Summary for U.S. Appl. No. 13/541,659 mailed Aug. 26, 2014.
USPTO, Office Action for U.S. Appl. No. 13/687,979 mailed Sep. 9, 2014.
USPTO, Office Action for U.S. Appl. No. 13/192,365 mailed Jul. 17, 2014.
USPTO, Office Action for U.S. Appl. No. 13/287,998 mailed Jun. 10, 2014.
USPTO, Office Action for U.S. Appl. No. 13/288,005 mailed Jul. 8, 2014.
USPTO, Interview Summary for U.S. Appl. No. 10/372,734, mailed Feb. 28, 2006.
USPTO, Notice of Allowance for U.S. Appl. No. 12/986,117, Mailed Apr. 4, 2013.
USPTO, Notice of Allowance for U.S. Appl. No. 12/986,117 Mailed Jun. 5, 2013.
USPTO, Office Action for U.S. Appl. No. 12/879,004 mailed Feb. 25, 2013.
USPTO, Office Action for U.S. Appl. No. 13/607,486 mailed Jan. 10, 2013.
USPTO, Office Action for U.S. Appl. No. 10/372,734, mailed Sep. 1, 2005.
USPTO, Office Action for U.S. Appl. No. 11/952,113, mailed Dec. 15, 2010.
USPTO, Office Action for U.S. Appl. No. 12/711,113, mailed Jun. 6, 2012.
USPTO, Office Action for U.S. Appl. No. 12/711,113, mailed Nov. 23, 2012.
USPTO, Office Action for U.S. Appl. No. 13/607,486 mailed May 2, 2013.
USPTO, Office Action for U.S. Appl. No. 13/118,237 mailed Apr. 22, 2013.
USPTO, Office Action, U.S. Appl. No. 11/952,109, issued May 1, 2012.
USPTO, Office Action, U.S. Appl. No. 11/952,109, mailed Nov. 29, 2011.
Van Hensbergen, IBM Research Report, "Dynamic Policy Disk Caching for Storage Networking," IBM Research Division, Computer Science, RC24123 (WO611-189), Nov. 28, 2006.
VMware, Introduction to VMware vSphere, http://www.vmware.com/pdf/vsphere4/r40/vsp_40_intro_vs.pdf, 2009, accessed Aug. 1, 2012.
VMware, Virtual Disk API Programming Guide, Virtual Disk Development Kit 1.2, Nov. 2010, accessed Aug. 3, 2012.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WH08.pptx, Printed Apr. 6, 2010, 8 pgs.
Wang, "OBFS: A File System for Object-based Storage Devices," Apr. 2004.
Wikipedia, "Object Storage Device," http://en.wikipedia.org/wiki/Object-storage-device, last visited Apr. 29, 2010.
Winnett, Brad, "S2A9550 Overview," White Paper, http://www.ddn.com/pdfs/ddn_s2a_9550_white_paper.pdf, Jul. 2006, 27 pgs.
WIPO, International Preliminary Report of Patentability for PCT/US2007/086691, mailed Feb. 16, 2009.
WIPO, International Preliminary Report on Patentability for PCT/US2007/086688, mailed Mar. 16, 2009.
WIPO, International Preliminary Report on Patentability for PCT/US2007/086701, mailed Mar. 16, 2009.
WIPO, International Preliminary Report on Patentability for PCT/US2007/086687, mailed Mar. 18, 2009.
WIPO, International Preliminary Report on Patentability for PCT/US2007/025048, mailed Jun. 10, 2009.
WIPO, International Preliminary Report on Patentability for PCT/US2010/048325, mailed Mar. 13, 2012.
WIPO, International Search Report and Written Opinion for PCT/US2007/086691, mailed May 8, 2008.
WIPO, International Search Report and Written Opinion for PCT/US2007/025049, mailed May 14, 2008.
WIPO, International Search Report and Written Opinion for PCT/US2007/025048, mailed May 27, 2008.
WIPO, International Search Report and Written Opinion for PCT/US2007/086701, mailed Jun. 5, 2008.
WIPO, International Search Report and Written Opinion for PCT/US2007/086687, mailed Sep. 5, 2008.
WIPO, International Search Report and Written Opinion for PCT/US2011/65927, mailed Aug. 28, 2012.
WIPO, International Search Report and Written Opinion for PCT/US2012/029722, mailed Oct. 30, 2012.
WIPO, International Search Report and Written Opinion for PCT/US2012/039189, mailed Dec. 27, 2012.
WIPO, International Search Report and Written Opinion PCT/US2010/025885, mailed Sep. 28, 2011.
WIPO, International Search Report and Written Opinion PCT/US2012/050194, mailed Feb. 26, 2013.
Woodhouse, David, "JFFS: The Journaling Flash File System," Red Hat, Inc., http://sourceware.org/jffs2/jffs2.pdf, visited Jun. 22, 2010.
Wright, "Extending ACID Semantics to the File System", ACM Transactions on Storage, vol. 3, No. 2, published May 1, 2011, pp. 1-40.
Wu, "eNVy: a Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yang, "A DCD Filter Driver for Windows NT 4," Proceedings of the 12th International Conference on Computer Applications in Industry and Engineering (CAINE-99), Atlanta, Georgia, USA, Nov. 4-6, 1999.
Yerrick, "Block Device," http://www.pineight.com/ds/block, last visited Mar. 1, 2010.
Hystor: "Making SSDs the Survival of the Fittest in High-Performance Storage Systems," ics10-Paper 102, Feb. 2010.
IBM, "Method to Improve Reliability of SSD Arrays," Nov. 2009.

(56) References Cited

OTHER PUBLICATIONS

Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Linn, Craig, "Windows I/O Performance: Cache Manager and File System Considerations," CMGA Proceedings, Sep. 6, 2006.
Lu, Pin, "Virtual Machine Memory Access Tracing with Hypervisor Exclusive Cache," Department of Computer Science, University of Rochester, 2007.
Mesnier, "Object-Based Storage," IEEE Communications Magazine, Aug. 2003, pp. 84-90.
Micron Technology, Inc., "NAND Flash 101: An Introduction to ND Flash and How to Design It in to Your Next Product (TN-29-19)," http://www.micron.com/~/media /Documents/Products/Technical%20Note/ND%20Flash/145tn2919_nd_101.pdf, 2006, visited May 10, 2010.
Micron, "TN-29-08: Technical Note, Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, Data Set Management Commands Proposal for ATA8-ACS2, published Oct. 5, 2007, Rev. 3.
Microsoft, "File Cache Management, Windows Embedded CE6.0 R3," msdn.microsoft.com/en-us/subscriptions/aa911545.aspx, published Aug. 28, 2008.
Microsoft, "Filter Driver Development Guide," download.microsoft.com/.../FilterDriverDeveloperGuide.doc 2004.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Muntz, et al., Multi-level Caching in Distributed File Systems, CITI Technical Report, 91-3, Aug. 16, 1991.
Nevex Virtual Technologies, "CacheWorks Data Sheet," http:// www.nevex.com/wp-content/uploads/2010/12/Data-Sheet3.pdf, published Dec. 1, 2010.
Noll, Albert et al., Cell VM: A Homogeneous Virtual Machine Runtime System for a Heterogeneous Single-Chip.
Novell, "File System Primer", http://wiki.novell.com/index.php/File_System_Primer, 2006, visited Oct. 18, 2006.
Omesh Tickoo et al, Modeling Virtual Machine Performance: Challenges and Approaches, SIGMETRICS Perform. Eval. Rev. 37, 3 (Jan. 2010), 55-60. DOI=10.1145/1710115.1710126 http://doi.acm.org/10.1145/ 1710115.1710126.
Perfectcacheserver, "Automatic Disk Caching," http://www.raxco.com/business/perfectcache_server.aspx, last visited Oct. 31, 2012.
Pivot3, "Pivot3 announces IP-based storage cluster," www.pivot3._com, Jun. 22, 2007.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/training/ss/lecture/new-documents/Lectures/15-CacheManager/Cache Manager.pdf, printed May 15, 2010.
Ranaweera, 05-270TO, SAT: Write Same (10) command (41h), T10/05, Jul. 7, 2005, www.t10.org/ftp/t10/document.05/05-270r0.pdf, last visited Apr. 11, 2013.
Rosen, Richard, "IntelliCache, Scalability and consumer SSDs," blogs.citrix.com/2012/01/03/intellicache-scalability-and-consumer-ssds, Jan. 3, 2012, accessed Aug. 3, 2012.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Seagate Technology LLC, "The Advantages of Object-Based Storage-Secure, Scalable, Dynamic Storage Devices, Seagate Research Technology Paper, TP-536" Apr. 2005.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
Singer, Dan, "Implementing MLC NAND Flash for Cost-Effective, High Capacity Memory," M-Systems, White Paper, 91-SR014-02-8L, Rev. 1.1, Sep. 2003.
Solid Data, Maximizing Performance through Solid State File-Caching, Best Practices Guide, http://soliddata.com/resources/pdf/bp-sybase.pdf, May 2000.
Spansion, "Data Management Software (DMS) for AMD Simultaneous Read/Write Flash Memory Devices", published Jul. 7, 2003.
Spillane, "Enabling Transactional File Access via Lightweight Kernel Extensions", Stony Brook University, IBM T. J. Watson Research Center, published Feb. 25, 2009.
State Intellectual Property Office, Office Action, CN Application No. 200780050970.0, issued Jun. 29, 2011.
State Intellectual Property Office, Office Action, CN Application No. 200780050970.0, issued Oct. 28, 2010.
State Intellectual Property Office, Office Action, CN Application No. 200780051020.X, issued Nov. 11, 2010.
State Intellectual Property Office, Office Action, CN Application No. 200780050983.8, issued May 18, 2011.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
State Intellectual Property Office, Office Action, CN Application No. 200780050970.0, issued Jan. 5, 2012.
Steere, David et al., Efficient User-Level File Cache Management on the Sun Vnode Interface, School of Computer Science, Carnegie Mellon University, Apr. 18, 1990.
Superspeed, "New Super Cache 5 on Servers," http://www.superspeed.com/servers/supercache.php, last visited Oct. 31, 2013.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Adabas, Adabas Caching ASSO, DATA, WORK, http://communities.softw areag.com/web/guest/pwiki/-/wiki/Main/.../pop_up?_36_viewMode=print, Oct. 2008, accessed Aug. 3, 2012.
Adabas, Adabas Caching Configuration and Tuning, http://documentation.softwareag.com/adabas/ada821mfr/addons/acf/config/cfgover.htm, Sep. 2009, accessed Aug. 3, 2012.

(56) References Cited

OTHER PUBLICATIONS

Adabas, Adabas Caching Facility, http://www.softwareag.com/es/Images/Adabas_Caching_Facility_tcm24-71167.pdf, 2008, accessed Aug. 3, 2012.
Adabas, File Level Caching, http://documentation.softwareag.com/adabas/ada824mfr/addons/acf/services/file-level-caching.htm, accessed Aug. 3, 2012.
Agigatech, Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th SA Goddard Conference on Mass Storage Systems and Technologies (MSST 2006), May 2006, pp. 263-227.
Arpaci-Dusseau, "Removing the Costs of Indirection in Flash-based SSDs with Nameless Writes," Jun. 2010, HotStorage'10, Boston, MA.
Asine, "ASPMC-660 Rugged IDE Flash Drive PMC Module," http://www.asinegroup.com/products/aspmc660.html, copyright 2002, visited Nov. 8, 2009.
Atlantis Computing Technology, Caching, http://atlantiscomputing.com/technology/caching, published 2012, accessed Aug. 1, 2012.
Bandulet "Object-Based Storage Devices," Jul. 2007 http://developers.com/solaris/articles/osd.htme, visited Dec. 1, 2011.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Bitmicro, "BiTMICRO Introduces E-Disk PMC Flash Disk Module at Military & aerospace Electronics East 2004," http://www.bitmicro.com/press.sub, published May 18, 2004, visited Mar. 8, 2011.
Bonnet, "Flash Device Support for Database Management," published Jan. 9, 2011.
Brandon, Jr., "Sparse Matrices in CS Education," Journal of Computing Sciences in Colleges, vol. 24 Issue 5, May 2009, pp. 93-98.
Casey, "San Cache: SSD in the San," Storage Inc., http://www.solidata.com/resourses/pdf/storageing.pdf, 2000, visited May 20, 2011.
Casey, "Solid State File-Caching for Performance and Scalability," Solid Data Quarter 1 2000, http://www/storagesearch.com/3dram.html, visited May 20, 2011.
Citrix, XenServer-6.0.0 Installation Guide, Mar. 2, 2012, http://support.citrix.com/servlet/KbServlet/download/28750-102-673824/XenServer-6.0.0-installation.pdf. accessed Aug. 3, 2012.
Clustered Storage Solutions: "Products," http://www.clusteredstorage.com/clustered_storage_solutions.html, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Data Direct Networks, "White Paper: S2A9550 Overview," www.//datadirectnet. com, 2007.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
Ferber, Christian, "XenDesktop and local storage + IntelliCache," Jun. 22, 2011, blogs.citrix.com/2011/06/22/xendesktop-and-local-storage-intellicache/, accessed Aug. 3, 2012.
Friedman, Mark, et al., "File Cache Performance and Tuning, Windows 2000 Performance Guide, O'Reilly & Associates, Inc., http://msdn.microsoft.com/en-us/library/ms369863.aspx," published Jan. 2002, visited Aug. 3, 2012.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gill, "Wow: Wise Ordering for Writes—Combining Spatial and Temporal Locality in Non-Volatile Caches," IBM, Fast 05: 4th USENIX Conference on File and Storage Technologies, 2005.
Gutmann, "Secure Deletion of Data from Magnetic and Solid-State Memory", Usenix, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, Stmicroelectronics, "Open NAND Flash Interface Specification," Revision 2.0, Feb. 27, 2008.

* cited by examiner

965

| | |
|---|---|
| *.sys | Admittable |
| *.dat | Exclude |
| *\windows\system32\* | Admittable |
| *\windows\system\* | Admittable |
| *\documents\corporate_template.doc | Admittable |
| *\applications\word_processing\* | Admittable |
| *\working_files\* | Exclude |
| Application_X | Admittable |
| Attrib X | Admittable |
| ... | ... |

Fig. 9

UFID 855　　　1064　　DID 856

| | |
|---|---|
| \\VID\windows\system32\xpssvcs.dll | F30FA423 |
| \\VID\windows\system32\xpsshhdr.dll | DE451BE4 |
| \\VID\windows\system32\xmlprov.dll | 45AD342E |
| \\VID\windows\system32\ansi.sys | 12EF33A3 |
| \\VID\windows\system32\svchost.exe | 20AE45EA |
| \\VID\windows\system32\kernel32.dll | EA733BA0 |
| ... | ... |

FIG. 10

DID 856　　812　　857　　859

| | | | |
|---|---|---|---|
| F30FA423 | Physical Address: 12 | | 208A, 208B |
| DE451BE4 | Physical Address: 89 | | 208N |
| 45AD342E | Physical Address: 23 | | 208B |
| 12EF33A3 | Physical Address: 42 | | 208A, 208B |
| 20AE45EA | Physical Address: 54 | | * |
| EA733BA0 | Physical Address: 33 | | 208N |
| ... | ... | | ... |

Fig. 11

SYSTEMS AND METHODS FOR A DE-DUPLICATION CACHE

CROSS-REFERENCE TO RELATED APPLICATIONS

This application claims priority to U.S. Provisional Patent Application No. 61/591,822, entitled "Systems and Methods for a De-Duplication Cache," to Vikram Joshi et al., filed Jan. 27, 2012, which is hereby incorporated by reference.

TECHNICAL FIELD

This disclosure relates to de-duplication, and more specifically, to a de-duplication cache.

BACKGROUND

A host may comprise a plurality of virtual machines deployed in a Virtual Desktop Infrastructure ("VDI") environment. The virtual machines may use similar operating systems and applications. These commonalities may present I/O performance and redundancy challenges. For example, when a large number of the virtual machines boot, the virtual machines may accesses a similar files stored on similar storage systems, which can result in creating a "boot storm" that can overwhelm I/O resources. Moreover, the I/O may result in caching multiple, duplicative copies of the files in cache storage, resulting in reduced cache availability and wasted cache resources.

SUMMARY

Disclosed herein are systems, apparatus, and methods for efficient I/O using cache storage. The cache storage may comprise various memory devices, such as flash memory devices or RAM (random access memory) that may or may not be block oriented. The systems and methods disclosed herein do not differentiate between Flash memory, RAM or other types of memory, and further envision new types of memory developed in the future that will utilize various embodiments disclosed herein.

In some embodiments, a de-duplication cache may be configured to de-duplicate cache data for a plurality of virtual machines. As used herein, de-duplicating cache data refers to caching data for use by two or more different storage clients. De-duplication may reduce the I/O overhead to primary storage resources and improve the efficiency of the cache.

Disclosed herein are embodiments of an apparatus comprising a de-duplication cache manager configured to admit data into a de-duplication cache in response to admission requests from one or more of a plurality of virtual machines. The apparatus may further comprise a cache interface module configured to provide access to a single copy of data admitted into the de-duplication cache to two or more of the virtual machines.

In some embodiments, the apparatus may comprise a virtual machine de-duplication module configured to identify files suitable for admission into the de-duplication cache. Suitable files may include files that are infrequently modified, files that are never modified (are read-only), files that are accessed multiples times by a single virtual machine, and/or are likely to be accessed by multiple virtual machines within a given time period, and so on. The de-duplication cache may be configured to index data admitted into the de-duplication cache using context-independent identifiers, which may be derived from the data itself. Accordingly, the context-independent identifiers may be consistent across the virtual machines.

The de-duplication cache manager may be configured to index data admitted into the de-duplication cache using context-independent identifiers. The de-duplication cache manager may be configured to determine whether data has already been admitted by use of the context-independent identifiers. The de-duplication cache manager may be configured to verify a match between context-independent data identifiers by a byte-by-byte comparison of data corresponding to the data identifiers. The de-duplication cache manager may be configured to restrict access to data admitted into the de-duplication cache to virtual machines that have previously requested admission of the data.

The apparatus may further comprise a cache retention module configured to retain data admitted into the de-duplication cache by a virtual machine in response to determining that the virtual machine is being transferred to a different host. The apparatus may further comprise a cache transfer module configured to transfer de-duplication cache tags of a virtual machine to another host.

Disclosed herein are embodiments of an apparatus comprising a monitoring module configured to monitor input/output (I/O) operations of a virtual machine, a de-duplication cache policy module configured to identify I/O requests pertaining to data that satisfy a de-duplication policy for admission into a de-duplication cache, and a virtual machine de-duplication module configured to service the identified I/O requests using a de-duplication cache shared by a plurality of virtual machines.

The virtual machine de-duplication module may be configured to admit a file into the de-duplication cache by deriving a data identifier of the file from data of the file and providing the data and the data identifier to the de-duplication cache. The virtual machine de-duplication cache module may be configured to admit the file into the de-duplication cache in response to an I/O request pertaining to the file, and the operations to admit the file into the de-duplication cache may be performed on a separate thread from a thread performing operations to satisfy the I/O request pertaining to the file.

In some embodiments, the virtual machine de-duplication module is configured associate names of files admitted into the de-duplication cache with respective data identifiers of the files to indicate that the files have been admitted into the de-duplication cache. The virtual machine de-duplication module may be further configured to request data of a file from the de-duplication cache by use of the data identifier associated with the file. The virtual machine de-duplication module may be configured to indicate that a file is no longer admitted in response to detecting an I/O request to modify the file.

The virtual machine de-duplication module may be configured to store associations between file names of files admitted into the de-duplication cache and data identifiers of the files on a persistent storage medium and to load the stored associations in response to one or more of restarting the virtual machine, rebooting the virtual machine, power cycling the virtual machine, and migrating the virtual machine to a different host.

The apparatus may further comprise file selection criteria configured to identify files that are suitable for admission into the de-duplication cache based on one or more of file name, file extension, file path, file volume, file attribute, and/or hint (e.g., de-duplication configuration information received via a configuration interface, I/O request, or the like).

Disclosed herein are methods, comprising caching a file in a de-duplication cache shared by multiple virtual machines in response to a request to admit the file into the de-duplication cache from a first one of the virtual machines, associating the cached file with a context-free identifier, providing data of the cached file from the de-duplication cache to a second one of the virtual machines in response to a request from the second virtual machine, wherein the request comprises the context-free identifier of the cached file.

The method may further comprise determining whether a file has already been admitted into the de-duplication cache by comparing a context-free identifier derived from data of the file with context-free identifiers of files that have been admitted into the de-duplication cache. In some embodiments, the method further comprises comparing data of the file to existing file data in the de-duplication cache in response to the context-free identifier of the file matching a context-free identifier of a file that is already admitted into the de-duplication cache, and providing a modified context-free identifier for the file data to the first virtual machine in response to the file data differing from file data of the file already admitted into the de-duplication cache.

The disclosed methods may further comprise verifying that the second virtual machine is authorized to access the cached file, which may comprise determining that the second virtual machine has access to the file on a primary storage.

Disclosed herein are embodiments of machine-readable storage media comprising instructions configured to cause a computing device to perform a method, the method comprising identifying a file for admission into a de-duplication cache in response to monitoring file I/O requests within a storage stack of a virtual machine, determining whether the file has been admitted into a de-duplication cache, and servicing the I/O request by use of the de-duplication cache in response to determining that the file has been admitted, wherein servicing the I/O request comprises requesting data of the file from the de-duplication cache using a universal identifier of the file.

In response to determining that the file has not been admitted into the de-duplication cache, the method may further comprise calculating the universal identifier of the file based on data of the file, and generating a request to admit the file into the de-duplication cache, the request comprising the data of the file and the universal identifier.

In some embodiments, the method further comprises associating a name of the file with the universal identifier in a de-duplication index of the virtual machine in response to receiving an indication that the file has been admitted into the de-duplication cache. The disclosed methods may further include identifying an I/O request pertaining to the file, determining that the file was admitted into the de-duplication cache by use of the de-duplication index, and requesting data of the file from the de-duplication cache by use of the universal identifier associated with the name of the file in the de-duplication index. The entry of a file in the de-duplication index may be invalidated and/or removed in response to detecting an I/O request to modify the corresponding file.

The disclosed methods may comprise persisting a snapshot of the de-duplication index, populating the de-duplication index using the snapshot subsequent to one or more of rebooting the virtual machine, power cycling the virtual machine, and transferring the virtual machine to a different host.

BRIEF DESCRIPTION OF THE DRAWINGS

This disclosure includes and references the accompanying drawings, which provide a more particular description of the embodiments disclosed herein. The disclosure, however, is not limited to the particular embodiments depicted in the figures. The teachings of the disclosure may be utilized and/or adapted to other embodiments and/or changes may be made to the disclosed embodiments, without departing from the scope of the disclosure.

FIG. 9 depicts one embodiment of file-selection criteria;

FIG. 10 depicts one embodiment of a de-duplication index;

FIG. 11 depicts one embodiment of de-duplication cache tags;

DETAILED DESCRIPTION

Figure 1A:
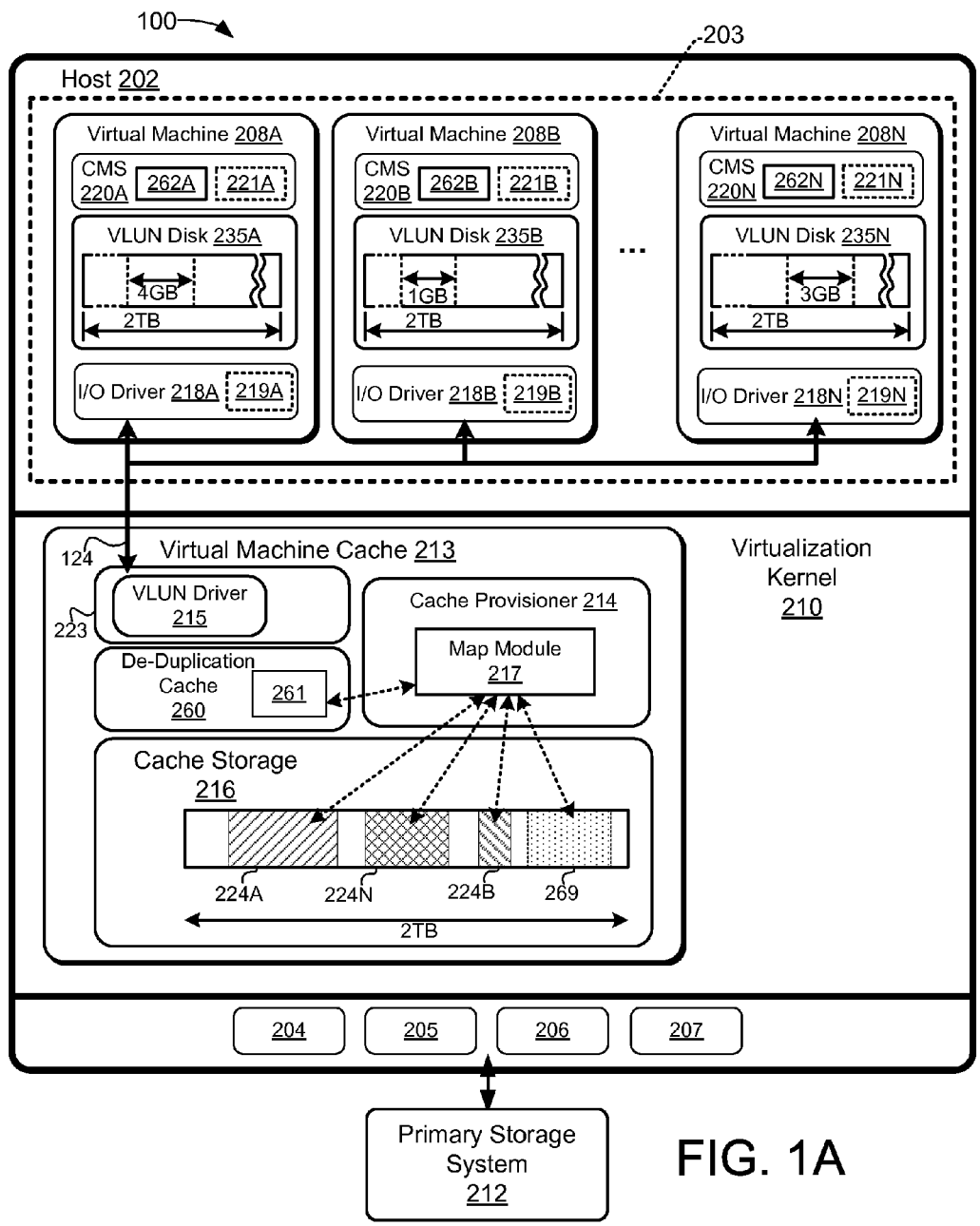
FIG. 1A depicts embodiments of systems and apparatus for caching data in a virtualized environment.

FIG. 1A depicts one embodiment of a system 100 for caching data in a virtualized environment. The system 100 may include a host 202, comprising a virtualization kernel 210 and user space 203. The user space 203 may comprise a plurality of virtual machines 208A-N. As used herein, a "virtual machine" refers to a system and/or process operating within a virtualized computing environment (e.g., the virtualization kernel 210). A virtual machine 208A-N may, therefore, refer to a system platform including an operating system (e.g., a guest operating system). Alternatively, or in addition, a virtual machine 208A-N may refer to a particular process and/or program operating within a virtualized computing environment.

The host 202 may comprise one or more computing devices capable of hosting the virtual machines 208A-N. The host 202 may comprise, for example, one or more processors 204, memory devices 205, persistent storage devices 206, communication devices 207 (e.g., I/O interfaces, network interfaces, human-machine interfaces, etc.), and so on. Although FIG. 1A depicts three virtual machines 208A-N, the disclosure is not limited in this regard; the virtualized environment could include any number of hosts 202 comprising any number of virtual machines 208A-N.

The virtualization kernel 210 may be configured to manage the operation of the virtual machines 208A-N operating on the host 202 as well as other components and services provided by the host 202. For example, the virtualization kernel 210 may be configured to handle various I/O operations associated with a primary storage system 212 or other I/O devices. The primary storage system 212 may be shared among the multiple virtual machines 208A-N and/or multiple hosts. The primary storage system 212 may include, but is not limited to: one or more disk drives and/or other storage devices, one or more storage arrays, such as an Array of Inexpensive Disks ("RAID"), Just a Bunch of Disks ("JBOD"), or the like, network-attached storage, such as a network area storage ("NAS"), a storage area network ("SAN"), or the like.

The host 202 may further comprise a virtual machine cache 213, which may be configured to provide caching services to the virtual machines 208A-N deployed on the host computing device 202. The virtual machine cache 213 may comprise a cache provisioner module 214 and cache storage 216. The cache storage 216 may comprise one or more storage devices, including, but not limited: solid-state memory devices, Random Access Memory ("RAM") devices, volatile memory, battery-backed RAM, or the like. As used herein, a "solid-state memory device," refers to a non-volatile, persistent memory that can be repeatedly erased and reprogrammed. Accordingly, a solid-state memory device may comprise a solid-state storage device and/or solid-state storage drive (SSD) (e.g., a Flash storage device). The cache provisioner module 214 may be configured to provision resources of the cache storage 216 to the virtual machines 208A-N, which may comprise dynamically provisioning cache resources and/or I/O operations ("IOPS") to the virtual machines 208A-N. The cache provisioner module 214 may be configured to provide for sharing resources of the cache storage 216 between multiple virtual machines 208A-N.

In some embodiments, one or more of the virtual machines 208A-N may comprise an I/O driver 218A-N and a cache management system (CMS) 220A-N. The I/O driver 218A-N may be configured to intercept I/O operations of the associated virtual machine 208A-N and to direct the I/O operations to the corresponding CMS 220A-N for processing; selected I/O operations may be serviced using the virtual machine cache 213. In some embodiments, and as depicted in FIG. 1A, the I/O driver 218 may be in "close proximity" to the source of I/O operations of the virtual machines 208A-N (e.g., the I/O driver 218A-N may be deployed within the virtual machine 208A-N, and as such, does not have to access the virtualization kernel 210 and/or cross a virtual machine boundary to access information pertaining to virtual machine 208A-N I/O operations). In some embodiments, the I/O driver 218A-N may comprise and/or be implemented as a device driver (e.g., a device driver of respective guest operating systems of the virtual machines 208A-N). The I/O driver 218A-N may comprise a generic component that forms part of an operating system and a device-specific component. The I/O driver 218A-N may leverage I/O Application Programming Interfaces (APIs) published by the guest operating system (e.g., may be in the I/O "path" of the virtual machines 208A-N). The I/O driver 218A-N may comprise a filter driver 219A-N configured to monitor I/O request packets (IRP) of a Microsoft Windows® operating system. The disclosure is not limited in this regard, however, and may be applied to any suitable I/O framework of any operating system (e.g., Unix®, LINUX, OSX®, Solaris®, or the like) and/or virtualization environment 210.

In some embodiments, the virtual machines 208A-N may be configured to be transferred and/or relocated between hosts 202. The systems, apparatus, and methods disclosed herein may provide for transferring a "cache operating state" between hosts 202. As used herein, "cache operating state" or "cache state" refers to a current working state of a cache, which may include, but is not limited to: cache metadata, such as cache admission information (e.g., cache tags 221), access metrics, and so on; cache data (e.g., the contents of a cache storage 216); and the like. Transferring a cache operating state may, therefore, comprise transferring cache metadata and/or cache data. The virtualization kernel 210 (or other virtualization layer) may be configured to prevent virtual machines that reference local resources of the host 202, such as local disk storage or the like, from being transferred. Accordingly, virtual machines 208A-N may be configured to access the virtual machine cache 213 as if the virtual machine cache 213 were a shared storage resource and/or in a way that does not prevent the virtual machines 208A-N from being transferred between hosts 202.

Figure 1B:
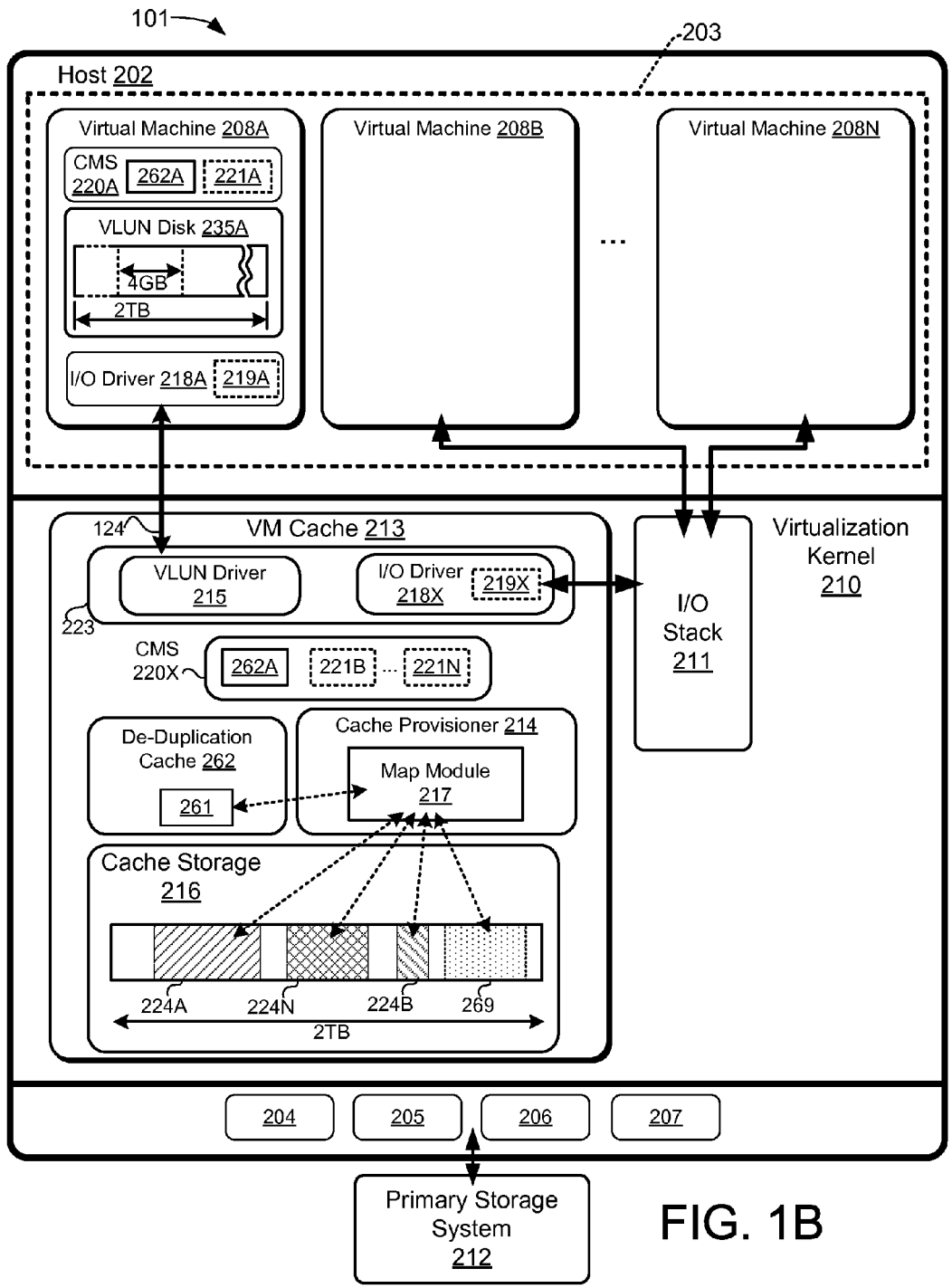
FIG. 1B depicts embodiments of systems and apparatus for caching data in a virtualized environment.

One or more of the virtual machines 208A-N may comprise a CMS 220A-N, which may be configured to manage cache resources provisioned to the virtual machine 208A-N. The CMS 220A-N may be configured to maintain cache metadata, such as cache tags 221 to represent data that has been admitted into the virtual machine cache 213. The cache tags 221 may be maintained within memory resources of the virtual machine 208A-N, such that the cache tags 221 are transferred with the virtual machine between hosts (208A-N). In other embodiments, and as depicted in FIG. 1B, cache tags 221B-N of one or more of the virtual machines 208B-N may be maintained within the virtualization kernel 210 (e.g., within the virtual machine cache 213).

The cache provisioner module 214 may be configured to dynamically provision cache resources to the virtual machines 208A-N. Cache allocation information associated with a particular virtual machine (e.g., Virtual Machine 208A) may be communicated to the corresponding virtual-machine CMS 220A-N via the I/O driver 218 and/or using another communication mechanism.

In some embodiments, the cache provisioner module 214 is configured to maintain mappings between virtual machines 208A-N and respective cache storage locations allocated to the virtual machines 208A-N. The mappings may be used to secure cache data of the virtual machines 208A-N (e.g., by limiting access to the virtual machine 208A-N mapped to the cached data) and/or to provide for retaining and/or transferring cache data of one or more virtual machines 208A-N transferred from the host 202 to other, remote hosts.

The CMS 220A-N may be configured to maintain cache metadata, which may comprise cache tags 221A-N in accordance with the cache storage that has been allocated to the virtual machine 208A-N. As used herein, a "cache tag" refers to an association between an identifier and a cache resource (e.g., a page or other cache storage location in the cache storage 216). Accordingly, the cache tags 221A-N may represent cache resources that have been allocated to a particular virtual machine 208A-N by the cache provisioner module 214. As used herein, an "identifier" of a cache tag 221A-N refers to an identifier used by the virtual machine 208A-N to reference data that has been (or will be) stored in the cache storage 216. A cache tag identifier may include, but is not limited to: an address (e.g., a memory address, physical storage address, logical block address, etc., such as an address on the primary storage system 212), a name (e.g., file name, directory name, volume name, etc.), a logical identifier, a reference, or the like.

In some embodiments, the cache tags 221A-N represent a "working set" a virtual machine 208A-N cache. As used herein, a "working set" of cache tags 221A-N refers to a set of cache tags corresponding to cache data that has been admitted and/or retained in the cache storage 216 by the CMS 220A-N through, inter alia, the application of one or more cache policies, such as cache admission policies, cache retention and/or eviction policies (e.g., cache aging metadata, cache steal metadata, least recently used (LRU), "hotness" and/or "coldness," and so on), cache profiling information, file- and/or application-level knowledge, and the like. Accordingly, the working set of cache tags 221A-N may represent the set of cache data that provides optimal I/O performance for the virtual machine 208A-N under certain operating conditions.

In some embodiments, the CMS 220A-N may be configured to preserve a "snapshot" of cache state, which may comprise persisting the cache tags 221A-N (and/or related cache metadata) in a non-volatile storage medium, such as the primary storage system 212, persistent cache storage device (e.g., cache storage 216), or the like. A snapshot may comprise all or a subset of the cache metadata of the CMS 220A-N (e.g., cache state), which may include, but is not limited to: the cache tags 221A-N, related cache metadata, such as access metrics, and so on. In some embodiments, a snapshot may further comprise "pinning" data in the cache storage 216, which may cause data referenced by the one or more cache tags 221 to be retained in the cache storage 216. Alternatively, the snapshot may reference only the data identifiers (e.g., cache tags 221A-N), and may allow the underlying cache data to be removed and/or evicted from the cache storage 216.

The CMS 220A-N may be configured to load a snapshot from persistent storage, and to use the snapshot to populate the cache tags 221A-N. A snapshot may be loaded as part of an initialization operation (e.g., cache warm up) and/or in response to configuration and/or user preference. For example, the CMS 220A-N may be configured to load different snapshots that are optimized for particular application(s) and/or service(s). Loading a snapshot may further comprise requesting cache storage from the cache provisioner module 214, as disclosed herein. In some embodiments, the CMS 220A-N may load a subset of a snapshot if the virtual machine 208A-N cannot allocate sufficient cache space for the full snapshot.

The CMS 220A-N may be further configured to retain the cache tags 221A-N in response to relocating and/or transferring the virtual machine 208A-N to another host. Retaining the cache tags 221 may comprise maintaining the cache tags 221A-N in the memory of the virtual machine 208A-N and/or not invalidating the cache tags 221A-N. Retaining the cache tags 221A-N may further comprise requesting cache storage from the cache provisioner module 214 of the destination host in accordance with the retained cache tags 221A-N, and/or selectively adding and/or removing cache tags 221A-N in response to being allocated more or less cache storage on the destination host. In some embodiments, the CMS 220A-N may retain the cache tags 221A-N despite the fact that the cache data referenced by the cache tags 221A-N does not exist in the cache storage 216 of the new destination host. As disclosed in further detail below, the virtual machine cache 213 may be configured to populate the cache storage 216 with cache data from a previous host 202 of the virtual machine 208A-N (e.g., via a network transfer), and/or from a shared, primary storage 212 system.

The cache storage 216 may comprise one or more non-volatile storage resources, such as a solid-state storage device and/or a portion thereof. The virtual machine cache 213 may logically partition the cache storage 216 into multiple chunks. As used herein a "chunk" refers to an arbitrarily sized portion of cache storage capacity; the cache storage 216 may be divided into any number of chunks having any size. Each cache chunk may comprise a plurality of pages, each of which may comprise one or more storage units (e.g., sectors). In a particular embodiment, each chunk may comprise 256 MB (megabytes) of storage capacity; a 2 TB (terabyte) cache storage device 216 divided into 256 MB chunks may comprise 8384 chunks.

The cache provisioner module 214 may provision cache resources to virtual machines 208A-N based upon, inter alia, the cache requirements of the virtual machines 208A-N, availability of cache resources, and so on. The cache resources allocated to a particular virtual machine 208A-N may change over time in accordance with the operating conditions of the virtual machine 208A-N. The cache provisioner module 214 may provision cache chunks to a virtual machine 208A-N, which may determine the cache capacity of that virtual machine 208A-N. For example, if two 256 MB chunks are assigned to a specific virtual machine 208A-N, that virtual machine's cache capacity is 512 MB. The cache provisioner module 214 may be further configured to provision cache resources to other entities, such as the de-duplication cache 260 (e.g., cache resources 269).

In some embodiments, cache resources are provisioned using a "thin provisioning" approach. A thin provisioning approach may be used where the virtual machines 208A-N are configured to operate with fixed-size storage resources and/or changes to the reported size of a storage resource would result in error condition(s). The cache storage device 216 may be represented within the virtual machines 208A-N as a fixed-size resource (e.g., through a virtual disk or other I/O interface, such as the I/O driver 218 of FIG. 1A). The cache provisioner module 214 may dynamically allocate cache resources to the virtual machines 208A-N in accordance with changing I/O conditions. Regardless of the number of cache chunks actually allocated to a particular virtual machine 208A-N, the cache storage interface may appear to remain at a constant, fixed size, which may allow for dynamic cache reallocation without causing error conditions within the virtual machines 208A-N.

The virtual machine cache 213 may comprise a cache interface module 223 configured to manage access to the virtual machine cache 213. The cache interface module 223 may provide one or more communication links and/or interfaces 124 through which the virtual machine cache 213 may service I/O requests for the virtual machines 208A-N, communicate configuration and/or allocation information, and so on. In some embodiments, the cache interface module 223 is configured to communicate with the virtual machines 208A-N through a virtual disk and/or using Virtual Logical Unit Number (VLUN) driver 215. The VLUN driver 215 may be further configured to provide a communication link 124 between the virtual machines 208A-N and the virtual machine cache 213.

The VLUN driver 215 may be further configured to provide for representing dynamically provisioned cache resources as fixed-size VLUN disks 235A-N within the virtual machines 208A-N. In an exemplary embodiment, the cache storage 216 may comprise two terabytes (2 TB) of storage capacity. The cache provisioner 214 may allocate four gigabytes (4 GB) to the virtual machine 208A, one gigabyte (1 GB) to virtual machine 208B, three gigabytes (3 GB) to virtual machine 208N, and so on. As disclosed above, other virtual machines 208B-N on the host 202 may be allocated different amounts of cache resources, in accordance with the I/O requirements of the virtual machines 208B-N and/or the availability of cache resources. The VLUN driver 215 and VLUN disk 235A-N may be configured to represent the entire capacity of the cache device 216 to the virtual machines 208A-N (e.g., 2 TB) regardless of the actual allocation to the particular virtual machine 208A-N by the cache provisioner module 214. In addition, and as disclosed in further detail below, the physical cache resources 224A-N allocated to the virtual machine 208A may be discontiguous within the physical address space of the cache storage 216. The virtual machine cache 213 may further comprise a map module 217 configured to present the cache resources allocated to the virtual machines 208A-N as a contiguous range of virtual cache addresses, regardless of the location of the underlying physical storage resources.

In some embodiments, the CMS 220A-N comprises an I/O driver 218A-N configured to monitor and/or filter I/O requests of the corresponding virtual machine 208A-N. The I/O driver 218A-N may be configured to forward the I/O requests to the CMS 220A-N, which may selectively service the I/O requests by use of the virtual machine cache 213. The I/O driver 218A-N may comprise a storage driver, such as a Windows Driver, or other storage driver adapted for use an operating system and/or operating environments. The I/O driver 218A-N may be configured to monitor requests within an I/O and/or storage stack of the virtual machine 208A-N. In some embodiments, the I/O driver 218A-N may further comprise an I/O filter 219A-N configured to monitor and/or service I/O requests directed to primary storage 212 (and/or other storage resources). I/O requests directed to the primary storage system 212 may be serviced directly at the primary storage system 212 (non-cached) or may be serviced using the virtual machine cache 213, as disclosed herein.

The I/O filter 219A-N may comprise a SCSI filter configured to manage data transfers between physical and virtual entities (e.g., primary storage system 212, VLUN disk 235A-N, and/or the virtual machine cache 213). The I/O filter 219A-N may be configured to identify the VLUN disk 235A-N within the virtual machine 208A-N, and manage capacity changes implemented by, inter alia, the cache provisioning module 214 (via the VLUN driver 215). As disclosed above, the VLUN disk 235A-N may be a virtual disk configured to represent dynamically allocated cache resources within the virtual machines 208A-N as fixed-size storage resources. The VLUN disk 235A-N may be configured to report a fixed storage capacity to the operating system of the virtual machine 208A-N rather than the actual, dynamic cache capacity allocated to the virtual machine 208A. Accordingly, the cache provisioner 214 may be configured to dynamically provision cache storage to/from the virtual machines 208A-N (through the VLUN disks 235A-N) without adversely affecting the virtual machines 208A-N.

As disclosed above, virtual machines 208A-N may be transferred between hosts 202, without powering down and/or resetting the virtual machine 208A-N. Such transfer operations may be simplified when the virtual machines 208A-N reference shared resources, since the virtual machines 208A-N will be able to access the same resources when transferred. However, virtual machines 208A-N that reference "local" resources (e.g., resources only available on the particular host), may be prevented from being transferred.

In the FIG. 1A embodiment, the CMS 220A-N may be configured to access the virtual machine cache 213 through the VLUN disk 235A-N configured to appear as a "shared device" to the virtualization kernel 210 (and/or a device that does not prevent virtual machines 208A-N from being transferred between hosts 202). The VLUN disk 235A-N be provided in a "Virtual Machine Disk Format" (VMDK) supported by the host 202 and/or virtualization kernel 210. The I/O filter may further provide for communicating other data, such as configuration, command, and/or control data (e.g., performing a handshake protocol with the virtual machine cache 213). The virtual disk may be represented as a VLUN disk 235 implemented according to the VMDK format of the host 202 and/or virtualization kernel 210. The virtual disk may be relatively small (e.g., a few megabytes), since the virtual disk is not used for storage, but as a conduit for communication between the virtual machine 208 and the virtual machine cache 213 in the virtualization kernel 210. Alternatively, or in addition, the VLUN disk 235A-N may be hidden from other applications and/or operating systems of the virtual machine 208A-N and/or may be presented to the virtual machine 208A-N as a read-only storage resource, and as such, the operating system of the virtual machine 208A-N may prevent other applications from attempting to write data thereto.

The virtual machines 208A-N may be configured to emulate shared storage in other ways. For example, in some embodiments, the virtual machines 208A-N may be configured to replicate one or more "shared" VLUN disks across a plurality of hosts 202, such that, to the hosts, the VLUN disks appear to be shared devices. For instance, the VLUN disks may share the same serial number or other identifier. The host 202 and/or the virtualization kernel 210 may, therefore, treat the VLUN disks as shared devices, and allow virtual machines 208A-N to be transferred to/from the host 202. The VDMK approach disclosed above may provide advantages over this approach, however, since a smaller number of "shared" disks need to be created, which may prevent exhaustion of limited storage references (e.g., a virtual machine may be limited to referencing 256 storage devices).

The cache provisioner module 214 may report the actual physical cache storage allocated to the virtual machine 208A via a communication link 124. The communication link 124 may operate separately from I/O data traffic between the VLUN driver 215 and the I/O filter 219A-N. Thus, asynchronous, out-of-band messages may be sent between the VLUN driver 215 and the I/O filter 219A-N. The cache provisioner module 214 may use the communication path 124 to dynamically re-provision and/or reallocate cache resources between the virtual machines 208A-N (e.g., inform the virtual machines 208A-N of changes to cache resource allocations). The I/O driver 218A-N may report the allocation information to the CMS 220A-N, which may use the allocation information to determine the number of cache tags 221A-N available to the virtual machine 208A-N, and so on.

As disclosed above, the cache resources allocated to a virtual machine 208A-N may be represented by cache tags 221A-N. The cache tags 221A-N may comprise, inter alia, mappings between I/O addresses of a virtual machine 208A-N and storage locations within the cache storage 216 (e.g., physical addresses of cache pages). A cache tag 221 may, therefore, comprise a translation and/or mapping between an identifier (e.g., a storage I/O address, logical identifier, LBA, or the like) used by a virtual machine 208A-N and a cache resource (e.g., a cache chunk, page, or the like). In some embodiments, cache tags 221A-N are configured to have a linear 1:1 correspondence with physical cache pages, such that each cache tag 221A-N represents a respective page within the cache storage 216. The cache tags 221A-N may be organized linearly in RAM or other memory within the virtual machines 208A-N (as in FIG. 1A) and/or virtualization kernel 210 (as in FIG. 1B, disclosed in further detail below). The linear organization may allow the memory address of a cache tag 221A-N to be used to derive an identifier and/or address of a corresponding storage location within the cache storage 216. Alternatively, or in addition, cache tags 221A-N may be organized into other data structures, such as hashtables, indexes, trees, or the like and/or may comprise separate cache address metadata.

Cache tags 221A-N may comprise cache metadata, which may include, but is not limited to: a next cache tag index, cache state, access metrics, checksum, valid map, a virtual machine identifier (VMID), and so on. The next tag index may comprise a link and/or reference to a next cache tag 221A-N. The cache state may indicate a current state of the cache tag 221A-N. As disclosed in further detail below, the state of a cache tag 221A-N may indicate whether the cache tag 221A-N corresponds to valid data, is dirty, and so on. The access metrics metadata may indicate usage characteristics of the cache tag 221A-N, such as a last access time, access frequency, and so on. A checksum may be used to ensure data integrity; the checksum may comprise a checksum of the cache data that corresponds to the cache tag 221A-N. The size of the checksum of the cache tags 221A-N may vary based on the size of the cache pages and/or the level of integrity desired (e.g., a user can obtain a higher level of integrity by increasing the size of the checksum). The valid unit metadata may identify portions of a cache page that comprise valid cache data. For example, a cache page may comprise a plurality of sectors, and the valid unit may indicate which sectors comprise valid cache data and which correspond to invalid and/or non-cached data.

In some embodiments, cache tags 221A-N may further comprise a VMID, which may be configured to identify the virtual machine 208A-N to which the cache tag 221A-N is allocated. Alternatively, ownership of the cache tag 221A-N may be determined without an explicit VMID. As depicted in FIG. 1A, ownership of cache tags 221 may be determined by the virtual machine 208A-N in which the cache tags 221 are stored. Referring to FIG. 1B, cache tags of one or more virtual machines 208B-N may be maintained outside of the respective virtual machines 208B-N (e.g., within the virtualization kernel 210). In this embodiment, CMS 120 may be configured to associate cache tags 221B-N and/or ranges and/or groups of cache tags 221B-N with particular virtual machines 208B-N by use of, inter alia, a VMID field.

A cache tag 221A-N may be in one of a plurality of different states (as indicated by the cache tag state field of the cache tag 221A-N), which may include, but are not limited to: a free state, an invalid state, a valid state, a read pending state, a write pending state, and a depleted state. A cache tag 221A-N may be initialized to a free state, which indicates that the cache tag 221A-N is not currently in use. The cache tag 221A-N transitions from a free state to a write pending state in response to a cache write and/or cache read update operation (a write to the cache caused by a read miss or the like). The cache tag 221A-N transitions to a valid state in response to completion of the cache write. The cache tag 221 may revert to the write pending state in response to a subsequent write and/or modify operation. The cache tag 221A-N transitions to a read pending state in response to a request to read data of the cache tag, and reverts to the valid state in response to completion of the read. The cache tag 221A-N may transition to the invalid state in response to an attempt to perform a write operation while the cache tag 221A-N is in the read pending or write pending state. The cache tag 221A-N transitions from the invalid state to the free state in response to completing the write or read update. A cache tag 221A-N transitions to the depleted state in response to failure of a read or write operation (e.g., from the read pending or write pending state).

In some embodiments, cache tags 221A-N may further comprise a pinned state indicator. Cache tags 221A-N that are pinned may be protected from being evicted from the cache storage 216, allocated to another virtual machine 208A-N, or the like. Pinning cache tags 221A-N may also be used to lock a range of cache addresses. In certain situations, a portion of data associated with a read operation is available in the cache storage 216, but a portion is not available (or not valid), resulting in a partial cache hit. The CMS 220A-N may determine whether to retrieve all of the data from the primary storage system 212 or retrieve a portion from the cache storage 216 and the remainder from the primary storage system 212, which may involve more than one I/O to the primary storage system 212.

In certain embodiments, the CMS 220A-N is configured to manage a partial cache miss to minimize the number of I/O requests forwarded on to the primary storage system 212. In addition to managing partial cache miss I/O requests, the CMS 220A-N mitigates the amount of fragmentation of I/Os to primary storage based on I/O characteristics of the I/O requests. Fragmentation of I/Os (also known as I/O splitting) refers to an I/O request that crosses a cache page boundary or is divided between data that resides in the cache and data that resides on the primary storage. The I/O characteristics may include whether the I/O is contiguous, the size of the I/O request, the relationship of the I/O request size to the cache page size, and the like. In affectively managing partial cache hits and fragmentation of I/O requests, the CMS 220A-N may coalesce I/O requests for non-contiguous address ranges and/or generate additional I/O requests to either the virtual machine cache 213 or the primary storage 212.

As disclosed above, the CMS 220A-N may be configured to snapshot a group of cache tags 221A-N, which may comprise storing the cache tags 221A-N to persistent storage. The cache tags 221A-N may be retrieved from the persistent storage when the virtual machine 208A-N "warms up" (e.g., reboots, power cycles, etc.). The cache data associated with the cache tags 221A-N may have been pinned within the cache storage 216, and as such, may be immediately available. Alternatively, the cache storage 216 may be populated from the primary storage system 212 (or other data source), to thereby recreate the full working set.

Figure 2:
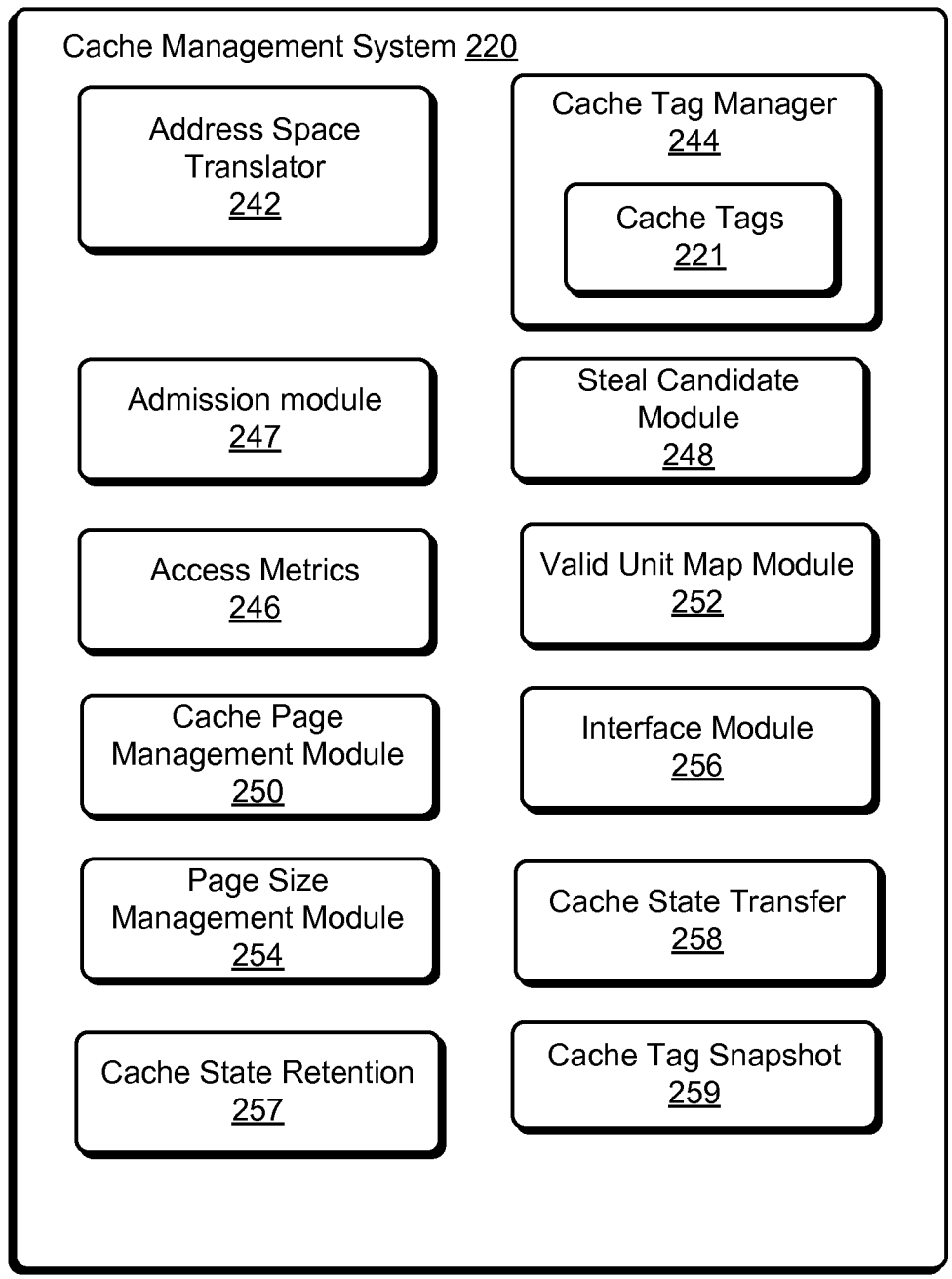
FIG. 2 depicts one embodiment of a cache management system.

FIG. 2 is a block diagram depicting one embodiment of a CMS 220. The CMS 220 may be configured to operate within a virtual machine 208A-N and/or within a virtual machine cache 213 (e.g., within the virtualization kernel 210 of the host 202, as depicted in FIG. 1B). The CMS 220 may comprise one or more modules, including an address space translator 242, a cache tag manager 244, a clock sweep module 246, a steal candidate module 248, a cache page management module 250, a valid unit map module 252, a page size management module 254, an interface module 256, a cache state retention module 257, a cache state transfer module 258, and a cache tag snapshot module 259.

In some embodiments, the address space translator 242 is configured to correlate cache tag identifiers of a virtual machine 208A-N with cache storage locations (e.g., cache addresses, cache pages, etc.). In embodiments in which the CMS 220 is implemented within a virtual machine 208A-N (as depicted in FIG. 1A), the cache tag identifier may comprise logical addresses and/or identifiers of the data (e.g., the address of the data in the primary storage system 212). In embodiments in which the CMS 220 is implemented within the virtualization kernel 210 (as depicted in FIG. 1B), the cache tag identifier may comprise a block address associated with the data and/or a storage address as identified within the storage stack 211 of the virtualization kernel 210.

The cache tag manager 244 may be configured to manage the cache tags 221 allocated to one or more virtual machines 208A-N, which may comprise maintaining associations between virtual machine identifiers (e.g., logical identifiers, address, etc.) and data in the cache storage 216. The cache tag manager 244 may be configured to dynamically add and/or remove cache tags 221 in response to allocation changes made by the cache provisioner module 214. In some embodiments, the cache tag manager 244 is configured to manage cache tags 221 of a plurality of different virtual machines 208A-N. The different sets of cache tags 221 may be maintained separately (e.g., within separate datastructures and/or in different sets of cache tags 221) and/or in a single data structure.

The access metrics module 246 may be configured to determine and/or maintain cache access metrics using, inter alia, one or more clock hand sweep timers, or the like. The steal candidate module 248 may be configured to identify cache data and/or cache tags that are candidates for eviction based on access metrics and/or other cache policy (e.g., least recently used, stateness, sequentiality, etc.), or the like.

The cache page management module 250 may be configured to manage cache resources (e.g., cache page data) and related operations. The valid unit map module 252 may be configured to identify valid data stored in cache storage 216 and/or a primary storage system 212. The page size management module 254 may be configured to perform various page size analysis and adjustment operations to enhance cache performance, as disclosed herein. The interface module 256 may be configured to provide one or more interfaces to allow other components, devices, and/or systems to interact with the CMS 220, which may include, but is not limited to: modifying the number and/or extent of cache tags 221 allocated to a virtual machine 208A-N, querying and/or setting one or more configuration parameters of the CMS 220, accessing cache tags 221 (e.g., for a snapshot, checkpoint, or other operation), or the like.

The cache state retention module 257 may be configured to retain the portions of the cache state of the CMS 220, which may include the cache tags 221, de-duplication index (disclosed below), and so on, in response to transferring the virtual machine 208A-N to a different host. As disclosed above, the cache tags 221 may represent a working set of the cache of a particular virtual machine 208A-N, which may be developed through the use of one or more cache admission and/or eviction policies (e.g., the access metrics module 246, steal candidate module 248, and so on), in response to the I/O characteristics of the virtual machine 208, and/or the applications running on the virtual machine 208A-N.

The CMS 221 may develop and/or maintain a working set for the cache using inter alia a file system model. The cache storage 216 may comprise one or more solid-state storage devices, which may provide fast read operations, but relatively slow write and/or erase operations. These slow write operations can result in significant delay when initially developing the working set for the cache. Additionally, the solid-state storage devices comprising the cache storage 216 may have a limited lifetime (a limited number of write/erase cycles). After reaching the "write lifetime" of a solid-state storage device, portions of the device become unusable. These characteristics may be taken into consideration by the CMS 220 in making cache admission and/or eviction decisions.

The cache state transfer module 258 may be configured to transfer portions of the cache state of the virtual machine 208A-N between hosts 202 and/or to persistent storage (e.g., in a snapshot operation). The cache state transfer module 258 may comprise transferring cache tags 221 maintained in the virtualization kernel, to a remote host and/or non-volatile storage.

The cache tag snapshot module 259 may be configured to maintain one or more "snapshots" of the working set of the cache of a virtual machine 208A-N. As disclosed above, a snapshot refers to a set of cache tags 221 and/or related cache metadata at a particular time. The snapshot module 259 may be configured to store a snapshot of the cache tags 221 on a persistent storage medium and/or load a stored snapshot into the CMS 220.

The cache provisioner module 214 may be configured to maintain mappings between virtual machines and the cache resources allocated to the virtual machines 208A-N. The cache provisioner module 214 may implement mappings that can be dynamically changed to re-allocate cache resources between various virtual machines 208A-N. The mappings may be further configured to allow the cache provisioner to represent dynamically allocated cache resources to the virtual machines 208A-N as contiguous ranges of "virtual cache resources," independent of the underlying physical addresses of the cache storage 216.

Figure 3A:
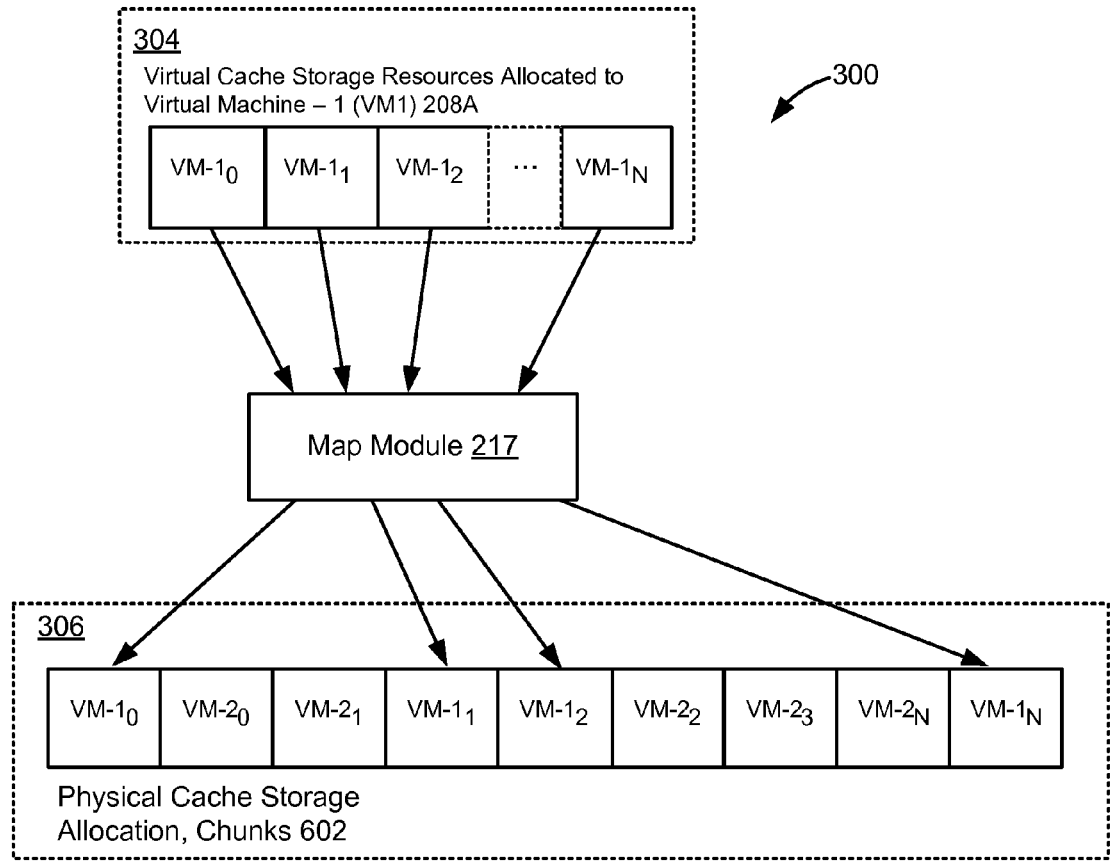
FIG. 3A depicts embodiments of virtual cache resource mappings.

As illustrated in FIGS. 1A and 1B, the cache provisioner module 214 may be configured to allocate cache resources to the virtual machines 208A-N within the cache storage 216. Resources 224A may be allocated to virtual machine 208A, resources 224B may be allocated to virtual machine 208B, resources 224N may be allocated to virtual machine 208N, and so on. The cache provisioner 214 may be further configured to allocate cache resources 269 for de-duplication caching services, which may comprise allocating cache resources 269 to the de-duplication cache 260. As disclosed in further detail herein, the de-duplication cache 260 may be configured to cache data accessible to two or more of the virtual machines 208A-N. Although the cache resources 224A-N allocated to the virtual machines 208A-N (and the cache resources 269 allocated to the de-duplication cache 260) are depicted as contiguous ranges of physical addresses within the cache storage 216, the disclosure is not limited in this regard. As illustrated in FIG. 3A below, the cache resources 224A-N and/or 269 may be interleaved, fragmented, and/or discontiguous within the physical address space of the cache storage 216. The map module 217 may be configured to provide for representing the resources 224A-N and/or 269 as contiguous ranges of virtual cache resources comprising, inter alia, contiguous ranges of virtual cache addresses.

Referring to FIG. 3A, in some embodiments, the cache provisioner module 214 may be configured to allocate "virtual cache storage resources" to the virtual machines 208A-N. As used herein, a "virtual cache resource" refers to an indirect, logical, and/or virtual reference to a physical cache address. Virtual cache resources may be mapped to actual, physical cache storage locations by a map module 217, which may comprise mappings and/or associations between dynamically allocated virtual cache resources (e.g., virtual cache addresses) and physical storage locations within the cache storage 216. The map module 217 may enable the cache provisioner 214 to allocate contiguous ranges of virtual cache resources to virtual machines 208A-N, despite the fact that the underlying physical storage resources are discontiguous within the physical address space of the cache storage 216.

In the FIG. 3A embodiment, virtual cache storage 304 is allocated to virtual machine 208A (VM-1). The virtual cache storage 304 may comprise a contiguous range of cache addresses or identifiers. As depicted in FIG. 3A, the virtual cache storage 304 comprises a contiguous range of cache chunks 302, including VM-10, VM-11, VM-12, through VM-1N. The physical cache storage resources actually allocated to VM-1 208A may not be contiguous and/or may be interleaved with cache resources that are allocated to other virtual machines 208B-N. As illustrated in FIG. 3A, the actual physical cache chunks 302 allocated to VM-1 208A comprise a discontiguous set of chunks VM-10, VM-11, VM-12, VM-1N within the physical address space 306 of the cache storage 216. The virtual address space of the virtual cache storage 304 may be independent of the underlying physical address space 306 of the cache storage 216. The chunks 302 in the physical address space 306 may be discontiguous and/or interleaved with chunks 302 that are allocated to other virtual machines 208B-N. Although FIG. 3A shows some of the different locations in a physical order, the cache chunks 302 allocated to the VM-1 208A may be located in a random order, in accordance with the availability of physical cache resources (e.g., available chunks 302). Moreover, the chunks 302 allocated to the VM-1 208A may be interleaved and/or fragmented with chunks 302 allocated to other virtual machines.

The map module 217 may be configured to map virtual cache resources (e.g., virtual cache addresses) 304 to physical cache resources in the physical address space 306 of the cache storage 216. In some embodiments, the map module 217 may comprise an "any-to-any" index of mappings between virtual cache addresses allocated to the virtual machines 208A-N and the physical cache addresses within the cache storage 216. Accordingly, the virtual cache addresses may be independent of the underlying physical addresses of the cache storage 216. The translation layer implemented by the map module 217 may allow cache tags 221A-N to operate within a contiguous virtual address space despite the fact that the underlying physical allocations 224A may be non-contiguous within the cache storage 216. Alternatively, in some embodiments, the mapping module 217 may be omitted, and the CMS 220A-N may be configured to directly manage physical cache addresses within the cache storage 216.

The map module 217 may be leveraged to secure data in the cache storage 216. In some embodiments, the virtual machine cache 213 may restrict access to data in the cache storage 216 to particular virtual machines 208A-N and/or may prevent read-before-write conditions. The cache provisioner module 214 may be configured to restrict access to physical cache chunks 302 to the virtual machine 208A-N to which the chunk 302 is allocated. For example, the cache chunk labeled VM-10 may only be accessible to the virtual machine 208A based on, inter alia, the mapping between VM-1 208A and the cache chunk VM-10 in the map module 217. Moreover, the indirect addressing of the map module 217 may prevent virtual machines 208A-N from directly referencing and/or addressing physical cache chunks 302 allocated to other virtual machines 208A-N.

As disclosed above, the virtual machine cache 213 may be configured to control access to data stored within the cache storage 216 by use of, inter alia, the cache provisioner module 214 and/or map module 217. In some embodiments, the CMS 220A-N and virtual machines 208A-N reference cache data by use of virtual cache addresses rather than physical addresses of the cache storage 216. Accordingly, the virtual machines 208A-N may be incapable of directly referencing the data of other virtual machines 208A-N. The cache provisioner module 214 may be further configured to allocate different, incompatible virtual cache addresses to different virtual machines 208A-N, such as virtual cache addresses in different, non-contiguous address ranges and/or address spaces. The use of different, incompatible ranges may prevent the virtual machines 208A-N from inadvertently (or intentionally) referencing virtual and/or physical cache resources of other virtual machines 208A-N.

Securing data may comprise preventing read-before-write conditions that may occur during dynamic cache resource provisioning. For example, a first virtual machine 208A may cache sensitive data within a cache chunk 302 that is dynamically reallocated to another virtual machine 208B. The virtual machine cache 213 may be configured to prevent the virtual machine 208B from reading data from the chunk 302 that were not written by the virtual machine 208B. In some embodiments, the cache provisioner 213 may be configured to erase cache chunks 302 in response to reassigning the chunks 302 to a different virtual machine 208A-N (or removing the association between a virtual machine 208A-N and the cache chunk 302). Erasure may not be efficient, however, due to the characteristics of the cache storage 216; erasing solid-state storage may take longer than other storage operations (100 to 1000 times longer than read and/or write operations), and may increase the wear on the storage medium. Accordingly, the virtual machine cache 213 may be configured to prevent read-before-write conditions in other ways. In some embodiments, for example, the virtual machine cache 213 may be configured to TRIM reallocated chunks 302 (e.g., logically invalidate the data stored on the chunks 302). Cache chunks 302 that are erased and/or invalidated prior to be reallocated may be referred to as "unused chunks." By contrast, a chunk 302 comprising data of another virtual machine 208A-N (and was not erased or TRIMed) is referred to as a "used" or "dirty chunk," which may be monitored to prevent read-before-write security hazards.

Figure 3B:
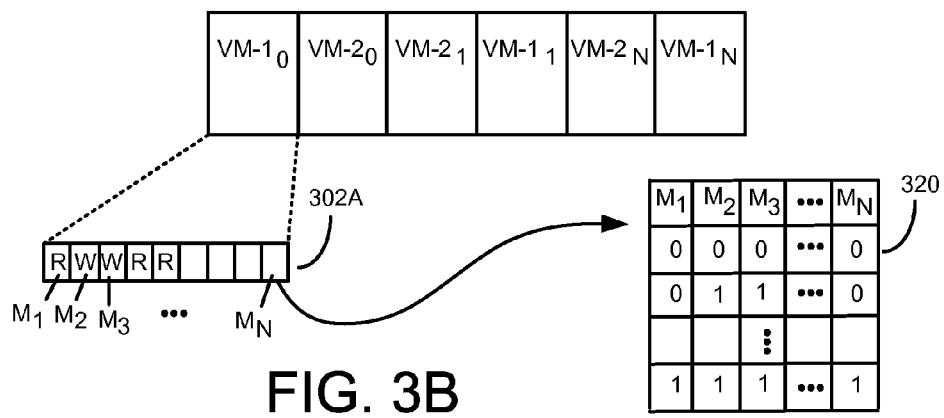
FIG. 3B depicts embodiments of monitoring metadata.

Referring to FIG. 3B, the virtual machine cache 213 may be configured to maintain monitoring state metadata pertaining to the cache chunks 302. The monitoring state metadata 320 may be persisted for use after a power cycle event. The monitoring state metadata 320 may comprise a bitmask. In some embodiments, each 4 kb sub-portion of a used chunk 302 is monitored to determine whether there has been a corresponding write. Monitoring metadata 320 may be generated in response to reallocating a used or dirty chunk 302 between virtual machines 208A-N. After reallocation, each sub-portion of the chunk 302 may be tested prior to read operations to ensure that the used chunk 302 has been written by the virtual machine 208A-N attempting to perform the read.

In the FIG. 3B embodiment, a chunk 302A is reallocated. The sub-portions of the chunk 302A are represented by references m1 through mN. An indication of a write operation may be reflected by a "1" in the monitoring metadata 320. The virtual machine cache 213 may be configured to prevent read operations on sub-portions that have not been written (e.g., are not marked with a "1").

Referring back to FIG. 1A, in some embodiments, the CMS 220A-N is configured to operate within the virtual machines 208A-N, and cache tags 221A-N and/or other cache metadata are maintained within the memory space of the respective virtual machines 208A-N. Storing the cache tags 221 (and other cache metadata) within the associated virtual machine 208A-N may allow the virtual machine 208A-N to easily determine whether data is available in the virtual machine cache 213 without having to access a different system or process (e.g., access the virtualization kernel 210). In such embodiments, the CMS 220 may manage cache operations using locally stored cache tags 221, which may increase the speed and efficiency of I/O operations. Additionally, the virtual machine 208A-N typically has available more detailed information regarding access characteristics than other, external processes and/or systems, and, as such, may be in a better position to make cache management decisions. For example, the virtual machine 208A-N may have access to contextual information pertaining to I/O requests, such as application- and/or file-level knowledge, which may be used to develop an effective working set of cache tags 221. Other systems that are external to the virtual machine 208A-N (e.g., operating within the virtualization kernel 210) may only have access to low-level I/O information. Thus, having the cache tags 221 stored locally in the virtual machine 208A-N may improve cache and/or I/O performance.

FIG. 1B depicts another embodiment of a system 101 for caching data in a virtualized environment. In the FIG. 1B embodiment, the CMS 220B-N of one or more of the virtual machines 208B-N may be implemented within the virtualization kernel 210 (e.g., outside of the corresponding virtual machines 208B-N). The virtual machines 208B-N may be "standard virtual machines" that do not comprise a separate CMS 220A or other cache-specific modules, components, and/or configuration (other than cache functionality provided as part of a standardized virtual machine and/or guest operating system of the virtual machine 208A-N. The system 101 may further comprise one or more virtual machines comprising a respective CMS 220A as in FIG. 1A, such as virtual machine 208A. The virtual machine cache 213 may be configured to provide caching services to the standard virtual machines 208B-N as well as the virtual machine 208A.

The virtual machine cache 213 may provide caching services to the virtual machine 208A through the cache interface module 223 as disclosed above, which may comprise representing cache resources as a VLUN disk 235A within the virtual machine 208A, monitoring I/O requests of the virtual machine 208A by use of the I/O driver 218A and/or filter 219A, and selectively servicing the monitored I/O requests by use of the VM cache 213 (via the communication link 124). The standard virtual machines 208B-N may access cache services differently. In some embodiments, I/O requests of the virtual machines 208B-N are handled within a storage stack 211. The storage stack 211 may comprise an I/O framework of the host 202 and/or virtualization kernel 210. The storage stack 211 may define a storage architecture in which storage services, such as file system drivers, volume drivers, disk drivers, and the like, are deployed. Storage services may be configured to interoperate by issuing and/or consuming I/O requests within various layers of the I/O stack 211. The cache interface module 223 may comprise an I/O driver 218X and/or filter driver 219X configured to monitor I/O requests of the virtual machines 208B-N in the storage stack 211. Selected I/O requests of the virtual machines 208B-N may be serviced using the virtual machine cache 213.

The virtual machine cache 213 may comprise a CMS 220X operating within the host 202 and/or virtualization kernel 210. The I/O driver 218X and/or filter driver 219X may be configured to direct I/O requests of the virtual machines 208B-N to the CMS 220X, which may selectively service the I/O requests, as disclosed herein. The CMS 220X may be configured to maintain cache metadata for the virtual machines 208B-N, including, inter alia, cache tags 221B-N. In some embodiments, the CMS 220X maintains the cache tags 221B-N in a single data structure. Alternatively, the cache tags 221B-N may be maintained separately and/or may be managed by separate instances of the CMS 220X.

As disclosed above, the cache provisioner 214 may be configured to provision cache storage resources to the virtual machines 208A-N. The cache provisions 214 may be configured to dynamically re-provision and/or reallocate cache resources in accordance with user preferences, configuration, and/or I/O requirements of the virtual machines 208A-N. The virtual machines 208A-N may have different I/O requirements, which may change over time due to, inter alia, changes in operating conditions, usage characteristics and/or patterns, application behavior, and the like. The cache resources available to the virtual machines 208A-N may vary as well due to, inter alia, virtual machines 208A-N being migrated to and/or from the host 202, virtual machines 208A-N coming on-line, virtual machines 208A-N becoming inactive (e.g., shut down, suspended, etc.), or the like. The cache provisioner 214 may, therefore, be configured to adjust the allocation of cache resources in response to I/O requirements of particular virtual machines 208A-N and/or the I/O characteristics and/or I/O load on the host 202 (due to other virtual machines 208A-N, other processes and/or services running on the host 202, and so on).

Figure 4:
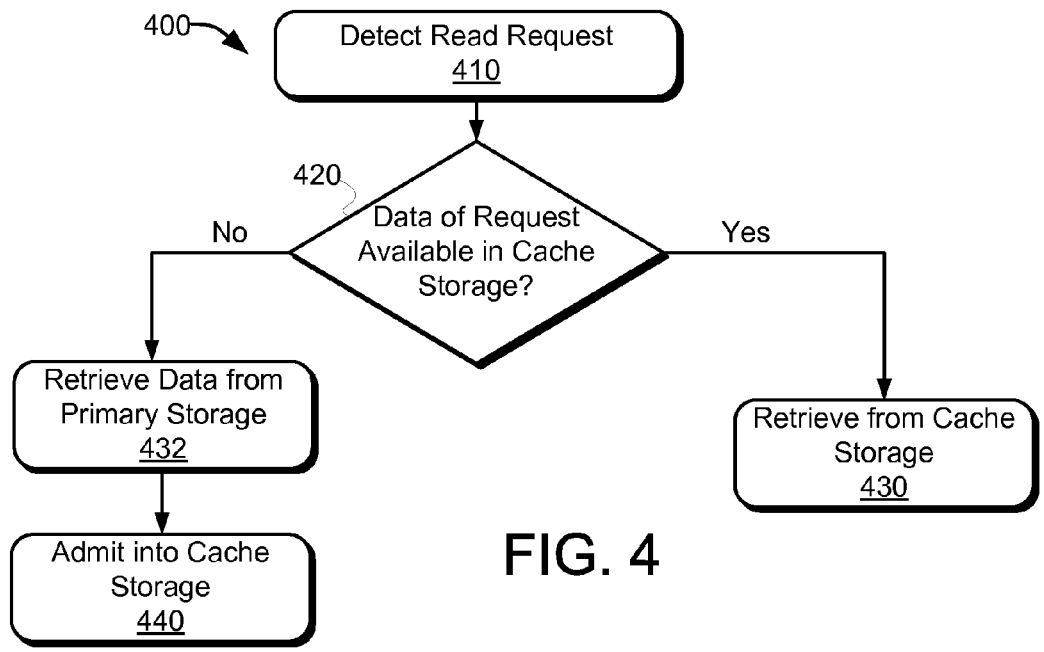
FIG. 4 is a flow diagram of one embodiment of a method for caching data in a virtualized environment.

FIG. 4 is a flow diagram of one embodiment of a method 400 for caching data in a virtualized environment. One or more of the steps of the method 400, and/or the other methods and/or processes described herein, may be embodied as machine- and/or computer-readable instructions stored on a storage medium. The instructions may be configured to cause a computing device to perform one or more of the steps of the method 400.

Step 410 may comprise detecting a request to perform a data read operation. The data read operation may be requested by a particular storage client, such as a virtual machine 208A-N. The request may be detected by an I/O driver 218A-N and/or I/O filter 219A-N operating within the virtual machine 208A-N (e.g., in close proximity to the virtual machine), as depicted in FIG. 1A. Alternatively, the request may be detected by an I/O driver 218X and/or I/O filter 219X operating within the virtualization kernel 210. Step 410 may further comprise communicating the request to the CMS 220A-N configured to operate within the virtual machine 208A-N and/or a CMS 220X operating within the virtualization kernel 210.

Step 420 may comprise determining whether data of the read operation is available in the cache storage 216. In some embodiments, step 420 comprises identifying a cache tag 221A-N that corresponds to the read request (e.g., identifying a cache tag 221A-N having an identifier that matches an identifier or address associated with the read request). If a cache tag 221A-N is available, and the cache tag 221A-N is valid and readable (e.g., in the valid state), the flow may continue at step 430; otherwise, the flow may continue at step 432.

Step 430 may comprise retrieving data of the read request from cache storage 216. Step 430 may, therefore, comprise servicing the read request by the virtual machine cache 213. Step 430 may further comprise updating cache metadata, such as clock hands data, access metrics, or the like. Retrieving the data may further comprise determining a physical address of the data within the cache storage 216 using the cache tag 221A-N identified at step 420. Step 430 may comprise mapping and/or translating a virtual cache address to a physical cache address, by use of a map module 217, as disclosed herein.

Step 432 may comprise retrieving the cache data from primary storage (e.g., from the primary storage system 212). Step 432 may further comprise determining whether the data should be admitted into the cache. This determination may be based on cache availability, admission policy, eviction policy, or the like. The CMS 220A-N may determine whether admitting the data would improve I/O performance of the virtual machine 208A-N and, if so, may admit the data into the cache storage 216. Admitting the data may comprise allocating one or more cache tags 221A-N, storing the data in the cache storage 216, and/or associating the physical storage location of the data with an identifier of the data by use of the allocated cache tags 221A-N.

Figure 5:
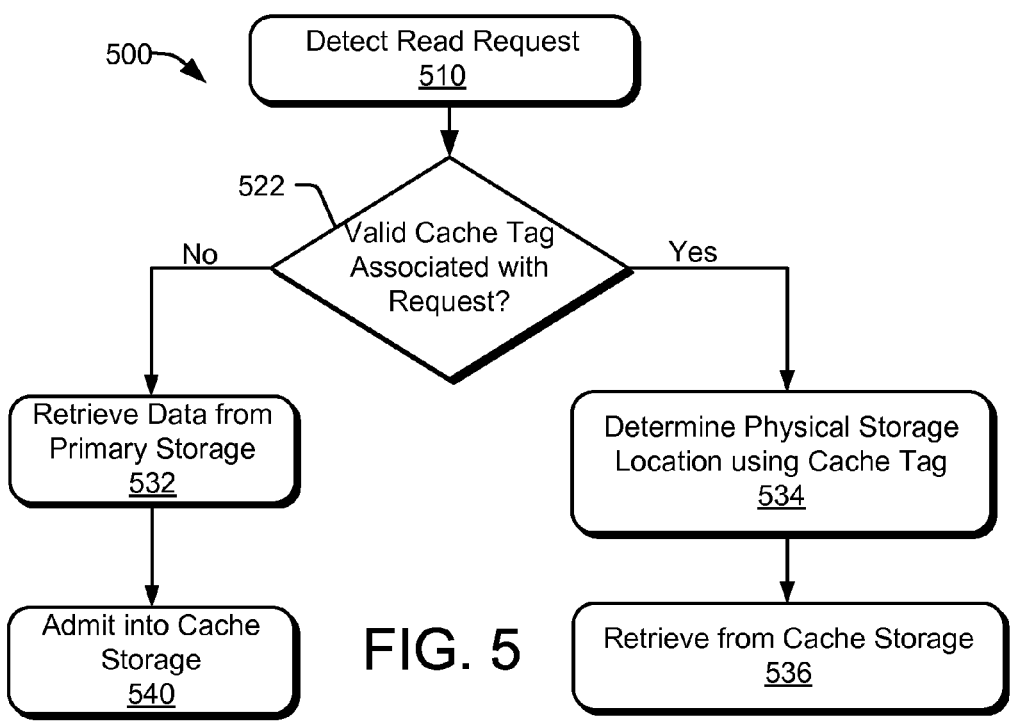
FIG. 5 is a flow diagram of another embodiment of a method for caching data in a virtualized environment.

FIG. 5 is a flow diagram depicting another embodiment of a method 500 for caching data in a virtualized environment. Step 510 may comprise detecting a read request, as described herein. Step 522 may comprise determining whether a valid cache tag 221A-N associated with the read request exists, as described above. If no valid cache tag 221A-N corresponding to the read request exists, the flow may continue to steps 532 and 540, which may comprise retrieving data of the request from the primary storage system 212 (or other storage resource) at step 532 and selectively admitting the data into the cache at step 540, as described above. If a cache tag 221 is identified at step 522, the flow continues to step 534, which may comprise determining a physical cache address of the data by use of the identified cache tag 221A-N. Step 536 may comprise retrieving data at the determined physical storage location within the cache storage 216.

Figure 6:
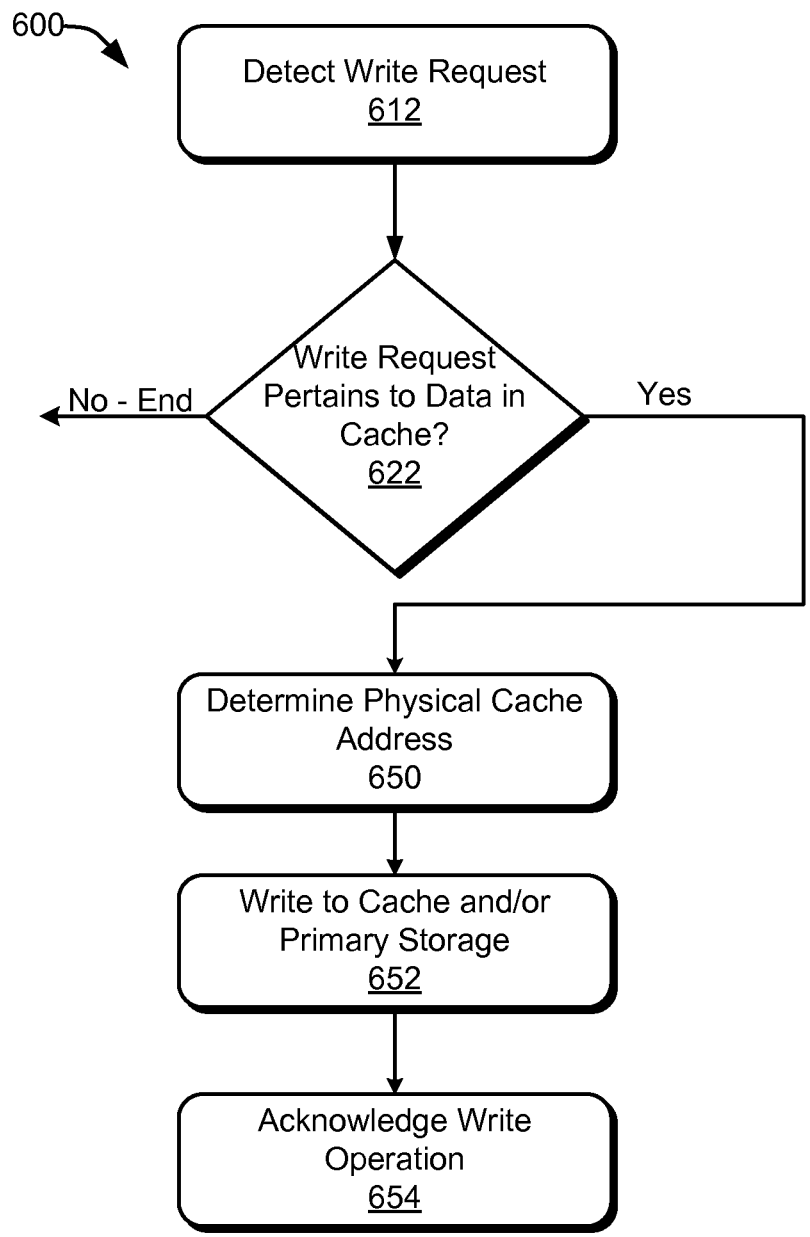
FIG. 6 is a flow diagram of another embodiment of a method for caching data in a virtualized environment.

FIG. 6 is a flow diagram of another embodiment of a method 600 for caching data in a virtualized environment. Step 612 comprises detecting a request to write data by a virtual machine 208A-N. The request of step 612 may be detected by use of an I/O driver 218 and/or filter 219 operating within the virtual machine 208A-N or within the virtualization kernel 210. The write request may be directed to a storage I/O address (e.g., an address and/or identifier of the primary storage system 212). As disclosed herein, the storage I/O address is translated to a physical address using the cache tags 221 of the CMS 220.

Step 622 may comprise determining whether the write request pertains to data in the cache, which may comprise identifying a cache tag 221 associated with the storage I/O address (or other identifier). If a cache tag 221A-N is identified at step 622, the flow continues to step 650, which may comprise determining a physical address of the data within the cache storage 216 using, inter alia, the identified cache tag 221A-N. Step 652 may comprise writing data of the write request to the identified physical storage location(s). Step 652 may further comprise writing the data to primary storage system 212 (in a write-through operation). In some embodiments, data is written to the cache storage 216 and the primary storage system 212 simultaneously in a "write-through" operation. Writing data to the primary storage system 212 may comprise allowing storage services of the virtualization layer 210 (and/or host 202) to write the data to the primary storage system 212. Step 654 may comprise acknowledging completion of the write request in response to writing the data to the primary storage system 212.

As disclosed above, cache may be cached in a write-through cache mode, in which data is written and/or modified on both the primary storage system 212 and the cache storage 216. A write completion is acknowledged after the write operation to the primary storage system 212 is completed, regardless of whether a corresponding write operation to the cache storage 216 has completed. In specific embodiments, cache write operations can be queued and completed as the cache speed allows. Thus, a cache storage 216 with a slow write speed (or a queue of pending write operations) does not degrade overall I/O performance. Cache tags 221 associated with incomplete or queued write operations are identified as "pending," (e.g., are set to a "write pending" state as disclosed above). After the write operation completes, the associated cache tag 221 transitions to a valid state. In some embodiments, attempts to read data of a cache tag 221 that is in a "pending" state results in a cache miss, causing retrieval of the requested data from the pending memory buffer associated with the I/O, or from the primary storage system 212, as described above.

Although a write-through cache mode is described herein, the disclosure is not limited in this regard and could be adapted to operate in any suitable cache mode including, but not limited to: write-back cache mode, read-through, write-behind, refresh-ahead, or the like. The embodiments disclosed herein may be further configured to cache data in a "write-never" cache mode, as disclosed in U.S. Provisional Patent Application Ser. No. 61/696,126, to Vikram Joshi et al., filed Aug. 31, 2012, and entitled, "Systems, Methods, and Interfaces for Adaptive Persistence," which is hereby incorporated by reference.

Figure 7:
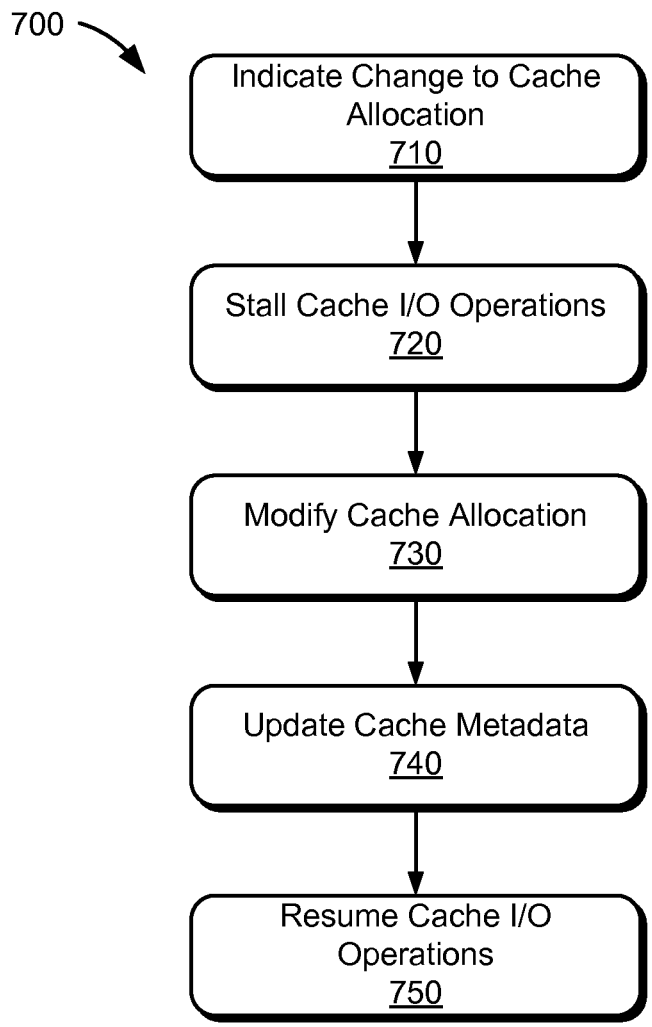
FIG. 7 depicts another embodiment of a method for caching data in a virtualized environment.

FIG. 7 is a flow diagram of another embodiment of a method 700 for caching data in a virtualized environment. In particular, the method 700 illustrates one embodiment of a method for dynamically provisioning cache resources to one or more virtual machines 208A-N. Step 710 may comprise the cache provisioner module 214 indicating to the CMS 220A-N that the cache storage space allocated thereto is to be modified (e.g., dynamically increased or decreased). Step 710 may be performed in response to the cache provisioner module 214 receiving a request for additional cache resources from CMS 220A-N, balancing cache resources between different virtual machines 208A-N, determining that the virtual machine 208A-N requires additional or fewer cache resources, and/or other cache resource provisioning policies.

Step 720 may comprise stalling cache I/O operations by the corresponding CMS 220A-N, which may comprise stopping I/O traffic between the virtual machine 208A-N and the virtual machine cache 213. Step 720 may comprise the VLUN driver 215 issuing a message to the CMS 220A-N (through the communication link 124) to stop sending I/O data traffic pertaining to the cache while the cache allocation is modified. Alternatively, or in addition, step 720 may comprise the I/O driver 218X and/or I/O filter 219X ignoring and/or holding I/O requests pertaining to the virtual machine 208B-N.

In some embodiments, step 720 comprises stalling the CMS 220A-N, which allows applications operating on the corresponding virtual machine 208A-N to continue to perform I/O operations independently of the virtual machine cache 213 (e.g., operate directly with the primary storage system 212 and/or other storage resources). The CMS 220A-N may be configured to invalidate cache tags 221A-N in response to write operations that occur while the CMS 220A-N is stalled. Step 720 may further comprise flushing any outstanding I/O requests directed to the virtual machine cache 213 before halting cache operations (e.g., waiting for any outstanding I/O data traffic to and from the virtual machine cache 213 to complete) and/or notifying the cache provisioner module 214 that the cache traffic has been halted.

Step 730 may comprise modifying the cache resources allocated to the CMS 220A-N. Step 730 may comprise modifying cache resource mappings implemented by the mapping module 217, which may include: allocating additional physical cache storage space to the virtual machine 208A in the cache device 216, associating physical cache resources with corresponding virtual cache addresses and/or resource identifiers (by use of the map module 217), removing associations between the virtual machine 208A and physical cache resources (e.g., if the cache allocation is being decreased), and so on. Step 730 may further comprise informing the CMS 220A-N that the cache resources allocated thereto have been resized, which may comprise providing an indication of the cache resources that have been allocated, providing identifiers of the cache resources allocated with the CMS 220A-N (e.g., a set of one or more virtual cache addresses, address range(s), or the like), and so on.

Step 740 may comprise updating cache metadata of the CMS 220A-N in accordance with the modifications of step 730. Step 740 may comprise modifying the cache tags 221 of the CMS 220A-N in accordance with the modifications of step 730; step 740 may comprise allocating additional cache tags 221A-N in response to being allocated additional cache resources and/or removing cache tags 221A-N in response to being allocated fewer cache resources. As described above, additional cache tags 221A-N may be allocated contiguously within a virtual cache address space and/or contiguous memory. Therefore, additional cache tags 221A-N may be appended to an existing, contiguous range of cache tags 221A-N, thereby preserving the existing working set of the virtual machine 208A-N during the resizing operation. Cache tags may 221A-N may be removed in contiguous ranges, which may allow the working set of the remaining cache tags 221 to be preserved.

Step 750 may comprise resuming cache I/O operations, which may comprise indicating that the modification(s) of steps 730 and/or 740 are complete, and instructing the CMS 220A-N to resume cache I/O operations. Step 750 may, therefore, comprise selectively servicing I/O operations of the virtual machine 208A-N using the virtual machine cache 213, as described herein.

As illustrated in FIGS. 1A and 1B, the host 202 may comprise a large number of virtual machines 208A-N. The virtual machines 208A-N may be deployed in a Virtual Desktop Infrastructure ("VDI") environment. As such, the virtual machines 208A-N may use many of the same files, such as operating system files, application files, data files, user profile information, and so on. The virtual machines 208A-N may access these files in a similar way. These commonalities can present I/O performance and redundancy problems. For example, when a large number of the virtual machines 208A-N boot, each may accesses a similar set of operating system files stored on the primary storage system 212 (or some other persistent storage). The resulting "boot storm" may overwhelm the primary storage system 212, which may significantly degrade the performance. Similar file access "storms" may occur in response to the virtual machines 208A-N loading applications, accessing shared data, accessing user profile information, executing a login process, and so on. Moreover, because the virtual machines 208A-N use identical or similar operating systems, applications, and/or files, the virtual machines 208A-N may cache duplicate data in the virtual machine cache 213, resulting in reduced cache availability and wasted cache resources.

The systems and methods for file-level de-duplication disclosed herein may be used to improve the I/O performance of the virtual machines 208A-N by, inter alia, caching a single copy of data for access by a plurality of virtual machines 208A-N. As depicted in FIGS. 1A and 1B, one or more of the virtual machines 208A-N may comprise a virtual machine de-duplication module (VMDM) 262A-N, which may be configured to identify data suitable for admission into a de-duplication cache 260. Data suitable for admission may include "stable" data that is used, or is likely to be used, by two or more virtual machines 208A-N. The two or more virtual machines may access a single copy of the cached data within the de-duplication cache 260. As used herein, "stable" data refers to data that is infrequently modified. Examples of stable data include, but are not limited to: read only data (e.g., static configuration data), operating system files (e.g., .sys files, .dll files, .so files, and so on); application files (e.g., .exe files, etc.); static data files, content files (e.g., .mpeg files, .html files, .jpg, and so on), and the like. Data admitted into the de-duplication cache 260 by the de-duplication cache manager 261 may be accessible to multiple virtual machines 208A-N. As such, in certain embodiments, the de-duplication cache 260 may be configured to operate in a "read-only" mode, meaning that after data is initially admitted into the de-duplication cache 260, the data may not be modified within the de-duplication cache 260 (or modified infrequently). Accordingly, data subject to frequent updates and/or changes may not be suitable for admission into the de-duplication cache 260.

The virtual machines 208A-N may access data in the de-duplication cache in lieu of accessing the primary storage system 212 and/or admitting separate copies of the data into the cache storage 216 (via respective CMS 220A-N of the virtual machines 208A-N), which may result in reduced I/O load on the primary storage 212, increased I/O performance, and more efficient use of the cache storage 216. In some embodiments, the virtual machines 208A-N may be configured to persist and/or transfer cache metadata pertaining to the de-duplication cache 260 such that the virtual machines 208A-N can access data admitted into the de-duplication cache 260 after reboot, restart, power-cycle, and/or migration operations, which may significantly ameliorate "boot storm" issues.

Figure 8:
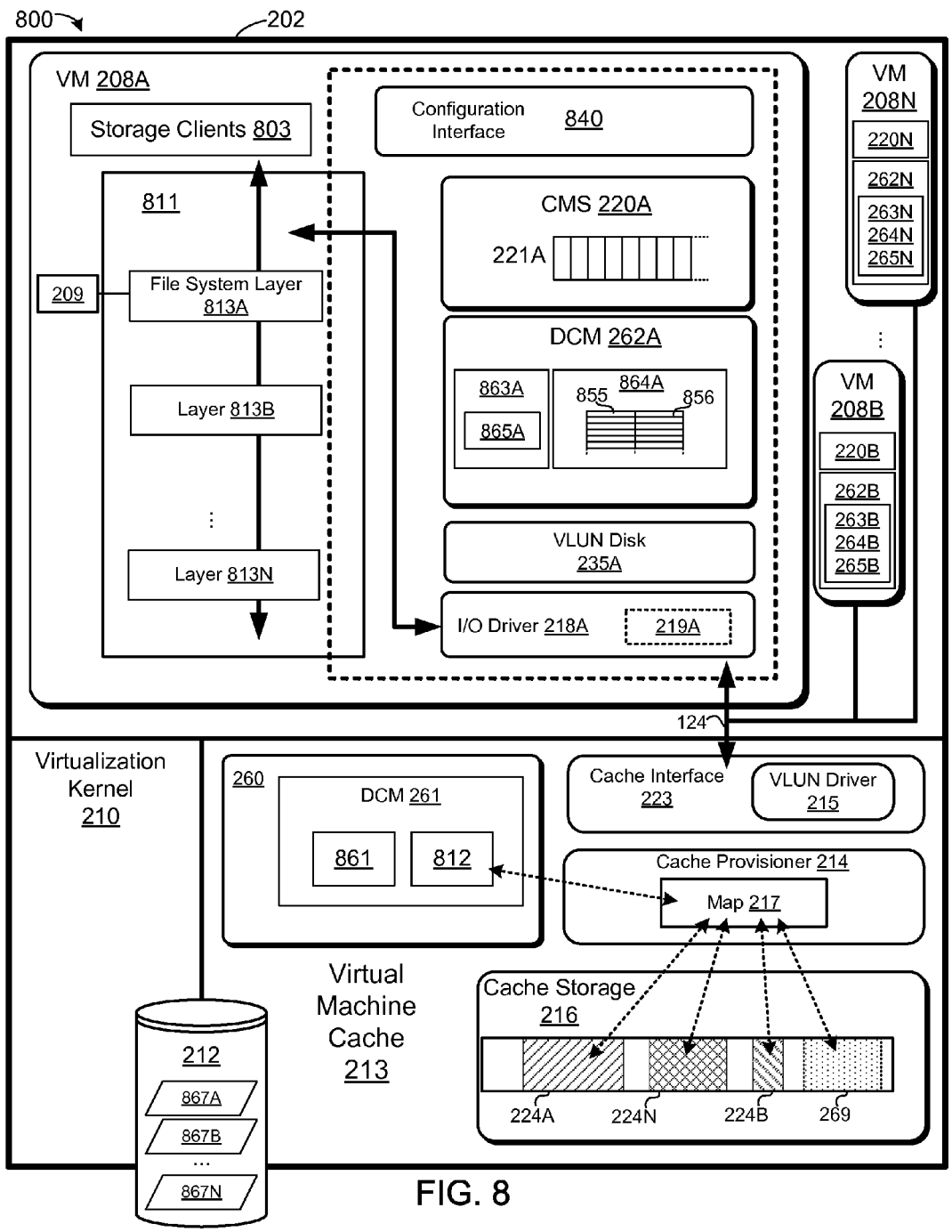
FIG. 8 depicts another embodiment of a system for de-duplication caching.

FIG. 8 is a block diagram of one embodiment of a system 800 for de-duplication caching. The system 800 may comprise a de-duplication cache 260 configured to be accessible to a plurality of virtual machines 208A-N. In some embodiments, the de-duplication cache 260 is accessible through the cache interface module 223, which may include a communication link 124 comprising the VLUN driver 215 and corresponding VLUN disks 235A-N (and I/O drivers 208A-N) within the virtual machines 208A-N, as disclosed herein.

In some embodiments, the de-duplication cache 260 is deployed outside of the virtual machines 208A-N (e.g., within the virtualization kernel 210 and/or host 202). Accordingly, the de-duplication cache 260 may comprise a module of the virtual machine cache 213, a service and/or process operating within the virtualization kernel 210 and/or host 202 (e.g., on a bare metal operating system of the host 202), or the like.

The cache provisioner 214 may be configured to allocate cache storage resources 269 within the cache storage 216 for the de-duplication cache 260, which may comprise allocating one or more chunks 302 to the de-duplication cache, as disclosed herein. The map module 217 may be configured to provide mappings between virtual cache resources managed by the de-duplication cache manager 261 and physical cache resources 269 allocated to the de-duplication cache 260 by the cache provisioner 214, as disclosed herein.

The cache provisioner 214 may allocate cache storage resources to the de-duplication cache 260 in the same way that cache resources are allocated to the virtual machines 208A-N. In some embodiments, the de-duplication cache 260 comprises a VLUN disk 235; the cache provisioner module 214 may be configured to dynamically re-provision and/or reallocate cache resources to/from the de-duplication cache 260 through the VLUN driver 215 and VLUN disk 235 as disclosed herein. Alternatively, the de-duplication cache 260 may be configured to access cache resources directly via the map module 217 and/or on the cache storage 216.

As depicted in FIG. 8, the host 202 may be configured to host a plurality of virtual machines 208A-N. One or more of the virtual machines 208A-N may comprise a CMS 220A-N. The CMS 220A-N may be configured to monitor I/O requests within the virtual machine 208A-N and selectively service the monitored I/O requests by use of the virtual machine cache 213 as disclosed herein. The CMS 220A-N may be configured to monitor I/O requests within a storage stack 811 of the virtual machine 208A-N. The CMS 220A-N may monitor I/O requests at various layers 813A-N of the storage stack 811 using the I/O driver 218A-N, filter driver 219A-N, or the like. The CMS 220A-N may comprise a multi-level and/or file-level cache configured to monitor I/O requests at various levels 813A-N of the storage stack 811 of the virtual machine 208A-N and to selectively service the I/O requests by use of the virtual machine cache 213. The CMS 220A-N may be configured to maintain layer-specific cache metadata pertaining to cache operations at each layer 813A-N. Further embodiments of file-level and multi-level caching are disclosed in U.S. patent application Ser. No. 13/287,998 to Joshi Vikram et al., filed Nov. 2, 2011, entitled, "Systems and Methods for a File-Level Cache," and which is hereby incorporated by reference.

The system 800 may comprise a VMDM 262A-N, which may be configured to identify data suitable for admission into the de-duplication cache 260. Data suitable for admission into the de-duplication cache 260 may include data that is used within multiple virtual machines 208A-N (e.g., operating system files, application files, and so on), and is "stable" (e.g., the data is rarely updated and/or modified). The VMDM 262A-N may be configured to identify data suitable for admission by monitoring I/O requests within the storage stack 811 of the virtual machine 208A-N using, inter alia, the I/O driver 218A-N, filter driver 219A-N, and/or other dedicated file I/O monitor modules (not shown). In some embodiments, the VMDM 262A-N may operate at a file-level of 813A the storage stack 811 and, as such, may be configured to monitor I/O requests pertaining to file operations.

The VMDM 262A-N may comprise a de-duplication policy module 263A-N configured to identify files suitable for admission into the de-duplication cache 260 based on, inter alia, de-duplication admission policy 865A-N. The de-duplication admission policy 865A-N may include file selection criteria, which may include, but is not limited to: file-name matching, extension matching, volume matching, disk matching, inclusion lists, exclusion lists, and the like. File selection criteria may further comprise dynamic and/or learned criteria. For example, in some embodiments, the de-duplication policy module 263A-N may be configured to monitor file I/O access patterns within the virtual machine 208A-N (access by various storage clients 803) to dynamically identify files suitable for admission into the de-duplication cache 213. For example, the de-duplication policy module 263A-N may be configured to monitor file access frequencies for one or more of write operations and read operations. Files subject to multiple read operations (and few, if any, write operations) may be selected for admission into the de-duplication cache. In some embodiments, the de-duplication admission policy 865A-N may select files for admission in response to properties of the I/O request, API calls, and/or other messages. For example, the I/O request issued by the storage client 803 may include flags and/or other metadata indicating that the corresponding data should be admitted into the de-duplication cache 260. Alternatively, or in addition, the VMDM 262A-N may be configured to receive de-duplication cache 260 admission configuration and/or hints through the configuration interface 840. The configuration interface 840 may be configured to receive de-duplication cache admission policy information through one or more of: dedicated APIs, block device interface calls, I/O requests, fadvise calls, IOCTL calls, and the like.

The de-duplication policy module 263A-N and/or CMS 220A-N may be configured to prevent data from being redundantly cached in multiple cache layers, which may comprise preventing data that has been admitted into the de-duplication cache 260 from being admitted into the virtual machine cache 213 by the CMS 220A-N. In some embodiments, the de-duplication policy module 263A-N may inform the CMS 220A-N of files that have been admitted into the de-duplication cache 260, and, in response, the CMS 220A-N may be configured to prevent data of the identified files from being admitted into the CMS 220A-N (e.g., the CMS 220A-N may be configured to ignore I/O requests pertaining to the identified files).

FIG. 9 depicts one embodiment of file-selection criteria 965. The file-selection criteria 965 may comprise pattern matching and/or wildcard criteria. As illustrated in FIG. 9, files having a ".sys" extension are identified as suitable for admission into the de-duplication cache 260, and files having a ".dat" extension should be excluded. The criteria 965 may identify suitable files based upon a volume and/or portions of a qualified file name. As illustrated in FIG. 9, files in a "windows\system32" or "\windows\system" path are suitable for de-duplication whereas files in the "working files" directory are excluded. The file selection criteria 965 may identify specific files (e.g., corporate_template.doc) and/or patterns. In some embodiments, the file-selection criteria 965 may identify files suitable for admission into the cache based on application-level knowledge (e.g., based on the application and/or storage client 803 associated with the file I/O request). For example, certain applications may access file data in a read-only mode. The file-selection criteria 965 may indicate that files accessed by such applications are suitable for admission into the de-duplication cache (e.g., files accessed by "Application X" are admittable). The file-selection criteria 965 may be further configured to specify files for admission into (or exclusion from) the de-duplication cache 260 by use of file attributes. As illustrated in FIG. 9, files comprising a particular attribute value X may be suitable for admission. Although particular examples of file-selection criteria 965 illustrated herein, the disclosure is not limited in this regard and could incorporate any suitable file-selection criteria including, but not limited to: pattern matching, regular expressions, expert systems, I/O access modes, fadvise information, I/O control (IOCTL) information, and so on.

Referring back to FIG. 8, the VMDM 262A-N may be configured to maintain de-duplication cache metadata pertaining to data that has been admitted into the de-duplication cache 260. The metadata may include a de-duplication index 864A-N. In some embodiments, files may be identified by use of a unique file identifier (UFID), which may uniquely identify the file with respect to the virtual machine 208A-N (e.g., uniquely identify the file within the namespace of the file system and/or operating system of the virtual machine 208A-N). The UFID may comprise a combination of the name of the file and a volume identifier (VID), which comprise a volume GUID, volume name, or the like (e.g., "\\VID:

\windows\system32\kernel32.dll"). Files may be further identified by use of a "context independent" identifier. As used herein, a "context independent" or "context free" identifier refers to an identifier that is independent of the namespace of the particular virtual machine 208A-N. The context-independent and/or context-free identifier may be used to allow different virtual machines 208A-N to share access to data in the de-duplication cache 260. In some embodiments, the context independent identifier comprises a Data Identifier (DID), which may be derived from the contents of the file itself. A DID 856 may include, but is not limited to: a hash (e.g., SHA-1, MD5, or the like), a Cyclic Redundancy Check (CRC) value, CRC32, a signature, or the like. Accordingly, a context-independent identifier may comprise and/or be referred to as a "file signature." Generating the DID 856 of a file may comprise reading at least a portion of the file data (e.g., contents of the file) and using the file data to generate the DID (e.g., by hashing the file data, signing the file data, processing the file data, or the like). The DID of a file may be common to the virtual machines 208A-N and/or de-duplication cache 260. Accordingly, the DID of a file may comprise a context-free and/or universal identifier of the file, which may be used to reference the file data by the de-duplication module 260 and/or any virtual machine 208A-N of any host 202.

The de-duplication cache 260 may index files admitted thereto by use of context independent identifiers, such as DIDs, which may allow different types of virtual machines 208A-N, having different file naming conventions and/or file paths, to access file data within the de-duplication cache 260. For example, the UFID of "kernel32.dll" on the virtual machine 208A may be referenced by "\\VID_1\windows\system32\kernel32.dll," which may differ from the UFID on other virtual machines (e.g., the UFID of "kernel32.dll" on virtual machine 208B may be "\\VID_2:\windows install\system32\kernel32.dll"). However, the DID 856 used by the virtual machines 208A and 208B to reference "kernel32.dll" may be the same, since the DID 856 is derived from the contents of the file.

The de-duplication index 864A-N may be configured to associate the UFID 855 of files that have been admitted into the de-duplication cache 260 with a respective DID 856. The de-duplication index 864A-N may be implemented using any suitable data structure including, but not limited to: a tree, hash table, linked list, lookup table, content addressable map (CAM), or the like. FIG. 10 depicts one embodiment of a de-duplication index 1064. As depicted in FIG. 10, the de-duplication index 1064 associates virtual-machine-specific UFIDs 855 with corresponding, context independent DIDs 856 (represented in Hex format). As disclosed above, the UFIDs 855 may correspond to a unique file identifier of a particular virtual machine 208A-N (e.g., a fully qualified file name) and the DIDs 856 may comprise a context independent identifier of the files, which may be derived from the contents of the file. The VMDM 262A-N may be configured to identify files that have been admitted by the de-duplication cache manger 260 by use of the UFIDs 855 and to reference the data by use of the context independent DIDs 856.

As disclosed above, the de-duplication cache 260 may comprise a de-duplication cache manager 261, which may be configured to manage the contents of the de-duplication cache 260 and/or the cache resources 269 allocated to the de-duplication cache 260 by the cache provisioner 214. In some embodiments, the de-duplication cache manager 261 is configured to represent de-duplication cache resources 269 using de-duplication cache tags 812. Like the cache tags 212A-N disclosed herein, the de-duplication cache tags 812 may be maintained in any suitable data structure, including, but not limited to contiguous memory, a table, tree, or the like. FIG. 11 depicts one embodiment of de-duplication cache tags 812. As illustrated in FIG. 11, the de-duplication cache tags 812 may be configured to associate DIDs 856 of files admitted into the de-duplication cache 260 with respective storage locations 857 of the file data within cache storage 216. The storage locations 857 may comprise references to virtual cache resources that are translated to physical cache addresses by the map module 217, as disclosed herein. Alternatively, the storage locations 857 may comprise physical cache addresses that directly reference the cache storage 216. Like the cache tags 212A-N disclosed herein, the de-duplication cache tags 812 may comprise additional cache metadata (not shown), such as access metrics, timer data, and so on, which may be used to manage admission to and/or eviction from the de-duplication cache 260. The de-duplication cache tags 812 may further comprise identifiers of virtual machines 208A-N associated with the files that have been admitted into the de-duplication cache 260. As disclosed in further detail herein, the virtual machine identifiers 859 may be used to secure data admitted into the de-duplication cache 260 and/or prevent read-before-write hazards.

Figures 12, 13, 14:
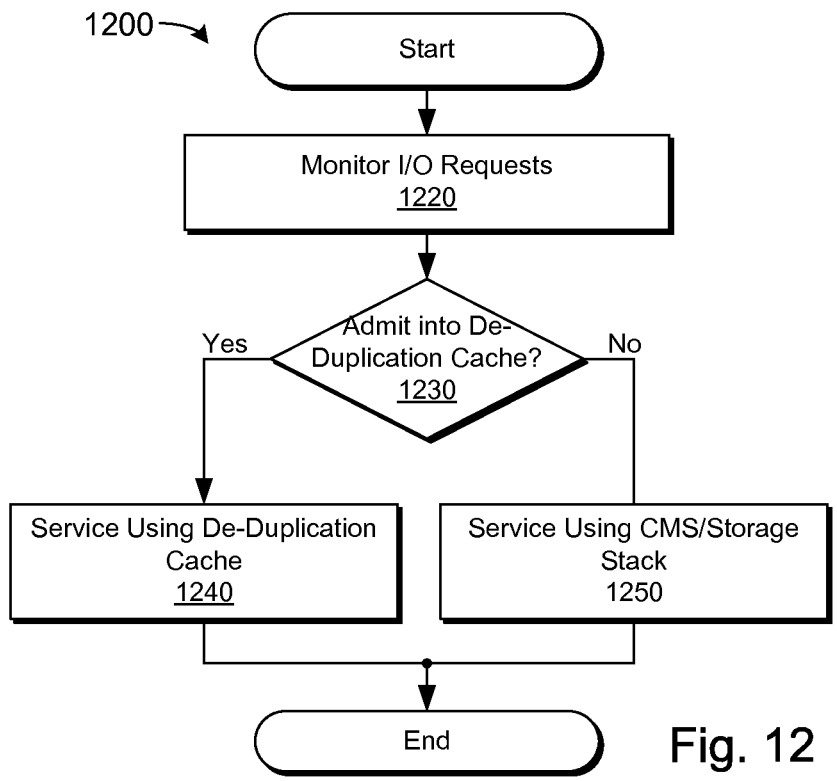
FIG. 12 is a flow diagram of another embodiment of a method for de-duplication caching.
FIG. 13 depicts another embodiment of a de-duplication index.
FIG. 14 depicts another embodiment of a de-duplication index.

FIG. 12 depicts one embodiment of a method for de-duplication caching. Step 1220 may comprise monitoring I/O requests of a virtual machine 208A-N. In some embodiments, step 1220 comprises monitoring file I/O requests at a file system layer 813A of a storage stack 811 by use of an I/O driver 218A-N and/or filter driver 219A-N.

Step 1230 may comprise determining whether to admit the file into the de-duplication cache 260. Step 1230 may, therefore, comprise determining whether the file is suitable for admission into the de-duplication cache 260 by use of a de-duplication cache policy module 864A-N. Step 1230 may comprise determining whether the file satisfies a de-duplication cache admission criteria, such as a file-selection criteria 965. Step 1230 may further comprise receiving and/or accessing de-duplication cache admission policy via the configuration interface 840, which may include, but is not limited to: one or more dedicated APIs, block device interface commands and/or extensions, fadvise calls, IOCTRL calls, I/O requests, file attributes, and/or the like.

Step 1230 may further comprise determining whether data of the file has already been admitted into the de-duplication cache 260 by use of the de-duplication index 864A-N (e.g., determining whether the deduplication index 864A-N includes a valid entry corresponding to the UFID 855 of the file). Step 1230 may further comprise determining whether the file is suitable for admission into the de-duplication cache 260 by use of the deduplication policy module 263A-N (e.g., applying file-selection criteria 265A-N, or the like). If the I/O request pertains to data that has been admitted into the de-duplication cache 260 and/or is suitable for admission, the flow continues at step 1240; otherwise, the flow continues at step 1250.

Step 1240 may comprise servicing the I/O request by use of the de-duplication cache 260. If data of the I/O request has already been admitted into the de-duplication cache 260, step 1240 may comprise requesting the data from the de-duplication cache 260 via the communication link 124 (e.g., through the VLUN disk 235A-N). The request may comprise the DID 856 of the file as indicated by the de-duplication index 864A-N. If data of the I/O request has not been admitted into the de-duplication cache 260 by the virtual machine 208A-N, step 1240 may comprise requesting admission for the data, as disclosed in further detail herein. Step 1240 may further comprise indicating to the CMS 220A-N, and/or other cache layers that data of the I/O request is being cached in the de-duplication cache 260.

Step 1250 may comprise servicing the I/O request by use of another cache layer, such as the CMS 220A-N, as disclosed herein, and/or servicing the I/O request within the storage stack 811 of the virtual machine 208A-N and/or virtualization kernel 210.

Referring back to FIG. 8, as disclosed herein, the VMDM 262A-N may be configured to determine whether data of a file I/O request has been admitted into the de-duplication cache 260 by use of the de-duplication index 263A-N. If the de-duplication index 263A-N comprises a valid entry corresponding to the UFID 855 of the file, the VMDM 262A-N may attempt to service the request using the de-duplication cache 260, which may comprise requesting the data from the de-duplication cache 260 using the corresponding DID 856 in the de-duplication index 263A-N. Referring to FIG. 10, the VMDM 262A-N may request file data of "c:\windows\system32\kernel32.dll" from the de-duplication cache 260 using the corresponding DID 856 "EA733BA0."

In response to a request to access file data, the de-duplication cache 260 may determine whether data corresponding to the request is available (e.g., has not been evicted) by use of the de-duplication cache manager 261. The de-duplication cache manager 261 may attempt to reference a de-duplication cache tag 812 that corresponds to the requested DID 856. If a valid de-duplication cache tag 812 exists, the de-duplication cache 260 may read the data from the cache storage 216 and provide the data to the VMDM 262A-N via the communication link 124 (and/or other cache interface 223 mechanism). The VMDM 262A-N may use the data received from the de-duplication cache 260 to service the I/O request.

If the de-duplication cache 260 does not have the requested data (e.g., the de-duplication cache manager 261 cannot locate a valid de-duplication cache tag 812 associated with the DID 856 of the request), the de-duplication cache 260 may signal a "cache miss" indication (or other error code). In response, the VMDM 262A-N may attempt to admit the file data into the de-duplication cache 260. Admitting the data may comprise reading data of the file from primary storage 212 (or another storage resource), determining a DID 856 of the file data, and issuing a request to admit the data to the de-duplication cache 260 (via the communication link 124 or other cache interface 223). The admission request may include the file data and the corresponding DID. The VMDM 262A-N may be configured to generate the admission request in a separate thread and/or process that is outside of the "critical path" of the original I/O request in the storage stack 211A-N. As used herein, the "critical path" of an I/O request refers to the sequence of operations that contribute to the latency of the I/O request. Since admitting the data into the de-duplication cache 260 is performed in a separate thread and/or process, the I/O request can be serviced normally and may not significantly impact the performance of the I/O request.

In some embodiments, the VMDM 262A-N may be configured to admit portions of a file into the de-duplication cache 260. A de-duplication cache policy module 863A-N may determine the maximum size for files admitted into the de-duplication cache 260. The VMDM 262A-N may determine whether the file exceeds the maximum file size, and if so, may attempt to admit only a portion and/or "chunk" of the file. For example a large file "large.dll" may be segmented into 16 chunks, which may be identified by a relative index; "large1.dll," "large2.dll," and so on. The de-duplication index 864A-N may comprise separate entries (and corresponding DIDs 856) for each segment of the file. The VMDM 262A-N may attempt to admit the various portions of the file as needed (e.g., in response to I/O requests pertaining to various portions of the file).

The de-duplication cache 260 may comprise a de-duplication policy module 261 configured to selectively admit file data into the de-duplication cache 260 in response to requests from the VMDMs 262A-N. The de-duplication policy module 261 may determine whether to admit data into the de-duplication cache 260 based on various cache policy factors, which may include, but are not limited to: cache resource availability, access metrics (e.g., how many different virtual machines 208A-N have requested the file data and/or access metrics of the requests), and so on.

In response to determining to admit data of the admission request, the de-duplication cache 260 may be configured to: allocate one or more de-duplication cache tag(s) 812 for the request; associate the allocated de-duplication cache tags 812 with the DID(s) 856 of the request; and provide for storing the data of the admission request in the cache storage 216 (in association with the virtual cache addresses of the corresponding de-duplication cache tags 812). Admitting the data may further comprise providing an indication to the VMDM 262A-N that the data was successfully admitted into the de-duplication cache 260. In response to the indication, the VMDM 262A-N may update the de-duplication index 864A-N, which may comprise adding an entry to associate the UFID 855 of the file with the corresponding DID 856. The VMDM 262A-N may be further configured to indicate that the file is being cached in the de-duplication cache 260 so that other cache layers, such as the CMS 220A-N, do not redundantly cache data of the file.

If the admission request is not satisfied, due to cache policy or an error condition, the de-duplication cache 260 may return an error code (or other indication) to the VMDM 262A-N. In response, the VMDM 262A-N may remove entries corresponding to the DID(s) 856 of the admission request from the de-duplication index 864A-N (if any) and/or indicate to other cache layers (e.g., CMS 220A-N) that the file has not been admitted into the de-duplication cache 260.

As disclosed herein, each virtual machine 208A-N may reference file data using the same, context-free DID 856 values. In the FIG. 10 embodiment, each virtual machine 208A-N may reference the file data of "kernel32.dll" using the same DID 856 "EA733BA0." Accordingly, each virtual machine 208A-N that accesses "kernel32.dll," and determines that "kernel32.dll" is suitable for admission into the de-duplication cache 260, will attempt to admit the file using the same DID 856 "EA733BA0." When each virtual machine 208A-N attempts to access "kernel32.dll" for the first time, the de-duplication index 864A-N of the virtual machine 208A-N will not include an entry for the file. Therefore, the VMDM 262A-N will attempt to admit the file into the de-duplication cache 260, which as disclosed above, may comprise reading the file "kernel32.dll," calculating the DID 856 ("EA733BA0"), and issuing a request to admit the file data to the de-duplication cache 260. Accordingly, the de-duplication cache 260 may receive many different requests to admit the same data (e.g., data associated with the same DID 856).

In response to a request to admit file data corresponding to a particular DID 856, the de-duplication cache manager 261 may determine whether data corresponding to the DID 856 has already been admitted (by a different virtual machine 208A-N) by, inter alia, reference to the de-duplication cache tags 812. If a valid de-duplication cache tag 812 associated with the DID 856 exists, the de-duplication cache manager 261 may determine that the file data of the admission request has already been admitted. The de-duplication cache manager 261 may acknowledge the admission request without re-admitting the file data. The de-duplication cache manager 261 may, however, update the de-duplication cache tag(s) 812 to indicate that corresponding virtual machine 208A-N is authorized to read the file data from the de-duplication cache 260 (e.g., update the virtual machine identifier information 859 of the cache tag(s) 812).

In some embodiments, de-duplication cache 260 may be configured to verify that the existing file data in the cache storage 216 matches the file data the admission request. This verification may be used to prevent errors due to "DID collisions." As used herein, a DID collision refers to a situation in which different file data results in the same DIDs 856. DID collisions may be a result from using shorter, less complex DIDs 856. The size and/or complexity of the DIDs 856 used in the system 800 may be a tradeoff between a) the overhead needed to calculate, communicate, and/or store the DIDs 856 and b) the probability of DID collisions. Although large, complex DIDs 856 may significantly reduce the likelihood of DID collisions, the overhead of such DIDs 856 may be unacceptable. In some embodiments, the size and/or complexity of the DIDs 856 may be based on, inter alia, the number of unique files (and/or file versions) that may be admitted into the de-duplication cache 260. Embodiments that require fewer unique files and/or file versions may be configured to use less complex and/or smaller DIDs 856. Embodiments that require a relatively large number of unique files and/or file versions may be configured to use large, more complex DIDs 856. The size of the DIDs 856 and/or other configuration information may be managed by use of the configuration interface module 840 and/or cache interface 223.

In some embodiments, the de-duplication cache 260 may be configured to verify that matches between two or more DIDs 856 are not due to a DID collision. Verifying DIDs 856 may comprise comparing the file data from which the DIDs 856 were determined (e.g., a byte-by-byte comparison). According, in response to determining that the DID 856 of an admission request matches the DID 856 associated with a valid de-duplication cache tag 812, the de-duplication cache 260 may be configured to verify that the underlying file data matches by, inter alia, comparing the data in the admission request to the data in cache storage 216, comparing stronger hash, signature, and/or CRC values, or the like. If the match is due to a collision, the de-duplication cache 260 may be configured to return an error to the VMDM 262A-N indicating that the admission request could not be satisfied.

Alternatively, the de-duplication cache 260 may be configured to admit the data using an alternative DID 856, and may provide the alternative DID 856 to the VMDM 262A-N in response to successfully admitting the data into the de-duplication cache 260. The alternative DID 856 may be generated in a deterministic manner, such that subsequent requests (from VMDM 262A-N of other virtual machines 208A-N), will also result in the same alternative DID 856. The alternative DID 856 may be derived from the original DID 856 and/or may be derived from the file data itself. For example, the alternative DID 856 may be calculated using an alternative hash, signature, or other algorithm. Alternatively, or in addition, the alternative DID 856 may comprise a two-part identifier, comprising a first portion derived from the original DID 856 and a second portion generated by the de-duplication cache 260 and/or VMDM 262A-N.

As disclosed above, in response to receiving an acknowledgement that the admission request was satisfied, the VMDM 262A-N may update the de-duplication index 864A-N to associate the file UFID 855 with the corresponding DID 856 (or alternative DID 856). The VMDM 262A-N may service subsequent I/O requests pertaining to the file by use of the de-duplication cache 260, which may comprise a) determining that the file has been admitted into the de-duplication cache 260 in reference to the de-duplication index 864A-N (matching the UFID of the file to a valid entry in the index 864A-N), b) requesting data to satisfy the I/O request from the de-duplication cache 260, and c) satisfying the I/O request using data provided by the de-duplication cache 260.

In some embodiments, VMDM 262A-N is configured to store a snapshot 867A-N of the de-duplication index 262A-N on a persistent storage medium (e.g., the primary storage 212, or the like). As disclosed above, a "snapshot" refers to current state information. Accordingly, storing a snapshot of the VMDM 262A-N may comprise storing a snapshot of the de-duplication index 262A-N (e.g., persisting entries comprising the UFIDs 855 and DIDs 856 of the data that has been admitted into the de-duplication cache 260 by the virtual machine 208A-N). The snapshot 867A-N may be persisted in any suitable format including, but not limited to: a file, a configuration repository such as a registry or persistent settings, a database, cache storage 216, or the like.

In some embodiments, the VMDM 262A-N is configured to load the snapshot 867A-N of the de-duplication index 264A-N after the corresponding virtual machine 208A-N undergoes a reboot, restart, power-cycle, and/or transfer operation (e.g., vMotion® operation). Loading the snapshot 867A-N may comprise populating the de-duplication index 864A-N with the UFIDs 855 and corresponding DIDs 856 of the files that have been admitted into the de-duplication cache 260 by the virtual machine 208A-N. In some embodiments, when the virtual machine 208A-N restarts, the VMDM 262A-N is configured to populate the de-duplication index 864 A-N with the contents of the corresponding snapshot 867A-N, which may allow the VMDM 262A-N to access data of files admitted into the de-duplication cache prior to the interruption. Accordingly, the effects of the "boot storm" caused by multiple virtual machines 208A-N attempting to simultaneously access the primary storage 212 may be significantly reduced.

As disclosed above, the contents of the de-duplication cache 260 may be shared between multiple virtual machines 208A-N. As such, the de-duplication cache 260 and/or VMDM 262A-N may be configured to manage modifications to files admitted to the de-duplication cache 260, since such modifications could adversely affect other virtual machines 208A-N that are accessing the files. Accordingly, in some embodiments, the de-duplication cache 260 may be configured to operate in a "read-only" mode, such that data cannot be modified after admission.

In some embodiments, VMDM 262A-N is configured to monitor I/O requests within the storage stack 211 of the virtual machine 208A-N to identify requests to modify files that have been admitted into the de-duplication cache 260. In response to identifying such a request, the VMDM 262A-N may be configured to invalidate the de-duplication entry corresponding to the file in the de-duplication index 864A-N. The VMDM 262A-N may be further configured to update the snapshot 867A-N of the de-duplication index 864A-N. Accordingly, subsequent I/O requests pertaining to the file may operate against primary storage 212. The VMDM 262A-N may be further configured to inform the de-duplication cache 260 that the file is no longer in use by the virtual machine 208A-N. In response, the de-duplication cache manager 261 may remove the VMID of the virtual machine 208A-N from the corresponding de-duplication cache tag 812 (remove the VMID from the VMID field 859 of the corresponding entry).

FIG. 13 depicts another embodiment of a de-duplication index 864A after the VMDM 262A detects an I/O request to modify the file "kernel32.dll" by virtual machine 208A. As shown in FIG. 13, the entry corresponding to "kernel32.dll" is removed. Alternatively, the entry may be retained and marked as "invalid," or the like. The modification to the de-duplication index 864A may not change the contents of the de-duplication cache 260 and/or the de-duplication index 864B-N of other virtual machines 208B-N. Accordingly, the other virtual machines may continue to reference and use the "old," previous version of file data for "kernel32.dll" corresponding to DID "EA733BA0."

After invalidating the entry for "kernel32.dll" in the de-duplication index 864A, subsequent requests to access data of the file may result in cache misses at the VMDM 262A (since the entry for "kernel32.dll" is removed and/or marked invalid). In response to the miss, the VMDM 262A may attempt to admit the updated data of "kernel32.dll" into the de-duplication cache 260, as described above, which may comprise a) reading the updated contents of "kernel32.dll," b) determining a DID 856 of the file data, and c) issuing one or more admission requests comprising the file data and DID 856 to the de-duplication cache 260. Since the DID 856 of the modified "kernel32.dll" is based on different file data than the original version, the DID 856 will be different from the original DID 856 of the file (unless a DID collision exists). The de-duplication cache 260 may admit the updated file data (in accordance with the de-duplication policy module 261), which may comprise a) allocating one or more de-duplication cache tags 812, b) associating the allocated de-duplication cache tags 812 with the DID 856 provided in the admission request, and c) providing for storing the file data of the admission request in cache storage 216.

As illustrated above, since the de-duplication cache 260 references data using context-free DIDs 856, the de-duplication cache 260 may be capable of caching multiple versions of files that have the same and/or similar names. Accordingly, other virtual machines 208B-N may continue to access the original version of "kernel32.dll" (referenced by DID "EA733BA0"), while the virtual machine 208A uses the updated version of "kernel32.dll." In response to determining that the updated version of "kernel32.dll" was successfully admitted into the de-duplication cache 260, the VMDM 262A may be configured to update the de-duplication index 864A to associate "kernel32.dll" with the new DID ("90EAF331"), as depicted in FIG. 14. The VMDM 262A may be further configured to update the snapshot 267 and/or inform other cache layers (e.g., CMS 220A) that "kernel32.dll" has been admitted into the de-duplication cache 260.

The cache provisioner module 214 may be configured to dynamically allocate cache storage resources 269 to the de-duplication cache 260. As described herein, cache resources may be dynamically allocated in response to the I/O requirements of the virtual machines 208A-N. The de-duplication cache manager 261 may be configured to manage the contents of the de-duplication cache 260 in response to the cache resources 269 allocated thereto. Managing the de-duplication cache 260 may include, but is not limited to: a) selectively admitting (and/or denying admission) to the de-duplication cache 260, b) maintaining cache access metrics, such as least recently used (LRU), steal timer, or the like, and/or c) evicting files from the de-duplication cache 260. Evictions may occur due to cache capacity issues, aging, cache resource allocation changes, or the like. Alternatively, or in addition, file data may be evicted in response to a request from an external entity (via the cache interface 223 and/or configuration interface 840). For example, file data in the de-duplication cache 260 may be corrupt, comprise a virus, Trojan, or the like. In response to detecting a problem with cache data, the de-duplication cache 260 (or other entity) may request removal of the data. Removing the data may include, but is not limited to: invalidating and/or erasing the data from the cache storage 216, removing de-duplication cache tags 812 corresponding to the data, and so on. Subsequent requests for the data may, therefore, result in a cache miss, which may result in readmission of the data into the de-duplication cache 260, as disclosed herein.

In some embodiments, the de-duplication cache 260 may be configured to secure data stored therein. Securing the data may comprise preventing read before write hazards. As used herein, a "read before write" hazard refers to an attempt by an entity to read data that was not written by the thereby. In the FIG. 8 embodiment, a read before write hazard may comprise a virtual machine 208B attempting to read a file that was admitted into the de-duplication cache 260 by a different virtual machine 208A. The de-duplication cache 260 may be configured to maintain an "access list" configured to identify the virtual machines 208A-N that are authorized to access particular files. Referring to FIG. 11, the VMID field 859 of the de-duplication cache tags 812 may identify the virtual machines 208A-N that are authorized to access particular files. The de-duplication cache 260 may determine that a virtual machine 208A-N is authorized to access a file in response to determining that the virtual machine 208A-N has access to the underlying file data (e.g., access to the file on the primary storage 212). The de-duplication cache 260 may, therefore, determine that a virtual machine 208A-N is authorized to access a particular file in response to the virtual machine 208A-N admitting (and/or attempting to admit) the file into the de-duplication cache 260.

The de-duplication cache 260 may restrict access to file data of the DIDs 856 to the virtual machines 208A-N identified in the corresponding access list 859. Referring to FIG. 11, the de-duplication cache 260 may restrict access to file "45AD342E" to virtual machine 208B; the other virtual machines 208A and 208N may be prevented from accessing this data, until the other virtual machines 208A and/or 208N attempt to admit data of DID "45AD342E" into the de-duplication cache 260.

In some embodiments, the read before write security restrictions may be lifted or relaxed. For example, when admitting file data into the cache, a virtual machine 208A-N may indicate that the file data is "public," and may be accessed without restriction. For example, system files, such as "kernel32.dll" may be specified as "public." Public access may be denoted with a wildcard indicator in the access list 859, or the like (e.g., data of DID "20AE45EA" may be publicly accessible). Allowing unrestricted access to file data may be advantageous in certain situations. For example, and as disclosed above, after being transferred to another host, the virtual machine 208A-N may load a snapshot 867A-N of the de-duplication index 864A-N. However, the virtual machine 208A-N may not have attempted to admit the referenced files on the destination host and, as such, may not appear on the access list(s) maintained by the de-duplication cache 260 of the destination host, meaning that the virtual machine 208A-N would have to attempt to re-admit the file(s) at the destination host before having access to the file(s). If the files are marked as publicly accessible, the virtual machine 208A-N may immediately access the files at the destination host 202 without further accesses to the primary storage 212, which, as disclosed above, may ameliorate boot storm issues when the virtual machine 208A-N reboots, restarts, and/or is power cycled as part of the transfer. Alternatively, or in addition, when a virtual machine 208A-N is migrated to another host, the previous host may provide de-duplication cache state of the virtual machine to the destination host. The destination host may use the transferred de-duplication cache state data to allow the virtual machine 208A-N to access data in the de-duplication cache 260 of the destination host. The de-duplication cache state may include the DIDs of file data the virtual machine 208A-N is authorized to access (e.g., the de-duplication cache tags 812 pertaining to the virtual machine).

Figure 15:
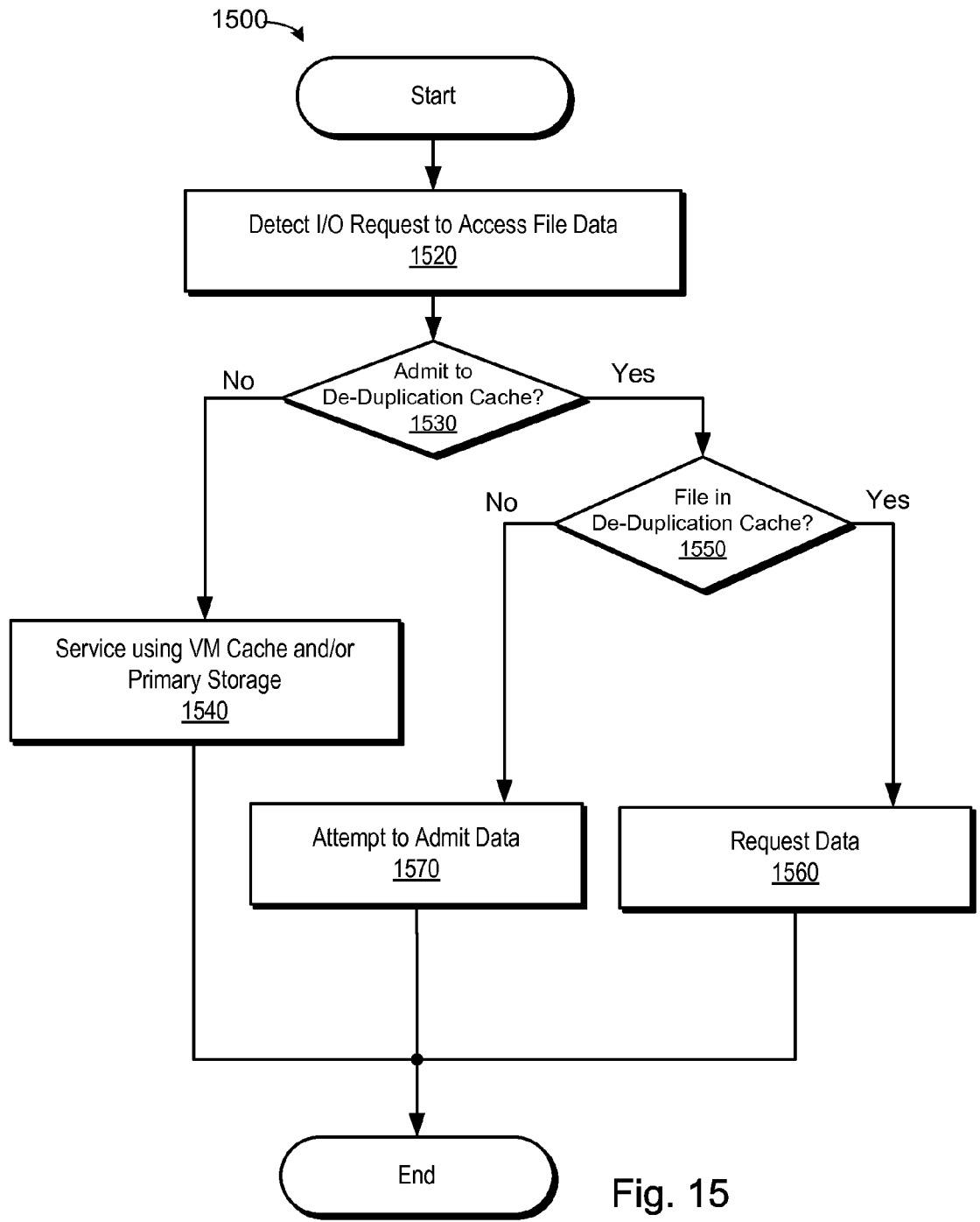
FIG. 15 is a flow diagram of another embodiment of a method for de-duplication caching.

FIG. 15 is a flow diagram of one embodiment of a method 1500 for de-duplication caching. Step 1520 may comprise detecting an I/O request to access data of a file. Step 1520 may comprise monitoring I/O requests within the storage stack 811 of a virtual machine 208A-N, as disclosed herein.

Step 1530 may comprise determining whether the file should be admitted into the de-duplication cache 260 (e.g., determine whether the file is suitable for de-duplication), as disclosed herein. Step 1530 may comprise determining whether the file is referenced in the de-duplication index 864A-N and/or evaluating de-duplication policy of a de-duplication policy module 863A-N, such as file-selection criteria 965. If the file is not suitable for de-duplication, the flow may continue to step 1540, where the I/O request may be serviced by a CMS 220A-N, primary storage 211, or the like; otherwise, the flow continues to step 1550.

Step 1550 may comprise determining whether the file has been admitted into the de-duplication cache 260. Step 1550 may comprise determining whether the de-duplication index 864A-N comprises a valid entry associated with the UFID 855 of the file. If so, the flow may continue to step 1560; otherwise, the flow continues to step 1570.

Step 1560 may comprise requesting the file data from the de-duplication cache 260. Step 1560 may comprise requesting the data using the DID 856 of the file as indicated by the de-duplication index 864A-N. The request of step 1560 may be issued to the de-duplication cache 260 via a communication link 124 (e.g., via a VLUN disk 235A-N) and/or by use of other mechanisms of the cache interface 223. In response to the request, the de-duplication cache 260 may be configured to identify a de-duplication cache tag 812 associated with the DID 856, and provide the corresponding data from cache storage 216. The VMDM 262A-N may be further configured to service the I/O request detected at step 1520 using the data provided by the de-duplication cache 260.

Step 1570 may comprise attempting to admit data of the file into the de-duplication cache 260. Accordingly, step 1570 may comprise reading the file data (and/or portion thereof), generating a DID 856 for the file data, and providing the file data and DID 856 to the de-duplication cache 260 for admission, as described above. The file data may be read in a "slow path" thread or processes that is separate from the I/O thread(s) and/or processes used to service the original I/O request. Accordingly, while the operation(s) of step 1570 are performed, the original I/O request may be serviced from primary storage 212, another cache level, or the like.

Figure 20A:
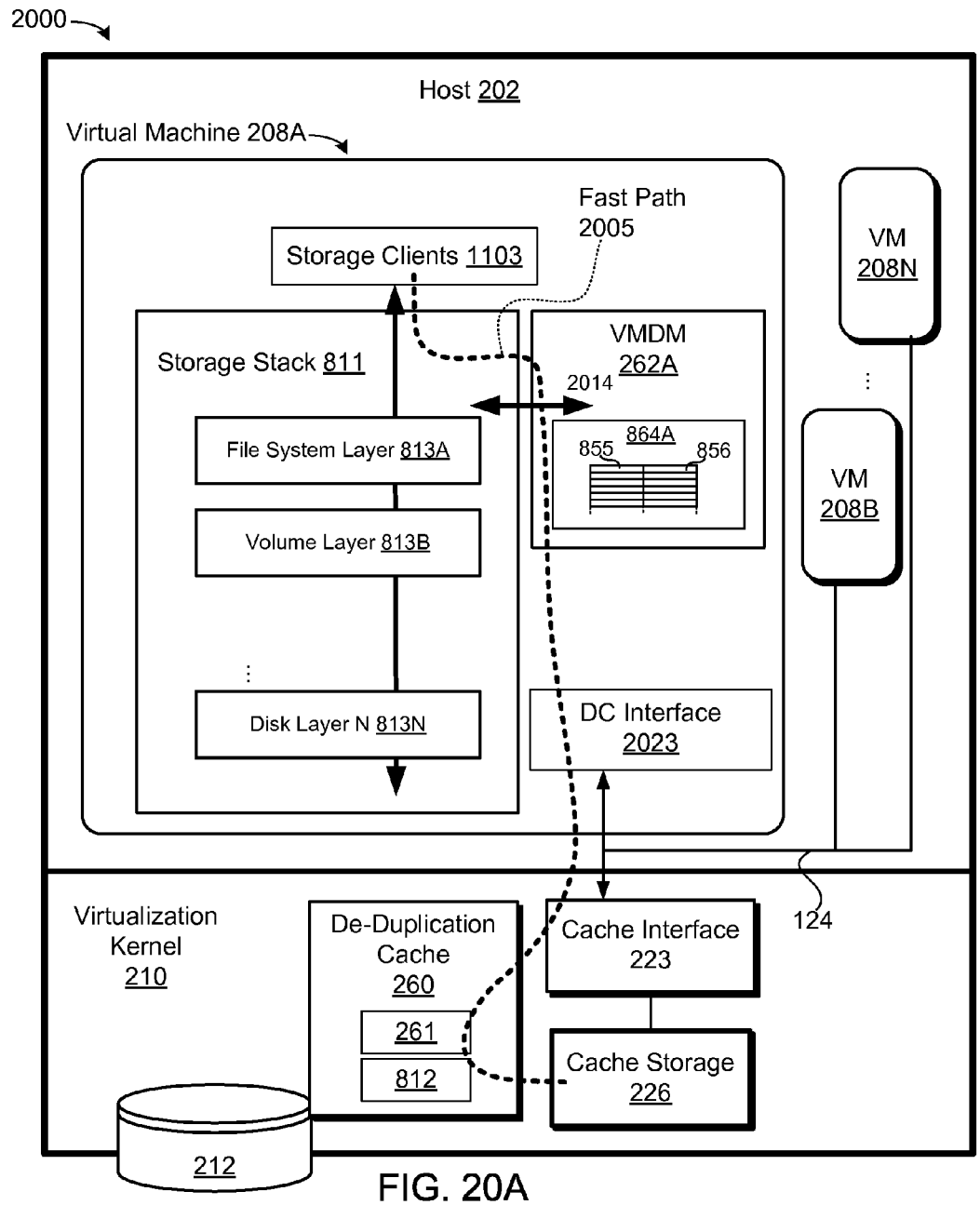
FIG. 20A is a block diagram depicting another embodiment of a system for de-duplication caching.
Figure 20B:
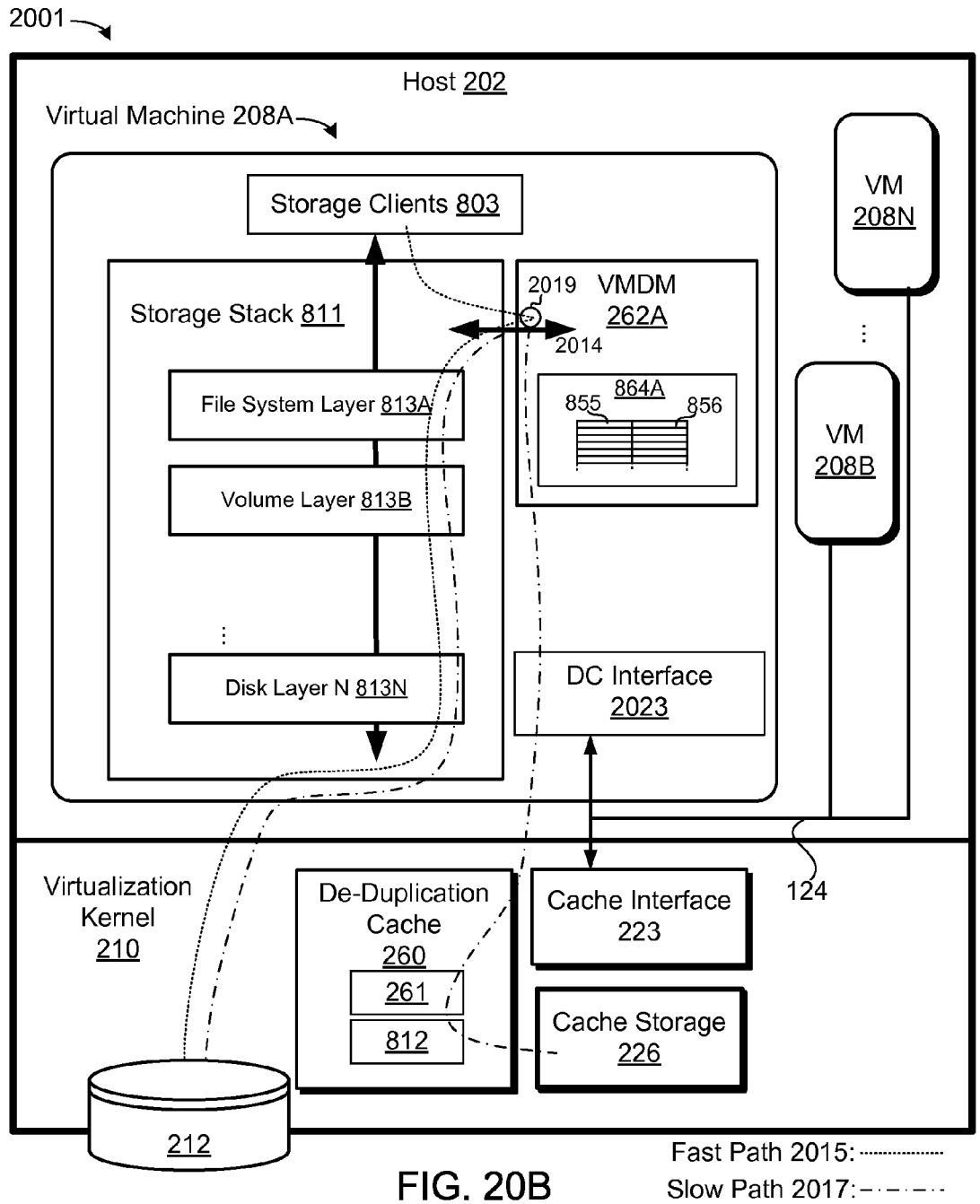
FIG. 20B is a block diagram depicting another embodiment of a system for de-duplication caching.

As illustrated in FIGS. 20A and 20B, admitting data into the de-duplication cache 260 may further comprise forking the admission process or thread from the process or thread used to service the I/O request. Accordingly, the operations involved in admitting the data into the de-duplication cache 260 may be performed separately from and/or independently of the "fast path" operations involved in servicing the I/O request in the storage stack 811 of the virtual machine 208A-N and/or storage stack 211 of the host 202.

Step 1570 may further comprise updating the de-duplication index 864A-N in response to acknowledgement that the data was successfully admitted. Step 1570 may further comprise updating a snapshot 867A-N and/or informing other cache layers (e.g., CMS 220A-N) that data of the file is being cached in the de-duplication cache 260.

Figure 16:
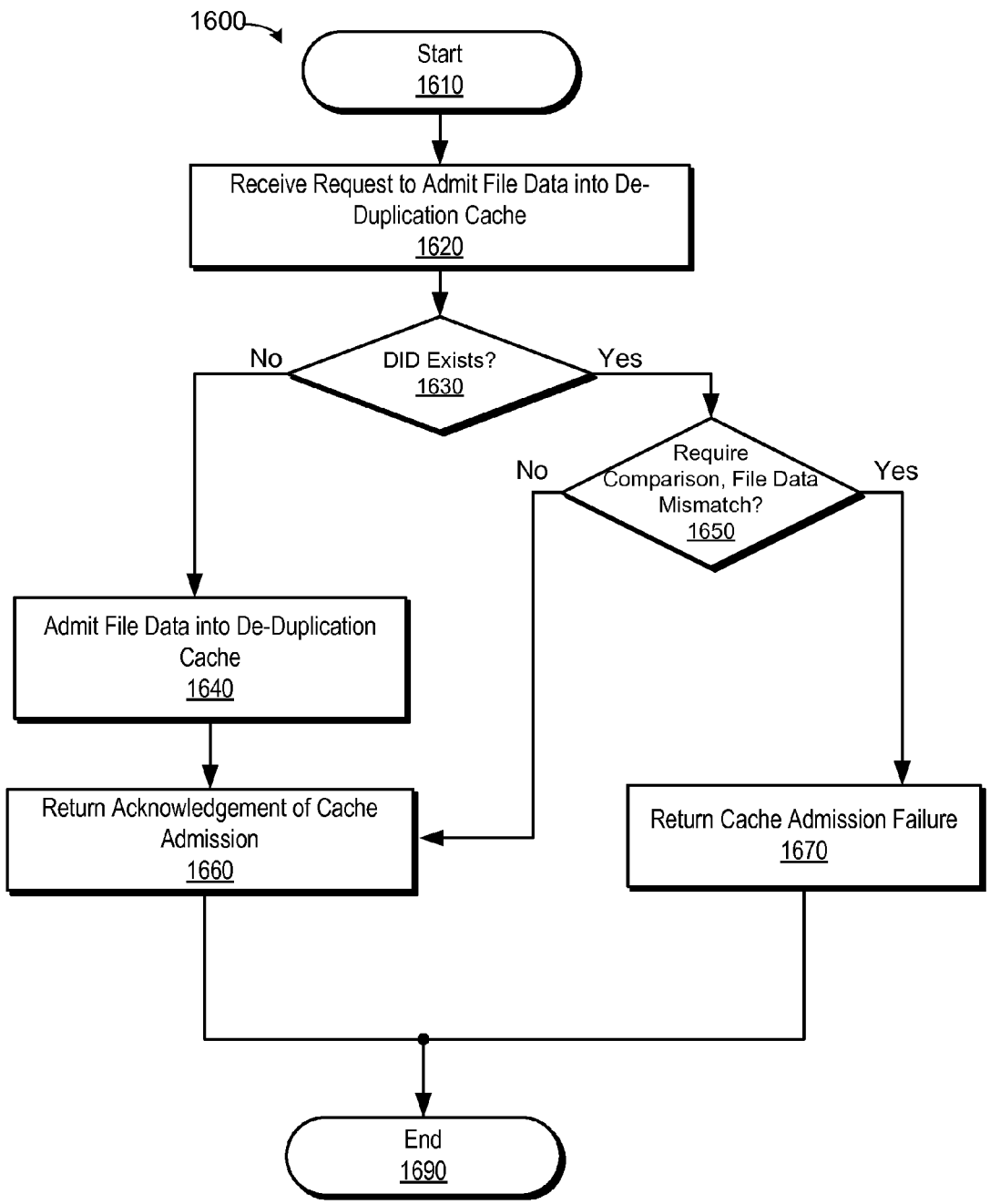
FIG. 16 is a flow diagram of another embodiment of a method for de-duplication caching.

FIG. 16 is a flow diagram of another embodiment of a method 1600 for de-duplication caching. Step 1620 may comprise receiving a request to admit data into the de-duplication cache 260. The request may be received from a virtual machine 208A via the communication link 124 (and/or other mechanism of the cache interface 223). The request of step 1620 may comprise the data to be admitted into the cache and/or a DID 856 derived from the data.

Step 1630 may comprise determining if a valid de-duplication cache tags 812 associated with the DID 856 exists. If so, the flow continues at step 1650; otherwise the flow continues at step 1640.

Step 1640 may comprise selectively admitting the data into the de-duplication cache 260. As disclosed herein, admitting data into the de-duplication cache may comprise a) determining whether to admit the data by use of a de-duplication policy module 863A-N, b) allocating one or more de-duplication cache tags 812, c) storing data of the admission request within the cache storage 216, and/or d) associating the de-duplication cache tags 812 allocated for the data with the DID 856 of the data and/or the storage location(s) of the data on the cache storage 216. Step 1660 may comprise acknowledging that the data was successfully admitted into the de-duplication cache 260.

Step 1650 may comprise determining whether to verify the DID match identified at step 1630 (e.g., determine whether the match of step 1630 was due to a DID collision). The determination of step 1650 may be based on the strength, size, and/or complexity of the DIDs 856, the number of unique files being handled by the de-duplication cache 260, and so on. Step 1650 may further comprise comparing data of the admission request to the data stored in the cache storage 216 to, inter alia, verify the DID match. If step 1650 indicates that a DID collision has occurred, the flow may continue at step 1670; otherwise, the flow may continue to step 1660.

Step 1670 may comprise returning an indication that the request to admit the data into the cache could not be satisfied. The indication may specify that the request could not be satisfied due to a DID collision.

Figure 17:
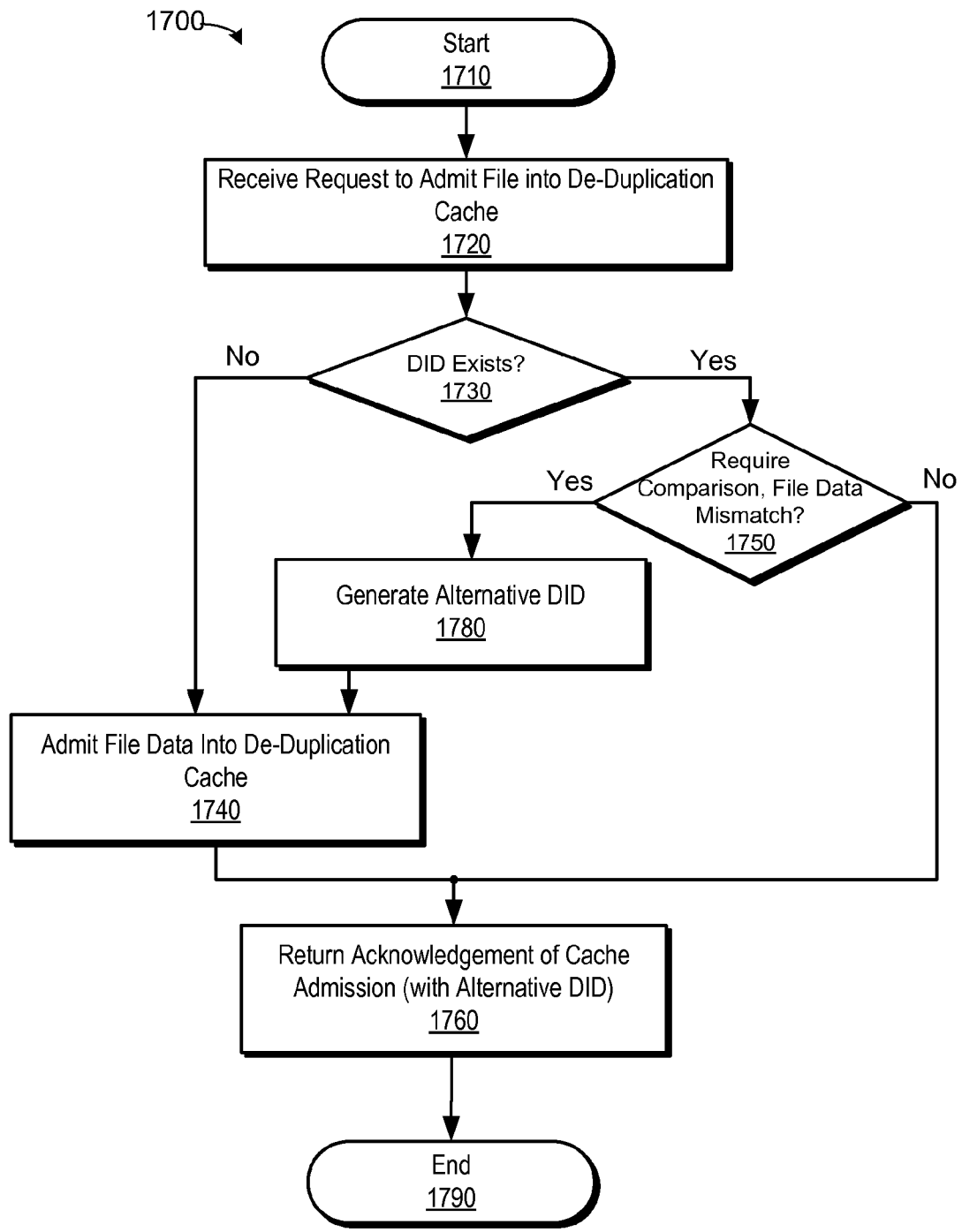
FIG. 17 is a flow diagram of another embodiment of a method for de-duplication caching.

FIG. 17 is a flow diagram of another embodiment of a method 1700 for de-duplication caching. Steps 1720 and 1730 may comprise receiving a request to admit data into the de-duplication cache 260 and determining whether the de-duplication cache comprises a valid de-duplication cache tag 812 that matches the DID 856 of the request. Step 1740 may comprise admitting the data into the de-duplication cache 260, as disclosed herein.

Step 1750 may comprise determining whether a DID collision exists, as disclosed herein. If no DID collision exists, the flow continues to step 1760, which may comprise acknowledging that the data is admitted into the de-duplication cache 260 without actually re-admitting the data. Step 1760 may further comprise updating one or more file access list(s) 859 on the de-duplication cache tags 812 to indicate that the virtual machine 208A-N is authorized to access the corresponding data.

If step 1750 indicates that a DID collision exists, the flow may continue to step 1780. Step 1780 may comprise generating an alternative DID 856 for the data. As disclosed above, the alternative DID 856 may be generated deterministically, such that subsequent DID collisions involving the same data will result in the same alternative DID 856, which may allow data subject to the DID collision to be de-duplicated between multiple virtual machines 208A-N. The flow may continue to step 1740, which may comprise admitting the data into the de-duplication cache 260 as disclosed herein.

Step 1760 may comprise acknowledging that the data was admitted into the de-duplication cache. The acknowledgement may comprise the alternative DID 856 of the data generated at step 1780 (if applicable).

Figure 18:
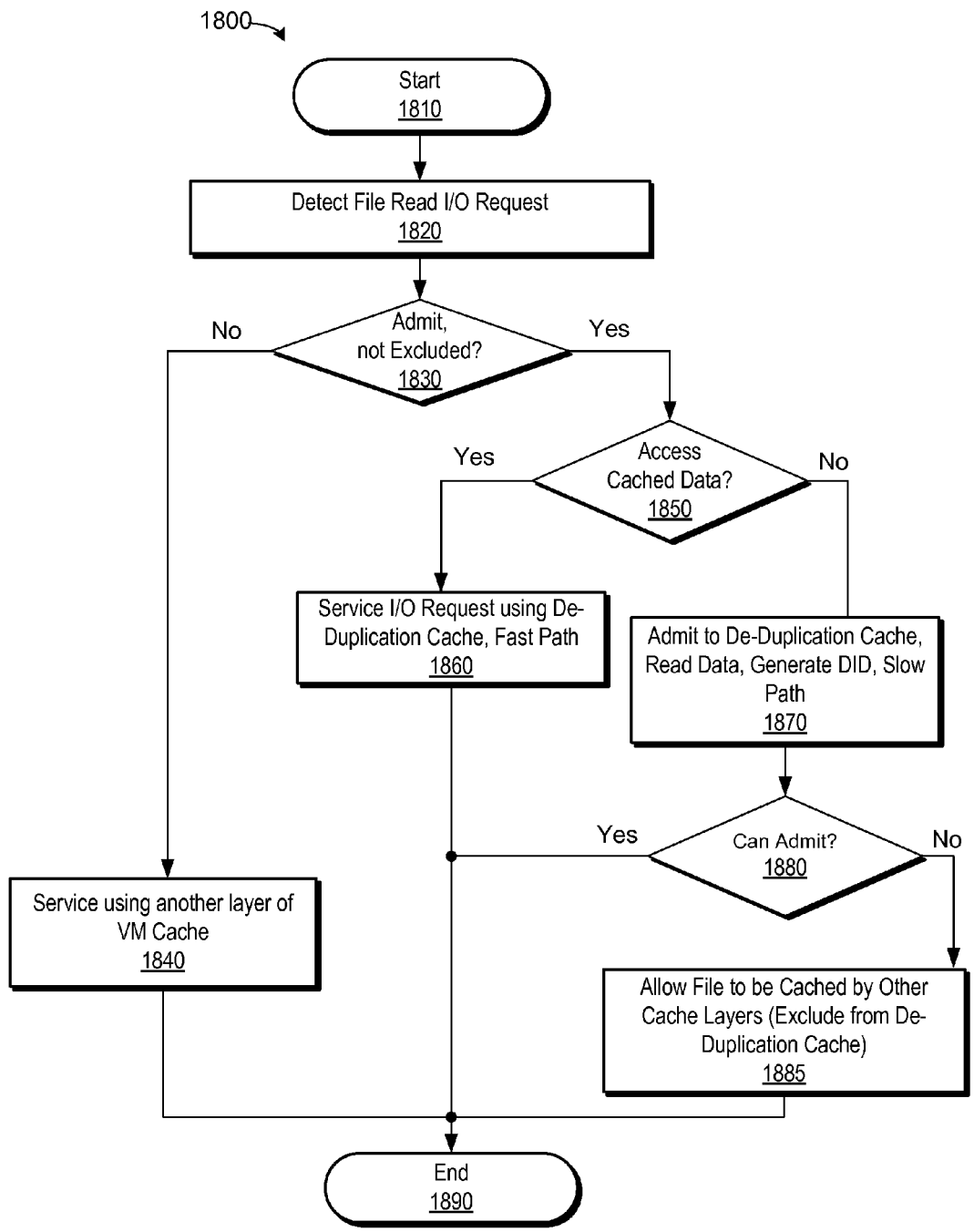
FIG. 18 is a flow diagram of another embodiment of a method for de-duplication caching.

FIG. 18 is a flow diagram of another embodiment of a method 1800 for de-duplication caching. Step 1820 may comprise detecting an I/O request to read data pertaining to a file. As disclosed herein, step 1820 may comprise monitoring I/O requests within a storage stack 811 by use of an I/O driver 218A-N and/or filter 219A-N.

Step 1830 may comprise determining whether the file should be admitted into the de-duplication cache 260 and/or whether the file is excluded from admission. Step 1830 may comprise the de-duplication policy module 863A-N evaluating de-duplication admission policy 865A-N. The de-duplication admission policy 865A-N may comprise file-selection criteria, such as the file selection criteria 965 of FIG. 9, disclosed above. The de-duplication admission policy 865A-N may further comprise an exclusion list identifying files that should not be admitted into the de-duplication cache 260 (e.g., are unsuitable for de-duplication and/or are being cached by other layers of the CMS 220A-N). The exclusion list may be dynamically populated in response to cache configuration and/or activity of the CMS 220A-N. If the file is suitable for admission to the de-duplication cache 260, and is not otherwise excluded, the flow may continue to step 1850; otherwise, the flow may continue at step 1840. Step 1840 may comprise allowing the I/O request to be serviced using another cache layer (e.g., CMS 220A-N), primary storage 212, or the like. Accordingly, step 1840 may comprise ignoring the I/O request at the VMDM 262A-N.

Step 1850 may comprise attempting to access the requested file data at the de-duplication cache 260 and servicing the I/O request at step 1860, as disclosed herein.

Step 1870 may comprise admitting the file data into the de-duplication cache 260, as disclosed herein. Step 1870 may comprise servicing the I/O request using primary storage 212, and reading the file data (and generating a corresponding DID 856) in a separate thread or processes. Step 1870 may further comprise providing the file data and DID 856 to de-duplication cache 260 for admission at step 1880. If the file data is successfully admitted into the de-duplication cache, the flow may end; otherwise, the flow may continue at step 1885.

Step 1885 may comprise adding an identifier of the file (e.g., the UFID of the file) to an exclusion list or other data structure, which may allow other cache services, such as the CMS 220A-N to cache the file, and may prevent the VMDM 262A-N from repeatedly attempting to admit the file into the de-duplication cache 260. In some embodiments, step 1885 may only include the file in the exclusion list in response to certain failure conditions from the de-duplication cache 260. For example, the de-duplication cache 260 may indicate that the file data may be admitted later (e.g., it cannot be admitted now, but may be admitted if/when more cache space is available). In this situation, the file may not be included on the exclusion list. Alternatively, the de-duplication cache 260 may indicate that the file is unlikely to ever be admitted (e.g., due to a DID collision, or the like). In response to such an indication, the file may be added to the exclusion list to prevent repeated error conditions and/or to allow other caching services to attempt to handle the file. In other embodiments, step 1885 may comprise evaluating one or more thresholds, such as a retry count, latency metric, or the like to determine whether to add the file to the exclusion list.

Figure 19A:
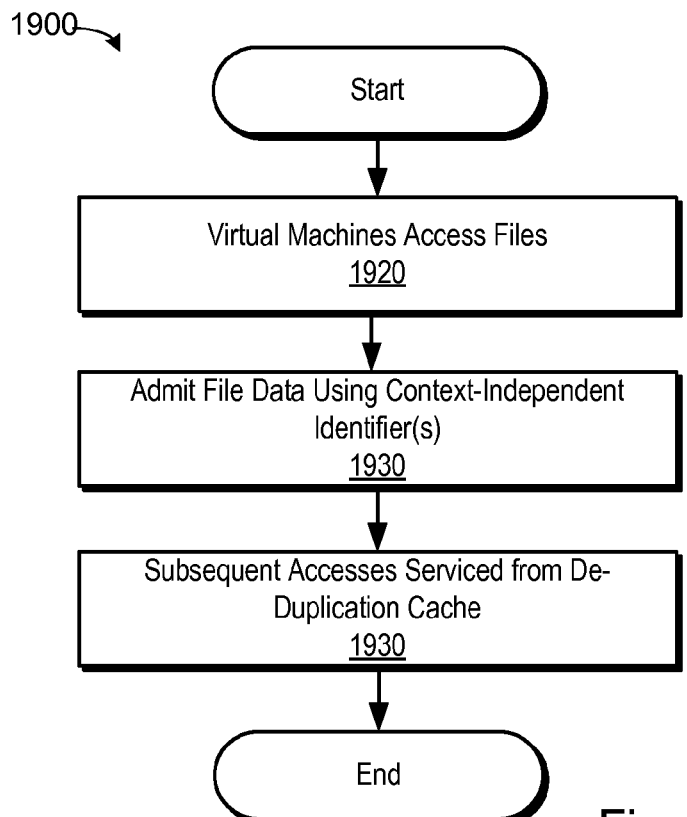
FIG. 19A is a flow diagram of another embodiment of a method for de-duplication caching.

FIG. 19A is a flow diagram of another embodiment of a method 1900 for de-duplication caching. Step 1920 may comprise a plurality of virtual machines 208A-N accessing files that are suitable for de-duplication (e.g., stable files). Step 1930 comprises the virtual machines 208A-N attempting to admit the files into the deduplication cache 260. As disclosed herein, the virtual machines 208A-N may attempt to admit the same files multiple times (e.g., a different admission request from each virtual machine 208A-N). The files, however, may be identified by use of a context-independent DID 856, such that only one copy of each file (and/or file version) is admitted into the de-duplication cache 260. Requests to "re-admit" the same file data may be ignored.

Step 1930 may comprise providing access to the cache file data to the virtual machines 208A-N, such that subsequent requests for the files generated by the virtual machines 208A-N are serviced using a single-copy of the corresponding files within the cache storage 216.

Figure 19B:
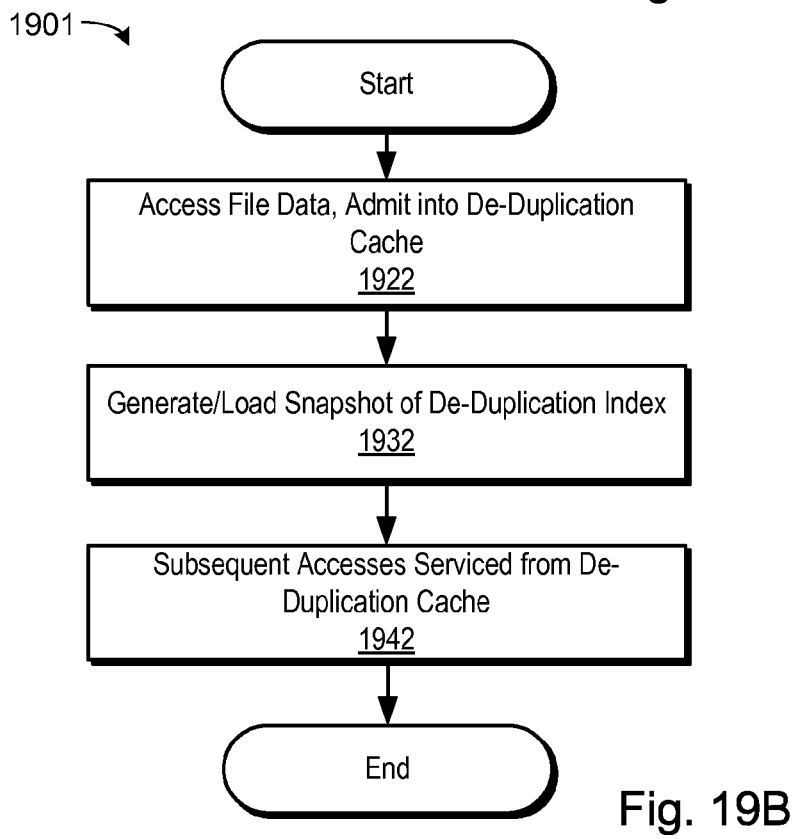
FIG. 19B is a flow diagram of another embodiment of a method for de-duplication caching.

FIG. 19B is a flow diagram of another embodiment of a method 1901 for de-duplicate caching. Step 1922 may comprise virtual machines 208A-N accessing files and admitting the files into the de-duplication cache 260, as disclosed herein.

Step 1932 may comprise one or more of the virtual machines 208A-N storing a snapshot of the de-duplication index 867A-N, as disclosed above phish25

Step 1932 may further comprise loading the snapshot 867A-N following one or more of a reboot, restart, power cycle, and/or migration operation. Loading the snapshot 867A-N may comprise populating the de-duplication index 864A-N with the contents of the snapshot 867A-N. As disclosed above, loading the snapshot 867A-N may allow the virtual machines to identify files that have been admitted into the de-duplication cache 260 without re-reading and/or re-admitting the files. For example, at step 1922 the virtual machines may admit operating system files into the de-duplication cache 260, which may result in a "boot storm," as described above. At step 1942, and upon rebooting, the virtual machines 208A-N may access their respective, snapshots 867A-N, populate the de-duplication index 864A-N, and access the operating system files from the de-duplication cache 260, which may significantly reduce "boot storm" issues.

FIG. 20A is a block diagram of another embodiment of a system 2000 for de-duplication caching. As disclosed above, the VMDM 262A-N may be configured to monitor I/O requests within the storage stack 811 of the virtual machine 208A-N. The VMDM 262A-N may identify I/O requests pertaining to files that have been admitted into the de-duplication cache by reference to, inter alia, the de-duplication index 864A-N. The VMDM 262A-N may be configured to service I/O requests pertaining to such files using the de-duplication cache 260. As illustrated in FIG. 20A, I/O requests pertaining to files admitted into the de-duplication cache 260 may be serviced in a "fast path" 2005. The fast path 2005 of FIG. 20A identifies the operations that contribute to time required to service the I/O request. The fast path 2005 may include a) monitoring the I/O request by use of a file I/O monitor 2014, b) determining that the I/O request pertains to a file that has been admitted to the de-duplication cache 260 (by referencing the de-duplication index 864A), requesting data corresponding to the I/O request through a de-duplication cache interface 2023 (e.g., I/O driver 218A and/or VLUN disk 235A), c) identifying a de-duplication cache tag 812 corresponding to the request, d) accessing the cache data from the cache storage 216, and e) using the data to service the I/O request.

FIG. 20B depicts another embodiment of a system 2001 for de-duplication caching. FIG. 20B illustrates operations involved in servicing a cache miss (e.g., admitting data into the de-duplication cache 260 in response to an I/O request). The VMDM 262A may be configured to monitor I/O requests by use of a file I/O monitor 2014, as disclosed above. The VMDM 262A may identify an I/O request pertaining to a file that has not been admitted into the cache in response to determining that the de-duplication index 864A does not include an entry associated with the UFID 855 of the file. The VMDM 262A may be configured to "fork" 2019 the I/O request, which may comprise allowing the I/O request to be serviced through fast path 2015 operations within the storage stack 811. The fork 2019 may further comprise starting a new thread and/or process 2017 to admit the file data into the de-duplication cache 260. The operations of the fast path 2015 may be performed independently of the slow path 2017 operations.

The operations of the fast path 2015 may include, but are not limited to, servicing the I/O request in the storage stack 811 by, inter alia, reading the file data from primary storage 212 or other storage resource. The operations of the slow path 2017 may include, but are not limited to: a) reading the file data from the primary storage 212 by use of, inter alia, the storage stack 811, b) determining a DID 856 of the file data, c) communicating a cache admission request to the de-duplication cache that includes the file data and the DID 856 via the communication link 124 provided by the DC interface 2023 and cache interface 223, d) allocating de-duplication cache tag(s) 812 for the file data, and e) storing the file data in the cache storage.

As disclosed above, in some embodiments, virtual machines 208A-N may be configured to be transferred between hosts 202. Transferring a virtual machine 208A-N may comprise retaining and/or transferring cache state of the virtual machine 208A-N, which may include, but is not limited to the de-duplication index 864A-N, de-duplication cache tags 812, and/or data 269 admitted into the de-duplication cache 260.

Figure 21:
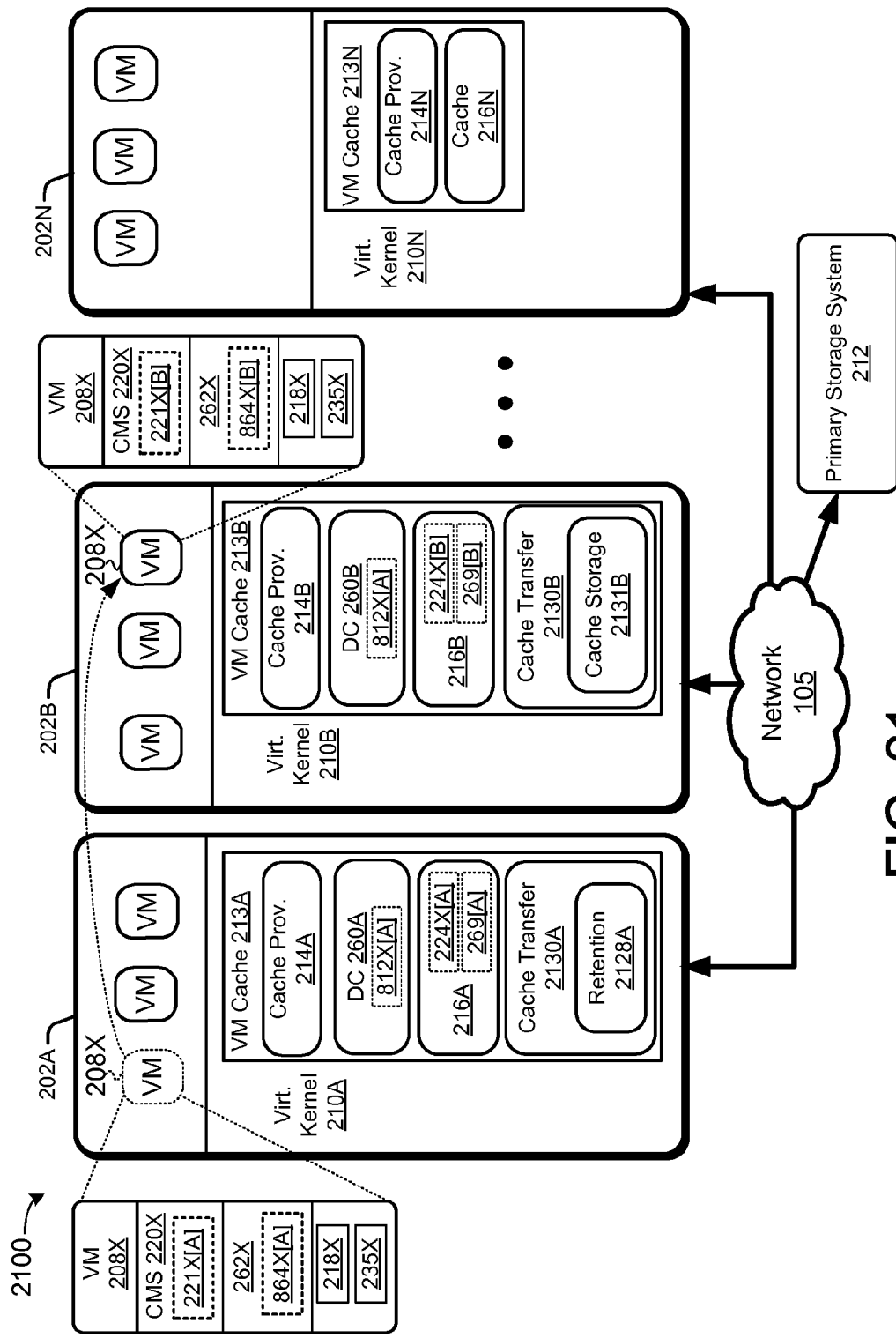
FIG. 21 is a block diagram depicting one embodiment of a system for managing cache state of a virtual machine.

FIG. 21 is a block diagram of another embodiment of a system 2100 for de-duplication caching. The system 2100 includes multiple hosts 202A-N, each of which may comprise a respective virtualization kernel 210 supporting one or more virtual machines 208. One or more of the hosts 202A-N may further comprise a respective virtual machine cache 213A-N, comprising a cache provisioner module 214A-N, de-duplication cache 260A-N, cache storage 216A-N, and so on. Although FIG. 21 depicts three host systems 202A-N, the disclosure is not limited in this regard and could include any number of hosts 202A-N.

Each virtual machine 208 may be assigned a respective VMID. The VMID may be assigned when the virtual machine 208 is instantiated on a host 202A-N (e.g., during an initialization and/or handshake protocol). The VMID may comprise a process identifier, thread identifier, or any other suitable identifier. In some embodiments, the VMID may uniquely identify the virtual machine 208 on a particular host 202A-N and/or within a within a group of hosts 202A-N. For example, the hosts 202A-N may operate within the same namespace, such as a cluster, and the VMID of each virtual machine 208 may be unique within the namespace of the cluster (unique across the virtual machines 208A-N deployed on hosts 202A-N in the cluster). In some embodiments, the VMID may comprise a host identifier, such as a Media Access Control (MAC) address, network address, distinguished name, or the like. The VMID may comprise an identifier assigned by the virtualization kernel 210, hypervisor, host 202A-N, or the like. Accordingly, in some embodiments, a VMID may uniquely identify a virtual machine 208 in a particular namespace, and may identify the host 202A-N upon which the virtual machine 208 is currently deployed (or was previously deployed). Alternatively, or in addition, each virtual machine 208 may be configured to maintain a current host identifier and a previous host identifier.

In some embodiments, one or more of the virtual machines 208 may be capable of being relocated and/or transferred between the hosts 202A-N. For example, a virtual machine 208X may be migrated from the host 202A to the host 202B (e.g., in a VMotion™ or similar operation). The systems, apparatus, and methods disclosed herein may provide for migrating the cache state of the virtual machine 208X from the host 202A to the host 202B, including cache state pertaining to the de-duplication cache 260A-N. Migrating the cache state of the virtual machine 208X may comprise migrating cache metadata (e.g., cache tags 221X[A] and/or de-duplication index 864A[A]) to the host 202B, migrating data of the virtual machine 208X that has been admitted into the cache storage 216A of the host 202A (cache data 224X[A] and/or de-duplication data 269[A]), and the like. Accordingly, transferring the virtual machine 208X from host 202A to host 202B may comprise retaining and/or transferring portions of the cache state of the virtual machine 208X to the destination host 202B.

In the FIG. 21 embodiment, the virtual machine 208X comprises a CMS 220X which, as disclosed herein, may be configured to selectively service I/O operations of the virtual machine 208X by use of the virtual machine cache 213A of the host 202A and/or in accordance with cache resources dynamically allocated to the virtual machine 208X on the host 202A (e.g., cache storage 224X[A]). The CMS 220X may comprise an I/O driver and/or filter 218X, which may be configured to monitor I/O operations within the virtual machine 208X and/or provide a communication link (not shown) between the CMS 220X and the virtual machine cache 213A of the host 202A. The CMS 220X may be configured to maintain cache metadata (including the cache tags 221X[A]) in accordance with the cache resources allocated to the virtual machine 208X by the cache provisioner module 214A. As depicted in FIG. 21, the cache tags 221X[A] may be maintained within the virtual machine 208X (e.g., within the local memory space of the virtual machine 208X).

The cache tags 221X[A] may correspond to cache data 224X[A] stored in physical storage locations of the cache storage 216A (e.g., cache chunks 302 and/or pages 304). The cache data 224X[A] may be associated with identifiers of the cache tags 221X[A] and/or the VMID of the virtual machine 208X by a map module 217, as disclosed above.

The virtual machine 208X may further comprise a VMDM 262X, which may be configured to identify files suitable for admission into the de-duplication cache 260A of the hosts 202A, as disclosed herein. The VMDM 262X may be further configured to maintain a de-duplication index (denoted 864X[A] on host 202A). The de-duplication index 864X[A] may comprise metadata pertaining to the files that have been admitted into the de-duplication cache 260A of the host 202A by VMDM 262X.

The virtual machine 208X may be transferred from the host 202A to the host 202B. Transferring the virtual machine 208X may comprise transferring a current operating state of the virtual machine 208X, including a current memory image or state of the virtual machine 208X from the host 202A to the host 202B. The memory image of the virtual machine 208X may include, but is not limited to: contents of the memory stack, heap, virtual memory, and so on. Accordingly, in the FIG. 21 embodiment, the cache tags 221X[A] may be automatically transferred to the host 202B with the virtual machine 208X (denoted 221X[B] on host 202B). In addition, the contents of the de-duplication index may be automatically transferred with the memory image of the virtual machine 208X (denoted 264X[B] on host 202B).

Transferring the cache tags 221X[A] to host 202B may comprise incorporating the cache tags 221X[B] in accordance with cache resources allocated to the virtual machine 208X on the host 202B, which may comprise adding and/or removing portions of the cache tags 221X[B] on the host 202B in accordance with the cache resources allocated to the virtual machine 208X by the cache provisioner module 214B of host 202B.

Transferring the cache state of the virtual machine 208X may further comprise transferring the cache data 224X[A] to which the cache tags 221X[B] refer. Transferring the cache data 224X[A] may comprise retaining the cache data 224X[A] of the virtual machine 208X on the host 202A in response to the virtual machine 208X being transferred therefrom; requesting portions of the retained cache data 224X[A] from the host 202A; and/or transferring portions of the cache data 224X[A] between the hosts 202A and 202B.

Transferring the cache state of the virtual machine 208X may further comprise transferring de-duplication data 269X[A] of the virtual machine 208X. The data 269X[A] may correspond to file data admitted into the de-duplication cache 260A (and stored within the cache storage 216A) in response to requests from the VMDM 262X of the virtual machine 208X, as disclosed above. Transferring the cache state may further comprise retaining and/or transferring de-duplication cache state, such as de-duplication cache tags 812X[A]. As disclosed above, the de-duplication cache tags 812X[A] pertaining to the virtual machine 208X may identify files in the de-duplication cache 260A that the virtual machine 208X is authorized to access (e.g., files that are accessible to the virtual machine 208X per the access list fields 859 of the de-duplication cache tags 812X[A]). Accordingly, the de-duplication cache tags 812X[A] and/or portions thereof may be transferred to the destination host 202B as part of the cache state of the virtual machine 208X. The cache state transferred to the host 202B may further include the data to which the de-duplication cache tags 812X[A] refer.

In some embodiments, the virtual machine cache 213B at the host 202B may be configured to transfer portions of the cache state of the virtual machine 208X in response to determining that the virtual machine 208X was transferred to the host 202B from another host 202A. The virtual machine cache 213B may be configured to identify the transferred virtual machine 208X and/or determine that the virtual machine 208X is being transferred to the host 202B before the virtual machine 208X arrives thereon. In some embodiments, the virtual machine cache 213B may be notified that the virtual machine 208X is being migrated to the host 202B. The notification may be generated by the previous host 202A, the virtual machine cache 202A, the virtualization kernel 210A or 210B, a management process or entity, or the like. The notification may comprise the VMID of the virtual machine 208X, cache requirements of the virtual machine 208X, and so on.

In some embodiments, the virtual machine cache 213B identifies that the virtual machine 208X was transferred to the host 202B in response to receiving a cache request from the virtual machine 208X (e.g., via the VLUN driver 215 and/or communication link 124). After being transferred to the host 202B, the CMS 220X and/or VMDM 262X may continue to attempt to service I/O operations using the VM cache, which may comprise monitoring I/O within the virtual machine 208X (using, inter alia, the I/O driver 218X) and/or directing selected I/O requests to the virtual machine cache 213B and/or de-duplication cache 260B via the VLUN disk 235X. The requests, however, may reference cache resources and/or cache data 224X[A], 269X[A] within the cache storage 216A of the host 202A that are not available on the host 202B. The requests may further comprise the VMID of the transferred virtual machine 208X. The virtual machine cache 213B may determine that the virtual machine 208X was transferred to the host 202B in response to receiving such requests; the virtual machine cache 213B may determine that no cache space has been allocated to a virtual machine 208X associated with the VMID provided in the request(s), the cache provisioner module 214B has not allocated cache storage 224X[B] for the virtual machine 208X, and so on. In addition, the de-duplication cache 260B may determine that the VMID of the virtual machine 208X does not appear on any of the access list(s) and/or de-duplication cache tags 812X[B] of the host 202B. In some embodiments, the virtual machine cache 213B may determine that the virtual machine 208X was transferred to the host 208B based on a host identifier of the VMID. The host identifier may reference the host 202A, whereas the host identifier of a newly powered-on virtual machine 208 on the host 202B may comprise a host identifier of the host 202B (or may be blank). Alternatively, or in addition, the virtual machine 208X may comprise a separate host identifier, which may reference host 202A, and may be accessed in the handshake protocol with the virtual machine cache 213B.

In response to identifying the transferred virtual machine 208X, the virtual machine cache 213B may initiate a handshake protocol. The handshake protocol may comprise allocating cache storage resources to the virtual machine 208X (e.g., cache space 224X[B]) by the cache provisioner module 214B. The amount of cache storage to allocate to the virtual machine 208X may be based on the size of the cache storage allocated to the virtual machine 208X on the host 202A (cache storage 224X[A]), the size of the working set of the virtual machine 208X (e.g., the number of cache tags 221X[B]), available cache resources, and so on. The cache provisioner module 214B may attempt to allocate sufficient cache storage 224X[B] to support the retained cache tags 221X[A]. If sufficient cache storage cannot be allocated, the CMS 220X may be configured to modify the retained cache tags 221X[B] in accordance with the new cache storage allocation 224X[B]. If excess cache resources are available, the CMS 220X may be configured to add new tags to the retained cache tags 221X[B]. The allocation may be communicated through a virtual disk 235X and/or I/O driver 218X (e.g., SCSI filter driver), as described above. Allocating cache storage may further comprise allocating cache resources for the de-duplication cache 260B. The cache provisioner module 214B may be configured to attempt to allocation sufficient cache resources 269[B] to support the contents of the de-duplication index 864X[B] of the virtual machine 208X.

Transferring the cache state of the virtual machine 208X may comprise transferring portions of the cache data stored within the cache storage 216A of the host 202A (cache data 224X[A]) to the host 202B. In some embodiments, the virtual machine cache 213A may comprise a retention module 2128A, which may be configured to retain cache data 224X[A] of the virtual machine 208X after the virtual machine 208X is transferred from the host 202A. The cache data 224X[A] may be retained for a retention period and/or until the virtual machine cache 213A determines that the retained cache data 224X[A] is no longer needed. The retention module 2128A may determine whether to retain the cache data 224X[A] (and/or determine the cache data retention period) based upon various retention policy considerations, including, but not limited to, availability of cache storage 216A, availability of cache storage 216B, relative importance of the retained cache data 224X[A] (as compared to cache requirements of other virtual machines 208), whether the cache data 224X[A] is available in the primary storage system 212 (or other backing store), a cache mode and/or persistence level of the cache data 224X[A], and so on. For example, cache data stored in a write-never cache mode (cache data that has not been written-through to the primary storage system 212) may only be available on the original virtual machine cache 213A. The cache retention module 2128A may be configured to prioritize retention of write-never cache data until the write-never cache data is transferred to the new host 202B. By contrast, cache data stored in different cache modes (e.g., write-through and/or write-back cache mode) may have a lower retention priority, since this data will also be available from the primary storage system 212. In some embodiments, the retention policy comprises a transfer threshold; the retained cache data 224X[A] may be retained until a threshold amount of the retained cache data 224X[A] has been transferred. Alternatively, or in addition, the retained cache data 224X[A] may be removed as it is transferred to the host 202B (e.g., portions transferred to the host 202B may be immediately removed from the cache storage 216A of host 202A).

As disclosed above, the CMS 220X of the virtual machine 208X may be configured to retain cache metadata (the cache tags 221X[B] at the host 202B) despite the fact that the cache storage 216B does not comprise the cache data to which the cache tags 221X[B] refer. Although the virtual machine 208X may have been allocated cache resources 224X[B] at the host 202B, the newly allocated resources may not be populated with cache data 224X[A] of the virtual machine 208X. As described in further detail herein, the virtual machine cache 213B may be configured to populate the cache storage 224X[B] with cache data 224X[A] transferred from the cache storage 216A and/or from the primary storage system 212, to reconstruct the working set of the virtual machine 208X at the host 202B.

The virtual machine cache 213B may comprise a cache transfer module 2130B, which may be configured to access cache data 224X[A] of the virtual machine 208X at the previous host 202A. The cache transfer module 2130B may be configured to identify the previous host 202A by use of the VMID (e.g., accessing a previous host identifier maintained by the virtual machine 208X), by interrogating the virtual machine 208X, querying the virtualization kernel 210B (or other entity), or the like. The cache transfer module 2130B may use the host identifier and/or host addressing information request portions of the retained cache data 224X[A] from the host 202A via the network 105. In some embodiments, the cache transfer module 2130B is configured to determine and/or derive a network address and/or network identifier (network name or reference) of the host 202A from the host identifier.

The virtual machine cache 213A may comprise a cache transfer module 2130A that is configured to selectively provide access to retained cache data 224X[A] of the virtual machine 208X. In some embodiments, the cache transfer module 2130A is configured to secure the retained cache data 224X[A]. For example, the cache transfer module 2130A may be configured to verify that the requesting entity (e.g., the virtual machine cache 213B) is authorized to access the retained cache data 224X[A], which may comprise verifying that the virtual machine 208X has been deployed on the host 202B and/or verifying that requests for the retained cache data 224X[A] are authorized by the virtual machine 208X (or other authorizing entity). For example, the cache transfer module 2130A may request a credential associated with the transferred virtual machine 208X, such as the VMID, or the like. Alternatively, or in addition, the cache transfer module 2130A may implement a cryptographic verification, which may comprise verifying a signature generated by the transferred virtual machine 208X, or the like.

The cache data 224X[A] may be transferred between the hosts 202A and 202B using various mechanisms, including, but not limited to: push transfers, demand paging transfers, prefetch transfers, bulk transfers, or the like.

A push transfer may comprise the cache transfer module 2130A pushing cache data 224X[A] of the virtual machine 208X to the host 202B without receiving a request for the cache data 224X[A] (e.g., before the host 202B requests the cache data 224X[A]). The cache transfer module 2130A may be configured to push cache data 224X[A] of the virtual machine 208X in response to determining that the virtual machine 208X is to be transferred to the host 202B. The cache data 224X[A] may be pushed to the new host 202B before the transfer actually takes place, before the transfer is complete, and/or before the virtual machine 208X initiates a handshake protocol at the new host 202B. Pushing the cache data 224X[A] may serve to notify the virtual machine cache 213B that the virtual machine 208B is being transferred thereto. In response, the virtual machine cache 213B may preemptively allocate cache resources 224X[B] for the virtual machine 208X and/or begin populating the cache with the cache data 224X[A] pushed from the host 202A.

A demand paging transfer may comprise transferring retained cache data 224X[A] in response to I/O requests generated by the virtual machine 208X after deployment on the host 202B (e.g., on demand). The transferred cache data 224X[A] may be used to service the I/O requests. In addition, the transferred cache data 224X[A] may be admitted into the cache storage 216B of the new host 202B. Alternatively, the transferred cache data 224X[A] may be admitted at a later time (or not at all), in accordance with cache policy and/or cache resource allocations at the host 202B.

A prefetch transfer may comprise transferring cache data 224X[A] according to a prefetch cache policy (e.g., by proximity or the like). The amount and/or extent of cache data 224X[A] to prefetch from the host 202A may be determined by, inter alia, cache metadata of the CMS 220X (e.g., cache aging metadata, "hotness," and so on). Accordingly, in some embodiments, the cache transfer module 2130B may be configured to query the CMS 220X to identify cache data 224X[A] for prefetch (if any) and/or prioritize prefetch operations.

A bulk transfer may comprise transferring cache data 224X[A] in bulk, independent of I/O operations of the virtual machine 208X. A bulk transfer may comprise populating the entire cache storage 224X[B] allocated to the virtual machine 208X at host 202B. Alternatively, a bulk transfer may comprise populating a subset of the cache storage 224X[B], which, as disclosed above, may be selected based upon cache metadata of the virtual machine CMS 220X and/or determined by differences in cache resources allocated to the virtual machine 208X at the hosts 202A and 202B.

The cache transfer module 2130B may be further configured to prioritize cache transfers (e.g., prefetch and/or bulk transfers) in accordance with the cache mode and/or state of the cache data 224X[A]. For example, data that is cached in a write-never cache mode or write-back cache mode (and is not yet backed in primary storage) may only be available from the previous host 202A, and as such, may be prioritized over data that may be available from alternative sources (e.g., primary storage system 212). Therefore, the cache transfer module 2130B may be configured to prefetch and/or bulk transfer certain portions of the cache data 224X[A] rather than waiting for on-demand paging or the like.

The cache storage module 2131B may be configured to selectively admit cache data 224X[A] into the cache 224X [B]. The cache storage module 2131B may be further configured to populate the cache data 224X[B] from other sources, such as the primary storage system 212, other hosts 202N, or the like. The cache storage module 2131B may be configured to associate the cache data 224X[B] with the identifiers of the retained cache tags 221X[B], such that the references in the retained cache tags 221X[B] remain valid per the mappings implemented by the map module 217, as disclosed above.

In response to requests for cache data 224X[A] of the virtual machine 208X, the cache transfer module 2130A may be configured to identify the requested cache data using, inter alia, the VMID of the transferred virtual machine 208X (by use of the map module 217). The cache transfer module 2130A may transfer the requested cache data 224X[A] (if available) to the cache transfer module 2130B via the network 105.

The cache transfer module 2130B may be configured to populate the cache data 224X[B] from various other sources, such as the primary storage system 212 or other shared storage resources. The cache transfer module 2130B may select the source of the cache data based upon various policy considerations (e.g., a cache transfer policy), which may include a network policy, bandwidth policy, host resource policy, primary storage resource policy, and the like. For example, in response to determining that the network 105 is highly congested, the cache transfer module 2130B may be configured to reduce the amount of data to transfer (defer a bulk transfer) and/or transfer the cache data from another source that is independent of the network 105. Similarly, the cache transfer module 2130B may direct requests to the host 202A (as opposed to the primary storage system 212) in response to determining that the primary storage system 212 is heavily loaded and/or has limited available bandwidth. Certain types of data, however, may only be available from the host 202A. For instance, write-never and/or write-back cache data that has not yet been written-through to the primary storage system 212, may only be available from the host 202A. The cache transfer module 2130B may be configured to identify such data, and to prioritize such data transfers to reduce the chance of data loss.

The retained cache data 224X[A] may represent cache resources that cannot be used by the other virtual machines 208A-N operating on the host 202A. As such, the cache retention module 2128A may be configured to selectively remove the retained cache data 224X[A] when it is no longer needed and/or according to a retention policy. The retention policy may be determined based upon the retention policy factors, described above. In some embodiments, the cache transfer module 2130B is configured to inform the host 202A of cache data that has been transferred to the host 202B from other sources so that the cache retention module 2128A can remove the corresponding retained cache data 224X[A] from the cache storage 216A. The cache transfer module 2130B may be further configured to inform the host 202A of other conditions in which the cache data 224X[A] no longer needs to be retained, such as when the data is modified, overwritten, deleted (e.g., TRIMed), and/or evicted from the cache storage 216B at the host 202B. For example, upon being transferred to the host 202B, the virtual machine 208X may perform a storage operation to delete or TRIM data corresponding to cache data 224X[A] retained at host 202A. In response, the cache transfer module 2130B may inform the host 202A that the corresponding cache data 224X[A] no longer needs to be retained within the cache storage 216A.

As disclosed above, in some embodiments, the cache transfer module 2130A may be configured to "push" cache data 224X[A] to the host 202B. Pushing cache data may comprise transferring retained cache data 224X[A] to the cache transfer module 2130B (and/or cache storage module 2131B) without receiving a request (independent of requests for the cache data 224X[A]). The cache transfer module 2130A may determine the host identifier of the new host 202B through user configuration; the verification process, described above; active polling by the cache transfer module 2130A; a callback implemented by the transferred virtual machine 208X; or the like. In some embodiments, the virtual machine cache 213B of the host 202B may identify that the virtual machine 208X was transferred from the host 202A in response to receiving cache data pushed from the host 202A, as described above. The cache transfer module 2130A may be configured to selectively push high-priority cache data, such as write-never cache data to prevent data loss.

Cache state pertaining to the de-duplication cache 260A (de-duplication cache state) may be transferred between hosts 202A-B, as disclosed above. The retention module 2128A may be configured to retain de-duplication cache tags 812X [A] and/or de-duplication data 269[A] at the host 202A in response to determining that the virtual machine 208X has transferred (or is being transferred) to the host 202B. The cache transfer module 2130A may be configured to selectively transfer the de-duplication cache state to the host 202B. The de-duplication cache state may include, but is not limited to: the DIDs of files accessed by the virtual machine 208X, de-duplication cache tags 812X[A] pertaining to the virtual machine 208X, and/or contents of the de-duplication cache 260X[A] (de-duplication cache data 269X[A]). Transferring the de-duplication cache state may comprise one or more push transfers, demand paging transfers, prefetch transfers, and/or bulk transfers.

As disclosed above, transferring de-duplication cache state to the host 202B may allow the virtual machine 208X to access data in the de-duplication cache 260B immediately. For example, transferring the DIDs 856 of files accessed by the virtual machine 208X may allow the de-duplication cache 260B to determine which files in the de-duplication cache 260B the virtual machine 208X is authorized to access without first requiring the virtual machine 208X to "re-admit" the data. Accordingly, transferring the de-duplication cache state may reduce the overhead on I/O resources (primary storage 212 and network 105) and/or ameliorate boot storm issues.

In some embodiments, the cache transfer module 2130A and/or 2130B is configured to transfer de-duplication cache tags 812X[A] before transferring the corresponding de-duplication data 269[A]. The de-duplication cache 260B of the host 202B may use the de-duplication cache tags 812X[A] to determine whether the corresponding file data has already be admitted into the de-duplication cache 269[B] (based on the DIDs 856 of the de-duplication cache tags 812X[A]). Determining whether the corresponding file data has already been admitted may further comprise verifying that purported matches between the DIDs 856 is not due to a DID collision, as disclosed above. In some embodiments, the cache transfer modules 2130A and/or 2130B may be configured to perform a byte-by-byte comparison between the portions of the deduplication cache data 269[A] and the de-duplication cache data 269[B]. Alternatively, the cache transfer modules 2130A and/or 2130B may be configured to determine and/or exchange a larger, higher-security DID values in lieu of a byte-by-byte comparison. Files already admitted into the de-duplication cache of the host 202B may not need to be transferred to the host 202B and/or read from the primary storage 212. The de-duplication cache 260B may be configured to update the de-duplication cache tags 812X[B] in response to the de-duplication cache tags 812X[A] transferred from the host 202A, which may comprise updating access list information, and so on, to indicate that the virtual machine 208X is authorized to access particular file data in the de-duplication cache 260B, as disclosed above. Accordingly, the virtual machine 208X may be able to access such files without first attempting to re-admit data of the files into the de-duplication cache 260B of the host 202B.

Further embodiments of systems and methods for transferring cache state are disclosed in U.S. patent application Ser. No. 13/687,979, to Vikram Joshi et al., filed Nov. 28, 2012, and entitled, "Systems, Methods, and Apparatus for Cache Transfers," and which is incorporated by reference.

Reference throughout this specification to features, advantages, or similar language does not imply that all of the features and advantages that may be realized are included any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

The embodiments disclosed herein may involve a number of functions to be performed by a computer processor, such as a microprocessor. The microprocessor may be a specialized or dedicated microprocessor that is configured to perform particular tasks according to the disclosed embodiments, by executing machine-readable software code that defines the particular tasks of the embodiment. The microprocessor may also be configured to operate and communicate with other devices such as direct memory access modules, memory storage devices, Internet-related hardware, and other devices that relate to the transmission of data in accordance with various embodiments. The software code may be configured using software formats such as Java, C++, XML (Extensible Markup Language) and other languages that may be used to define functions that relate to operations of devices required to carry out the functional operations related to various embodiments. The code may be written in different forms and styles, many of which are known to those skilled in the art. Different code formats, code configurations, styles and forms of software programs and other means of configuring code to define the operations of a microprocessor in accordance with the disclosed embodiments.

Within the different types of devices, such as laptop or desktop computers, hand held devices with processors or processing logic, and also possibly computer servers or other devices that utilize the embodiments disclosed herein, there exist different types of memory devices for storing and retrieving information while performing functions according to one or more disclosed embodiments. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to various embodiments when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured disclosed herein enable the physical transformation of these memory devices. Accordingly, the embodiments disclosed herein are directed to novel and useful systems and methods that, in one or more embodiments, are able to transform the memory device into a different state. The disclosure is not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

We claim:
1. A computing system, comprising:
a de-duplication cache manager configured for operation on a host computing device comprising a plurality of virtual machines, the de-duplication cache manager configured to admit data into a de-duplication cache in response to admission requests from one or more of the plurality of virtual machines; and
a cache interface module configured to provide access to a single copy of data admitted into the de-duplication cache to two or more of the virtual machines.

2. A computing system of claim 1, further comprising a virtual machine de-duplication module configured to identify files that are infrequently modified for admission into the de-duplication cache.

3. A computing system of claim 1, wherein the de-duplication cache manager is configured to index data admitted into the de-duplication cache using context-independent data identifiers.

4. A computing system of claim 3, wherein the de-duplication cache manager is configured to determine whether data has already been admitted into the de-duplication cache by use of the context-independent identifiers.

5. A computing system of claim 4, wherein the de-duplication cache manager is configured to verify a match between context-independent identifiers by a byte-by-byte comparison of data corresponding to the context-independent identifiers.

6. A computing system apparatus of claim 1, wherein the de-duplication cache manager is configured to restrict access to data admitted into the de-duplication cache to virtual machines that have previously requested admission of the data.

7. A computing system of claim 1, further comprising a cache retention module configured to retain data admitted into the de-duplication cache by one of the virtual machines in response to determining that the one virtual machine is being transferred to a different host.

8. A computing system of claim 1, further comprising a cache transfer module configured to transfer context-independent identifiers of files admitted into the de-duplication cache by a virtual machine to another host.

9. A a computing system, comprising:
 a de-duplication cache policy module configured to identify I/O requests within a virtual machine pertaining to data that satisfy a de-duplication admission policy for admission into a de-duplication cache shared by a plurality of virtual machines, and to issue a request, from the virtual machine, to admit data of one or more of the identified I/O requests into the de-duplication cache; and
 a virtual machine de-duplication module configured to service the identified I/O requests using the de-duplication cache.

10. The computing system of claim 9, wherein the virtual machine de-duplication module is configured to admit a file into the de-duplication cache by deriving a data identifier of the file from data of the file, and providing the data of the file and the data identifier to the de-duplication cache.

11. The computing system of claim 10, wherein the virtual machine de-duplication module is configured to admit the file into the de-duplication cache in response to the request issued from the virtual machine, and wherein the operations to admit the file into the de-duplication cache are performed on a separate thread from a thread performing operations to satisfy the I/O request pertaining to the file.

12. The computing system apparatus of claim 9, further comprising a de-duplication cache manager configured to associate names of files admitted into the de-duplication cache with respective data identifiers of the files to indicate that the files have been admitted into the de-duplication cache, wherein the de-duplication cache manager is further configured to request data of a file from the de-duplication cache by use of the data identifier associated with the file.

13. The computing system apparatus of claim 9, wherein the virtual machine de-duplication module is configured to indicate that a file admitted into the de-duplication cache is no longer admitted in response to detecting an I/O request to modify the file.

14. The computing system apparatus of claim 9, wherein the virtual machine de-duplication module is configured to store associations between file names of files admitted into the de-duplication cache and data identifiers of the files on a persistent storage medium and to load the associations in response to one or more of restarting the virtual machine, rebooting the virtual machine, power cycling the virtual machine, and migrating the virtual machine to a different host.

15. The computing system apparatus of claim 9, further comprising file selection criteria configured to identify files for admission into the de-duplication cache based on one or more of file name, file extension, file path, file volume, file attribute, and a hint.

16. A method, comprising:
 caching a file in a de-duplication cache shared by multiple virtual machines in response to a request to admit the file into the de-duplication cache from a first one of the virtual machines;
 associating the cached file with a context-free identifier; and
 providing data of the cached file from the de-duplication cache to a second one of the virtual machines in response to a request from the second virtual machine, wherein the request from the second virtual machine comprises the context-free identifier of the cached file.

17. The method of claim 16, further comprising determining whether a particular file has already been admitted into the de-duplication cache by comparing a context-free identifier derived from data of the particular file with context-free identifiers of files that have been admitted into the de-duplication cache.

18. The method of claim 16, further comprising:
 comparing data of the file to existing cached file data in the de-duplication cache in response to the context-free identifier of the file matching a context-free identifier of a cached file that is already admitted into the de-duplication cache; and
 providing a modified context-free identifier for the file data to the first one of the virtual machines in response to the file data differing from file data of the cached file already admitted into the de-duplication cache.

19. The method of claim 16, further comprising verifying that the second virtual machine is authorized to access the cached file.

20. The method of claim 19, wherein verifying that the second virtual machine is authorized to access the cached file comprises determining that the second virtual machine has access to the file on a primary storage.

21. A non-transitory machine-readable medium comprising instructions configured to cause a computing device to perform a method, comprising:
 identifying a file for admission into a de-duplication cache in response to monitoring file I/O requests within a storage stack of a virtual machine;
 determining whether the file has been admitted into the de-duplication cache;
 servicing the I/O request by retrieving data from the de-duplication cache in response to determining that the file has been admitted, wherein servicing the I/O request comprises requesting data of the file from the de-duplication cache using a universal identifier of the file; and
 transmitting a request from the virtual machine to admit the file into the de-duplication cache in response to determining that the file has not been admitted.

22. The machine-readable storage medium of claim 21, the method further comprising, in response to determining that the file has not been admitted into the de-duplication cache calculating the universal identifier of the file based on data of the file, wherein the request to admit the file into the de-duplication cache comprises the universal identifier.

23. The machine-readable storage medium of claim 21, the method further comprising associating a name of the file with the universal identifier in a de-duplication index of the virtual machine in response to receiving an indication that the file has been admitted into the de-duplication cache.

24. The machine-readable storage medium of claim 23, the method further comprising requesting data of the file from the de-duplication cache by use of the universal identifier associated with the name of the file in the de-duplication index.

25. The machine-readable storage medium of claim 23, the method further comprising:
   persisting a snapshot of the de-duplication index; and
   populating the de-duplication index using the snapshot subsequent to one or more of rebooting the virtual machine, power cycling the virtual machine, and transferring the virtual machine to a different host.

26. The machine-readable storage medium of claim 23, the method further comprising invalidating an entry in the de-duplication index in response to detecting an I/O request to modify a file referenced in the entry.

\* \* \* \* \*